United States Patent [19]

Rousseau et al.

[11] Patent Number: 5,452,375
[45] Date of Patent: Sep. 19, 1995

[54] DIGITAL IMAGE PROCESSING CIRCUITRY

[75] Inventors: Jean-Francois Rousseau, Saint Pierre les Nemours; Bertrand Obriot, La Grande Paroisse, both of France

[73] Assignee: Sagem S.A., Fontainebleau, France

[21] Appl. No.: 120,299

[22] Filed: Sep. 13, 1993

[30] Foreign Application Priority Data

May 24, 1993 [EP] European Pat. Off. ........... 93401326

[51] Int. Cl.⁶ .............................................. G06K 9/54
[52] U.S. Cl. ............................................... 382/302
[58] Field of Search ...................... 382/41, 49

[56] References Cited

U.S. PATENT DOCUMENTS

| | | | |
|---|---|---|---|
| 4,167,728 | 9/1979 | Sternberg | 382/49 |
| 4,322,716 | 3/1982 | Sternberg | 382/49 |
| 4,718,091 | 1/1988 | Kobayashi et al. | 382/49 |
| 4,860,375 | 8/1989 | McCubbrey et al. | 382/49 |
| 5,022,090 | 6/1991 | Masaki et al. | 382/49 |
| 5,048,108 | 9/1991 | Basille et al. | 382/49 |
| 5,052,046 | 9/1991 | Fukuda et al. | 382/49 |
| 5,157,739 | 10/1992 | Masaki et al. | 382/49 |

*Primary Examiner*—Jose L. Couso
*Attorney, Agent, or Firm*—Brumbaugh, Graves, Donohue & Raymond

[57] ABSTRACT

A programmable general purpose digital image processing circuit 30 incorporates pipeline image processing architecture including one or more pipeline processing chains 379 for making image processing computations, each chain comprising a serial connection of a convolution (CONVOL) unit 34, logic (LU) unit 35, morphological (MORPH) unit 36 and look-up table (LUT) unit 37, which enables the greatest number of processing operations to be performed within the shortest possible overhead time.

5 Claims, 47 Drawing Sheets

FIG. 5C"

$$R(M1) \begin{cases} \overbrace{C00\ L3}^{CT0=0} + \overbrace{C01\ L2}^{CT0=1} + \overbrace{C10\ L1}^{CT0=0} + \overbrace{C11\ L0}^{CT0=1} \\ + C20\ M3 + C21\ M2 + C30\ M1 + C31\ M0 \} 3412 \\ + C40\ N3 + C41\ N2 + C50\ N1 + C51\ N0 \} 3411 \end{cases}$$

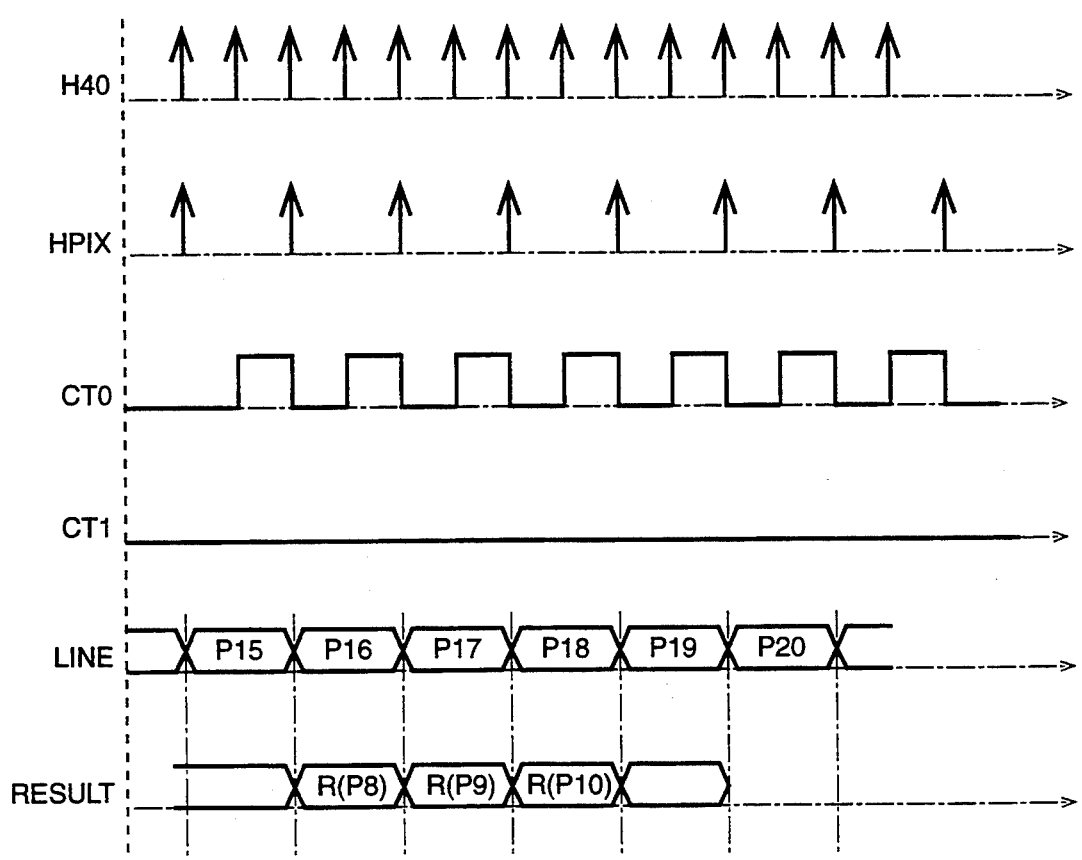
FIG. 6M"

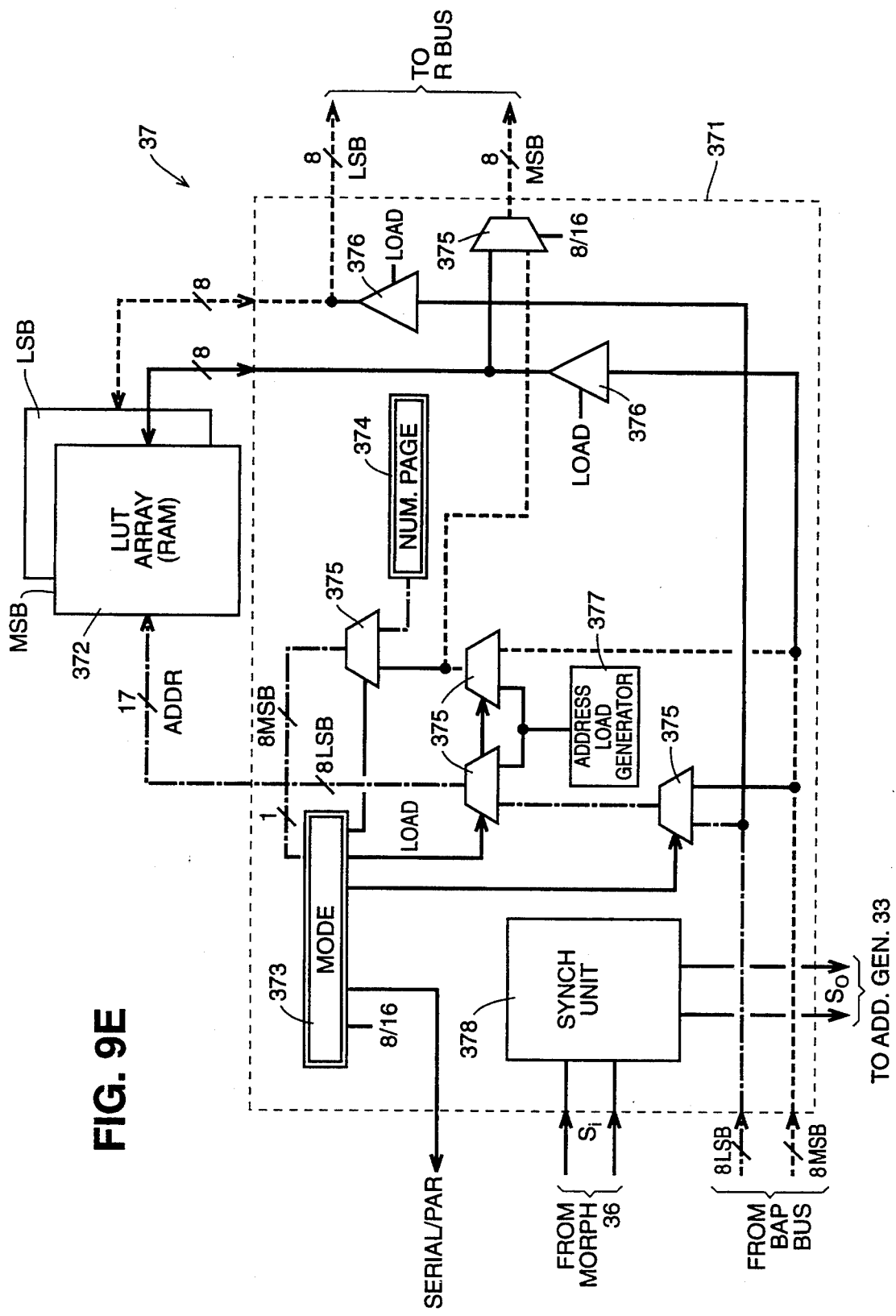

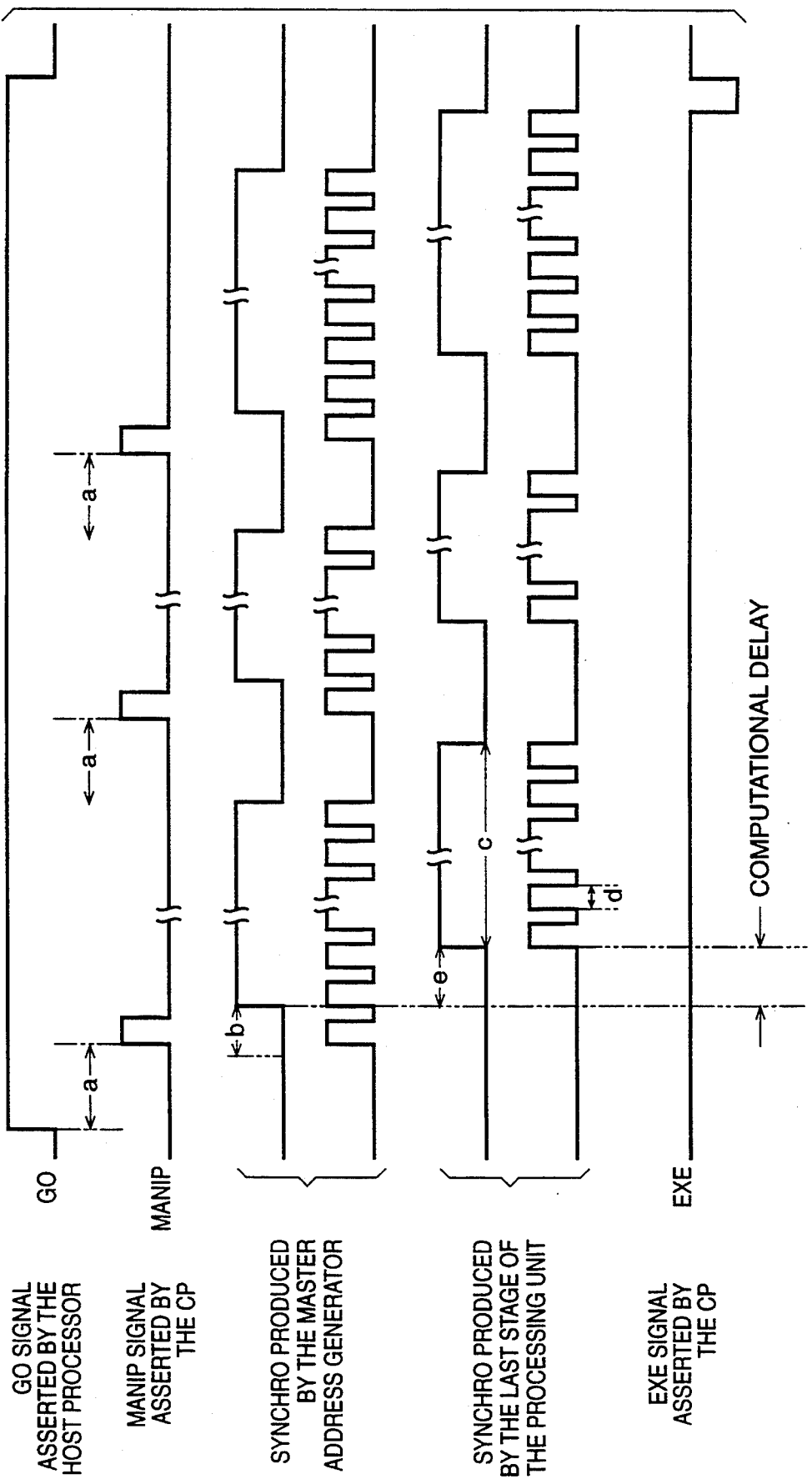

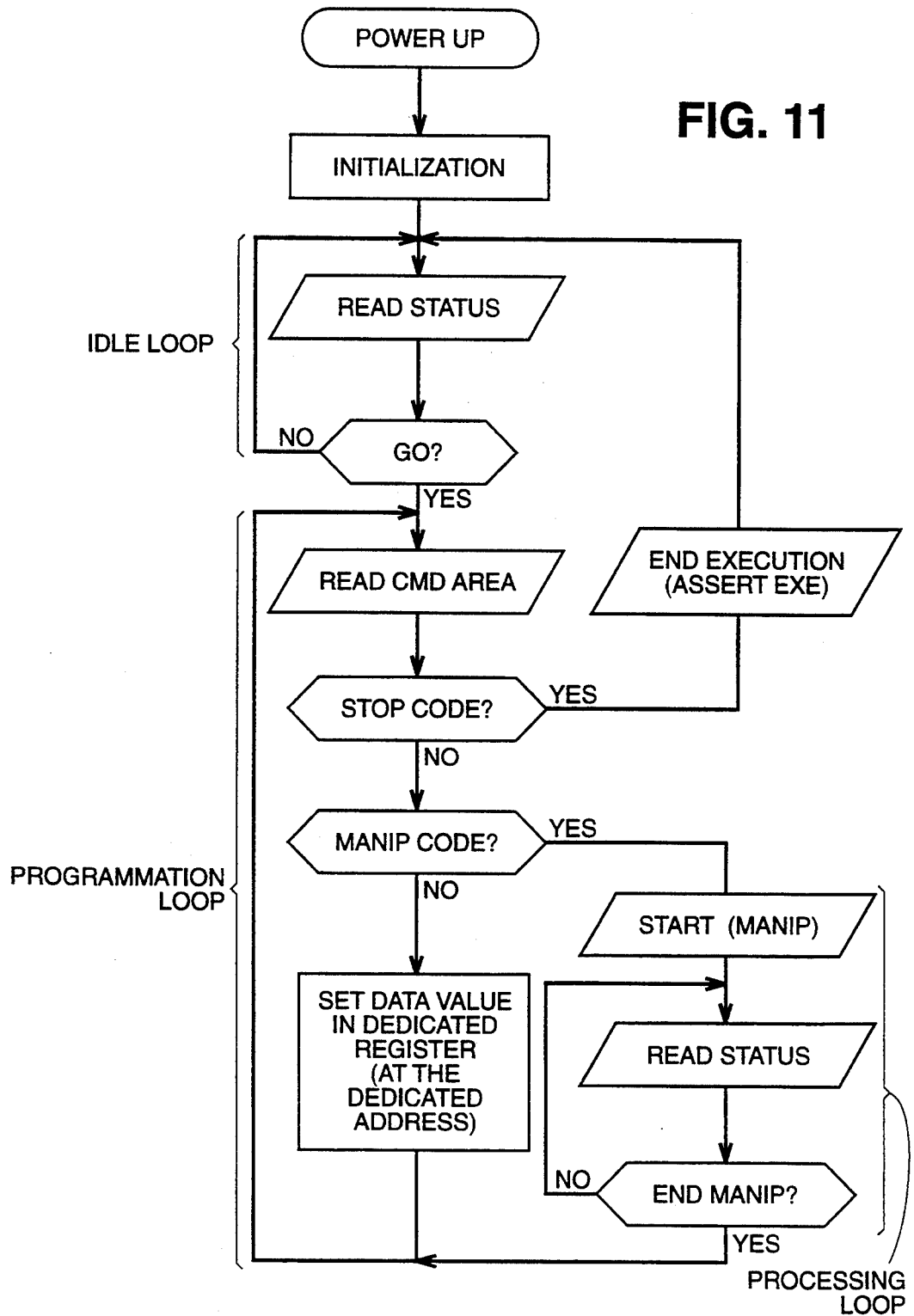

DIGITAL IMAGE PROCESSING CIRCUITRY

BACKGROUND OF THE INVENTION

The present invention relates to digital image processing circuitry, which has utility in the interpretation of electronic images generated, for example, from photographs or other forms of imaging in which it is necessary to process electronic images in order to interpret or to extract the data contained in the image, e.g., in interpreting or extracting image data acquired by satellite photography or in interpreting or extracting image data in acquired search fingerprints or file fingerprints.

In an automatic fingerprint identification system for matching search fingerprints to file fingerprints, of the kind described in Larcher et al. U.S. Pat. No. 4,790,564, issued Dec. 13, 1988 and entitled AUTOMATIC FINGERPRINT IDENTIFICATION SYSTEM INCLUDING PROCESSES AND APPARATUS FOR MATCHING FINGERPRINTS, the apparatus comprises a plurality of different subsystems communicating via a high-speed local area (LAN) network. Three of these subsystems are a ten print card input subsystem, a latent print input subsystem, and an encoding subsystem. The outputs of the print subsystems include analog or gray scale electronic images of fingerprints, which are subjected to digital image processing and digital image filtering. One drawback of conventional digital image processing and digital image filtering methods and apparatus is the large time overhead involved in performing the necessary image processing and image filtering computations.

In some cases, the image quality of the gray scale image outputs is directly related to the quality of the respective print inputs to the two subsystems and those of ordinary skill in the art have sought to improve image quality by means of digital image processing and digital image filtering.

The encoding subsystem described in the '564 patent includes appropriate circuit means for utilizing the electronic images to detect the minutiae in each fingerprint. Poor image quality has an adverse effect on the process of detecting minutiae. Poor image quality also has an adverse effect on correctly interpreting or extracting electronic image data acquired by satellite photography or other means.

Hence, the capability of increasing the speed of making digital image filtering and digital image processing computations and the capability of improving the quality of digital images by means of digital image filtering and digital image processing are goals sought after by those of ordinary skill in the art.

OBJECT OF THE INVENTION

It is, therefore, an object of the present invention to provide novel digital image processing and digital image filtering methods and apparatus embodying high speed image processing computations.

It is a further object of the present invention to provide novel digital image filtering methods and apparatus embodying high speed image filtering computations.

It is a further object of the present invention to provide general purpose digital image processing methods and apparatus that can be readily programmed by the users to process electronic digital images acquired from various sources, e.g., satellite photography, fingerprint cards, etc.

It is a further object of the present invention to provide new and improved methods and apparatus for generating random access memory addresses, having application, e.g., in digital image processing and digital image filtering methods and apparatus.

Other and further objects of the present invention will be apparent to those of ordinary skill in the art of digital image processing and digital image filtering from the detailed description set forth below.

SUMMARY OF THE INVENTION

In accordance with one apparatus aspect of the present invention, there is provided in an electrical filter for filtering digital images, said filter having input means for receiving an electronic digital image having a boundary and output means for transmitting a filtered electronic digital image, the improvement characterized by the combination of control processor means; and circuit means for filtering said received digital image, said circuit means incorporating at least one pipeline processing chain means for making a first plurality of digital image filtering computations, said chain means having input means to which at least one pixel of said received image is applied and output means from which said filtered digital image is coupled to said transmitting means, said processing chain means being responsive to a second plurality of commands interpreted by said processor to enable said processing chain means to make predetermined ones of said first plurality of computations with respect to said pixel of said received digital image.

In accordance with another apparatus aspect of the present invention, there is provided in an electrical circuit for processing digital images having an input means for receiving at least one electronic digital input image to be processed and output means for transmitting at least one processed electronic digital output image, the improvement characterized by the combination of control processor means; video random access memory means; video random access memory controller means; and circuit means for processing at least one digital image, said circuit means incorporating at least one pipeline processing chain means for making a first plurality of digital image processing computations, said processing chain means having input means to which at least one pixel of said input image is applied and output means from which a processed input pixel is applied to said transmitting means, said processing chain means being responsive to a second plurality of commands interpreted by said processor to enable said processing chain means to make predetermined ones of said first plurality of computations with respect to said pixel of said input digital image.

In accordance with another apparatus aspect of the present invention, there is provided in a address generator circuit for generating addresses in random access memory means for one or more pixels to be extracted from at least one electronic digital input image having a boundary, said extracted pixels thereafter being processed to derive an electronic digital output image, the improvement characterized by the combination of means for deriving from said input image at least one logical electronic digital image located at or within said boundary of said input image, said logical image having at least one pixel and having an arbitrary origin of Cartesian coordinates; means for identifying at least one pixel to be extracted from said logical image; means for scanning said logical image in line and column directions to generate a pair of memory storage addresses, each pair comprising a row storage address and a column storage address in said memory for each of said identified pixels; means for extracting said identified pixel; means for processing each of said extracted pixels by pipeline processing means thereby to obtain a processed output pixel; and means for simultaneously generating a pair of memory storage addresses for each processed pixel, each pair comprising a row storage address and a column storage address in random access memory means, and storing said processed pixel in said memory at said generated pair of addresses.

In accordance with another apparatus aspect of the present invention, there are provided random access memory means in a digital filter circuit and in a digital image processing circuit characterized by a memory organization comprising at least four memory sections, each section being arranged in 4-bit size planes, whereby said memory can store 4-bit, 8-bit, 12-bit, and 16-bit wide digital images; and random access memory means in a look-up table for a digital image filter circuit and for a digital image processing circuit characterized in that said table's lut data comprise numerical luts and-/or binary luts and in that said memory is organized into at least two banks, each bank for storing numerical lut data or binary lut data; and random access memory means in a look-up table for a digital image processing circuit characterized in that said table's lut data comprise numerical luts and/or binary luts and in that said memory is organized into at least two banks, each bank for storing numerical lut data or binary lut data.

In accordance with a method aspect of the present invention, there is provided in a method for processing at least one electronic digital input image having a boundary to derive a processed electronic digital output image, the improvement characterized by the steps of deriving from said input image at least one logical electronic digital image located at or within the boundary of said input image, said logical image having at least one pixel and having an arbitrary origin of Cartesian coordinates; identifying at least one pixel to be extracted from said logical image; scanning said logical image in line and column directions to generate a pair of memory storage addresses in random access memory, each pair comprising a row storage address and a column storage address in said memory for each of said identified pixels; extracting and processing each of said identified pixels by pipeline processing computations to obtain a processed output pixel; and simultaneously generating a pair of memory storage addresses for each processed pixel, each pair comprising a row storage address and a column storage address in random access memory, and storing said processed pixel in said memory at said generated pair of addresses.

In accordance with another method aspect of the present invention, there is provided in a method for generating addresses for random access memory for one or more pixels to be extracted from at least one electronic digital input image having a boundary, said extracted pixels thereafter being processed to derive an electronic digital output image, the improvement characterized by the steps of deriving from said input image at least one logical electronic digital image located at or within the boundary of said input image, said logical image having at least one pixel and having an arbitrary origin of Cartesian coordinates; identifying at least one pixel to be extracted from said logical image; scanning said logical image in line and column directions to generate a pair of memory storage addresses, each pair comprising a row storage address and a column storage address in said memory for each of said identified pixels; extracting and processing each of said identified pixels by pipeline processing computations to obtain a processed output pixel; and simultaneously generating a pair of memory storage addresses for each processed pixel, each pair comprising a row storage address and a column storage address in random access memory, and storing said processed pixel in said memory at said generated pair of addresses.

BRIEF DESCRIPTION OF THE DRAWINGS

FIG. 5B' is a timing diagram pertinent to the operation of address generator 33;

FIG. 5C" is a timing diagram illustrating pixel extraction at HPIX clock rate;

FIG. 5G' is a simplified block diagram showing the arrangement of Image Storage RAM 32 into four 4-bit deep planes;

FIG. 6M" is a timing diagram illustrating the computation of a 1×16 kernel convolution under CT0 and CT1 signals;

FIG. 6M''' is a timing diagram illustrating the computation of a 1×32 kernel convolution under CT0 and CT1 signals;

FIG. 9E is a block diagram of LUT 37 illustrating the data and address signal paths that obtain during processing of an identity function on a 16-bit numerical image using a binary lut, where the eight most significant bits ("MSB") are by-passed through LUT circuit 371;

FIGS. 10A, 10B are timing diagrams useful to explain the operation of the general purpose digital image processing circuit 30 constructed and operated in accordance with the present invention;

FIG. 11 is a block diagram depicting an example of microcode for the operation of the general purpose digital image processing circuit 30 constructed and operated in accordance with the present invention.

Detailed Description

1. System Viewpoint

Figure 2A:
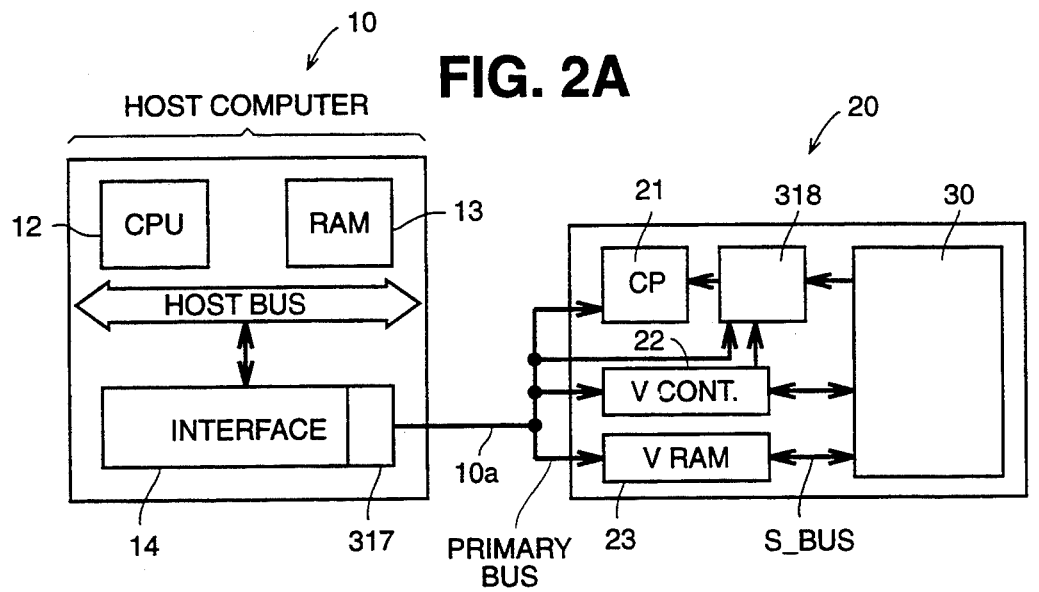
FIG. 2A is a block diagram showing the general aspect of a host computer system 10 operating with a general purpose digital image processing subsystem 20, which incorporates a general purpose digital image processing circuit 30, the subsystem 20 and circuit 30 being constructed and operated in accordance with the present invention.

Referring to FIG. 2A, the general purpose electronic digital image processing circuitry 30 constructed and operated in accordance with the present invention can be incorporated in a general purpose electronic digital image processing subsystem 20. One example of intended use for subsystem 20 is in an encoding subsystem of the kind described in the above-identified '564 patent.

The subsystem 20 is connected via cable 10a to interface circuitry 14. The purpose of interface circuitry 14 is to enable the subsystem 20 to be compatible with the architecture of the host computer 10, which can embody, for example, conventional MicroChannel Architecture ("MCA" architecture). The interface 14 includes a control register 317, and the subsystem 20 includes a status register 318. The host computer 10 additionally incorporates a central processing unit ("CPU") 12, RAM 13, and peripherals (not illustrated).

Figure 2B:
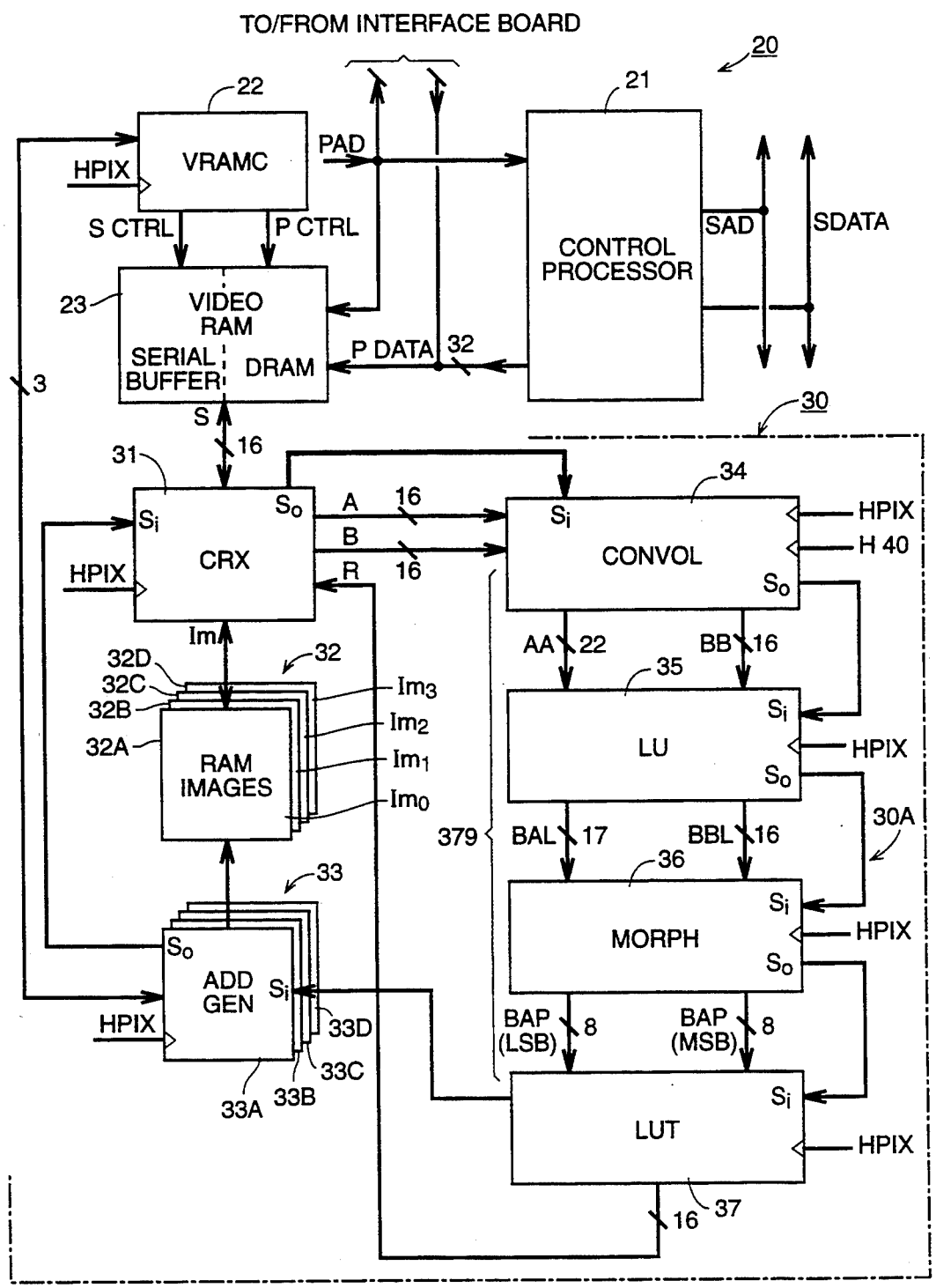
FIG. 2B is a block diagram showing a preferred embodiment of said processing circuit 30.
Figure 2C:
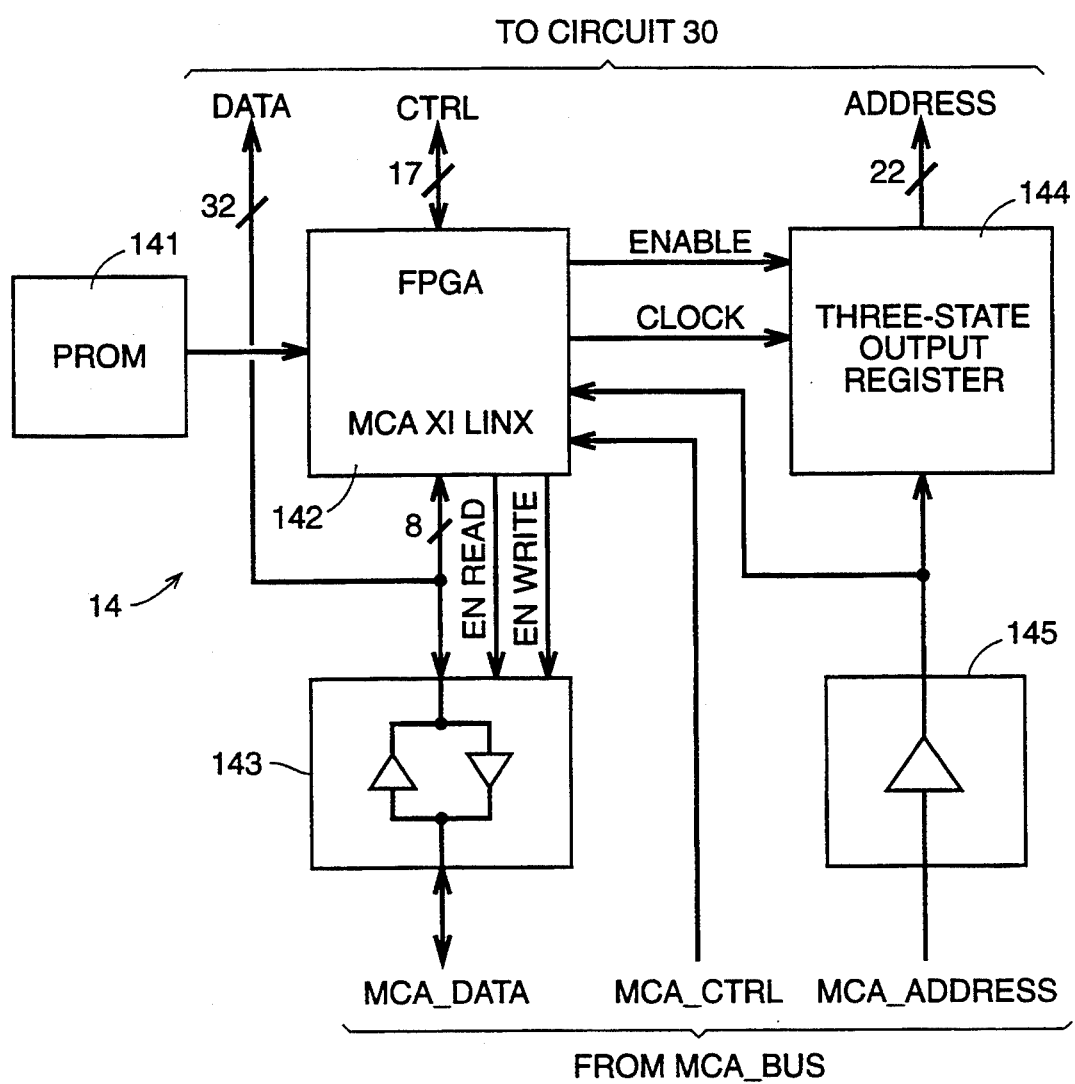
FIG. 2C is a block diagram showing details of the interface 14 also described with reference to FIG. 2A.

Referring to FIG. 2C, the interface circuitry 14 includes circuitry for connecting Data ("MCA-DATA"), Control ("MCA-CTRL"), and Address ("MCA-ADDRESS") signals from the MCA bus to the circuitry 30 in a Slave mode. To perform this function, the interface circuitry 14 comprises a programmable ROM ("PROM") 141, which operates on power-up of the host computer 10 to initialize a standard FPGA chip (MCA XILINX chip) 142. In operation, chip 142 sends requests for data to the VRAM controller 22 and receives acknowledgement of those requests. Under the control of "enable" and "clock" signals from the FPGA chip 142, a conventional three state output register 144 provides address information from the MCA bus via circuit 145 to VRAM 23. Three states are required to account for the competing requests for addresses by the VRAM controller 22, the control processor 21 (FIG. 2A), and the host computer 10 via the chip 142. Control signals from the MCA bus schedule the transfers between host computer RAM memory 13 and video RAM 23. Data signals from the MCA bus are directly coupled via the transceivers 143 and the DATA line to the control processor 21 and the video RAM 23. Eight LSB bits from the MCA Data bus are used to configure internal Programmable Option Set registers (defined in MCA architecture) in FPGA chip 142 at system initialization and to provide control via the read/write control register 317 of the host computer 10 (FIG. 2A).

In accordance with the invention, the subsystem 20 (FIG. 2A) incorporates a digital signal processor 21 acting as a control processor ("CP"), a video RAM controller 22, video RAM 23, and a general purpose digital image processing circuit 30 constructed and arranged for operation in accordance with the present invention.

Figure 3:
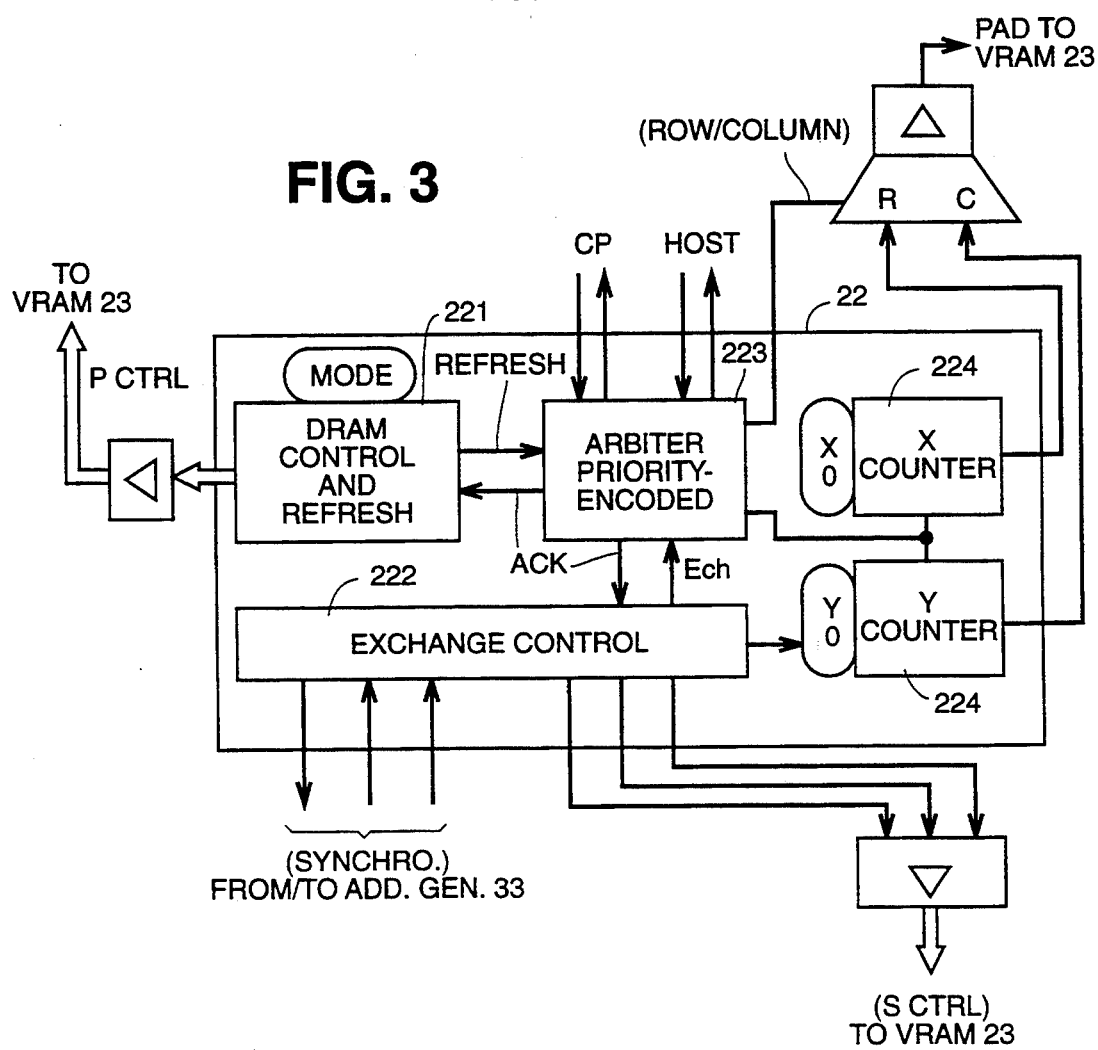
FIG. 3 is a block diagram showing the general aspect of a video RAM controller ("VRAMC") 22 also described with reference to FIG. 2B.

The general aspect of video RAM controller 22 is depicted in FIG. 3. Referring to FIG. 3, the controller 22 incorporates an address generator 224 comprising X and Y counters for generating VRAM addresses. Block 221 provides RAS, CAS, Refresh and States signals for video RAM 23 on the primary bus or P_Bus (FIG. 2A). Exchange control block 222 provides synchronization signals to control the timing of data exchange on S_Bus. Arbiter block 223 controls the flow of data on the primary bus (P_Bus) in response to requests from the host CPU 12 and the CP 21, and in response to requests for Refresh and Exchange signals.

Figure 10A:
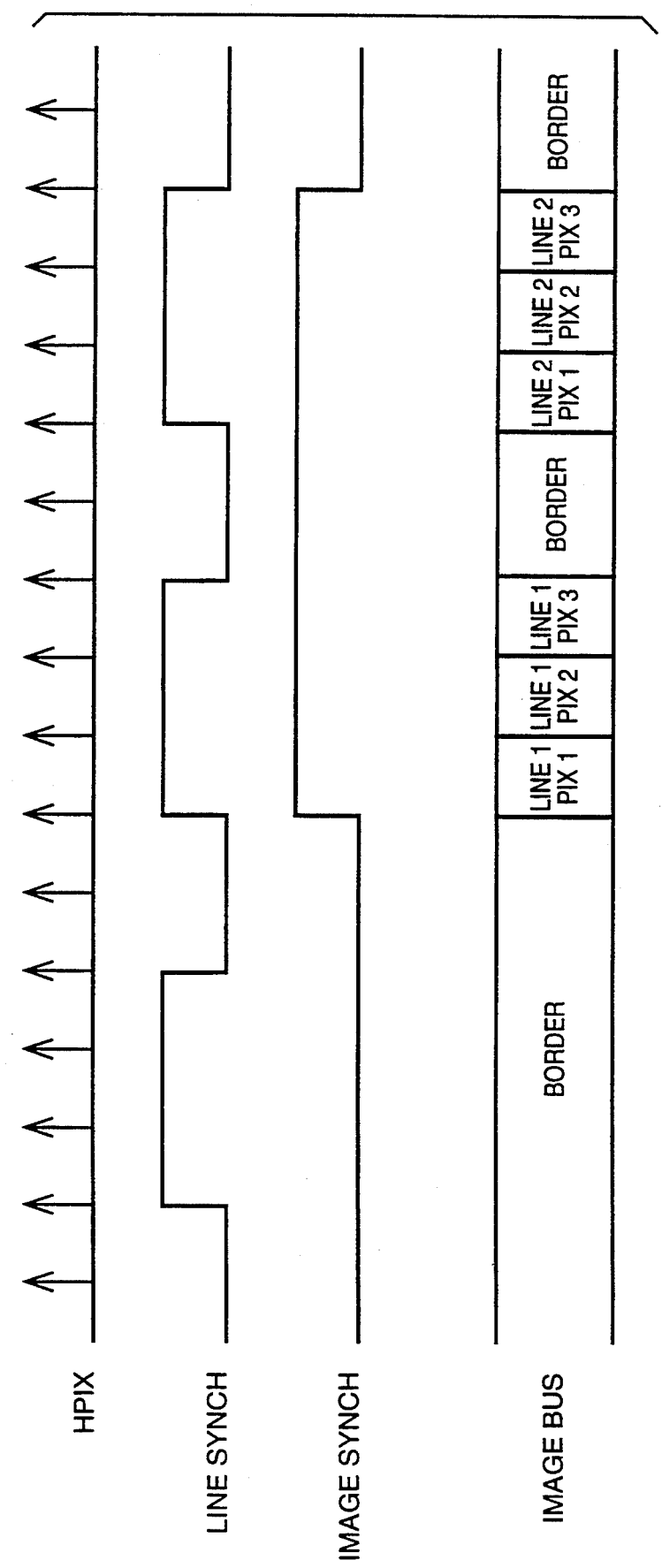

In general, the control register 317 (FIG. 2A) in conjunction with the status register 318 functions to synchronize the operation of host computer 10 and the image processing subsystem 20. Upon power up the subsystem 20 is placed in a reset state so that the host configuration system process can run. The VRAM controller is initialized. Program code and data are loaded into VRAM 23 (FIG. 1A), e.g., object code and data for control processor 21, object code and data (commands CMD 1 to CMD N) for the operation of circuit 30; additionally, look-up table data are loaded into the LUT RAM 372. All the programmable chips are programmed and initialized with default values. Following initialization, the control processor 21 proceeds through an idle loop (FIG. 11) in which it repeatedly reads the status register 318 (FIG. 2A) looking for a GO signal asserted by the host computer 10 (FIG. 10B).

Figure 1A:
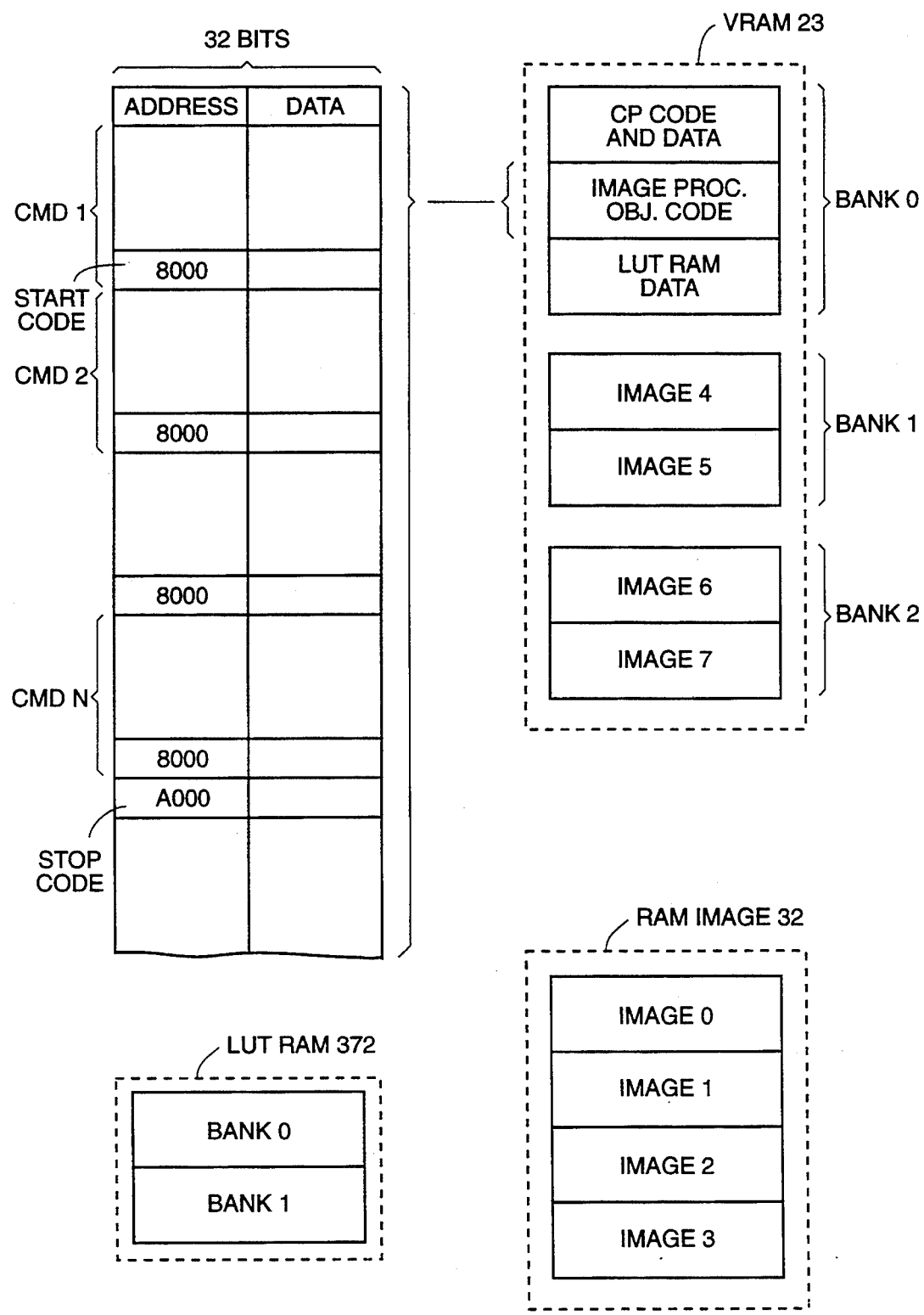
FIG. 1A is a block diagram depicting the general assignment of memory locations in the video RAM 23, Image Storage ($Im_0$–$Im_3$) RAM 32, and LUT RAM 372 in a preferred embodiment of a general purpose digital image processing circuit 30 constructed and operated in accordance with the present invention.

The control register 317 is activated to run the CMD programs, i.e., CMD 1 to CMD N (FIG. 1A), stored in the VRAM 23. When the programs have run, a status flag is set and informs the host computer 10 (FIG. 2A) that a processed image is stored in VRAM 23 (FIG. 2B). The host computer 10 copies that processed image to RAM 13, for subsequent use, e.g., for minutiae extraction when the subsystem 20 is used in conjunction with the fingerprint identification system of the aforesaid '564 patent.

In accordance with the present invention, electronic images can be stored anywhere in VRAM 23 and Image Storage RAM 32.

Figure 1B:
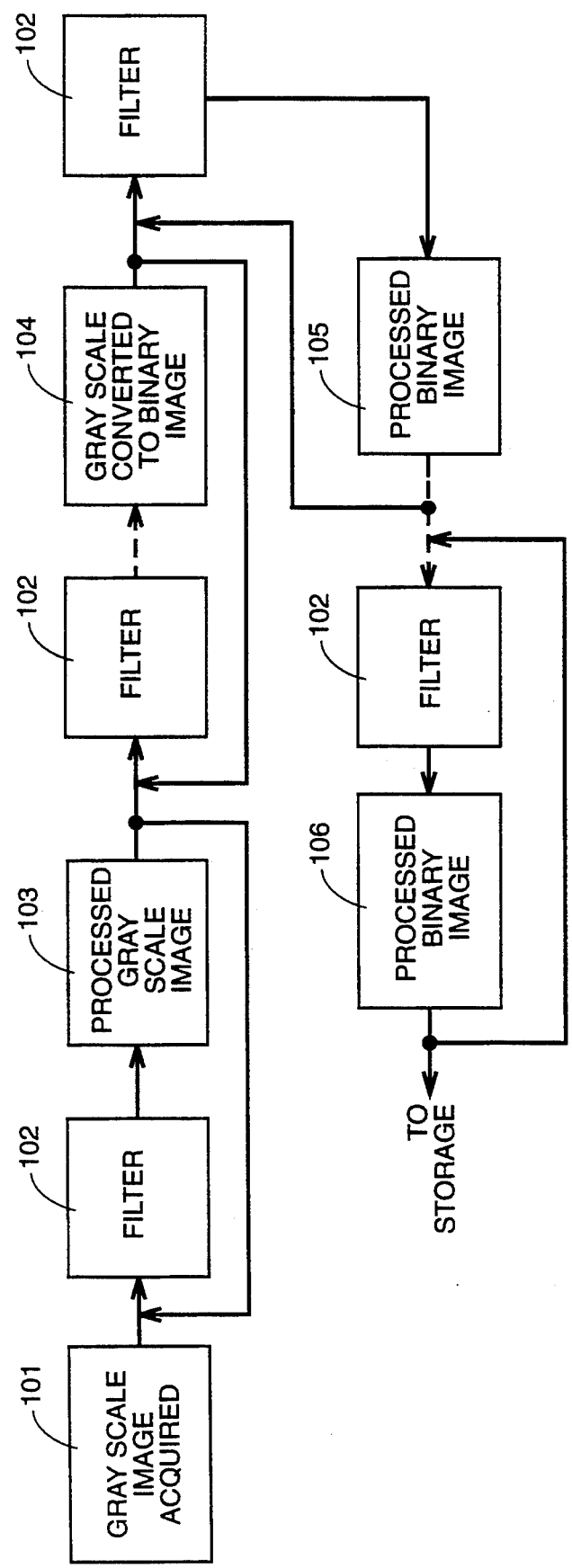
FIG. 1B is a block diagram illustrating an example of one specific use of the general purpose digital image processing circuit 30 constructed and operated in accordance with the present invention.

FIG. 1B shows a specific example of a generalized process performed by the general purpose digital image processing circuit 30 (FIG. 2B) from the time an electronic digital image 101, regardless of its source and data content, is acquired by the host computer 10 and stored in VRAM 23 until the image processing functions are performed and result in production of a processed electronic digital image 106, which is copied by host computer 10 to RAM 13 for subsequent processing. In accordance with the invention, the circuit 30 is operated by the CMD programs stored in VRAM 23 and provides digital image filtering and processing functions, as many times as required by the user, with respect to gray scale digital images and/or binary digital images, to obtain the desired processed digital image, which is copied from Image Storage RAM 32 to VRAM 23 and thence to host computer RAM 13 for further processing.

It is to be understood that other specific examples of a generalized process performed by the general purpose digital image processing circuit 30 include (1) repetitive digital image filtering of a gray scale image as indicated by the feedback loop on image 103 (FIG. 1B) to produce a processed digital image available to the host computer; (2) repetitive digital image filtering of a converted image 104, as indicated by its feedback loop, to produce a processed digital image available to the host computer; (3) repetitive digital image filtering of binary images 105 and 106 as indicated by their feedback loops (FIG. 1B) to produce a processed digital image available to the host computer; and (4) other combinations of feedback looping (not depicted) to obtain repetitive filtering and processing of whichever digital images in whatever combinations the user selects, to produce a processed digital image available to the host computer.

The host computer 10 requests the subsystem 20 to operate by setting the GO signal in the register 317 (FIGS. 10B, 11). In idle state, the control processor 21 polls the status register 318 while waiting for the GO signal to start an image processing computation task.

An image processing computation task is a sequence of commands (CMD) ending with a STOP CODE (hexadecimal A0000000). Each command is made up of 32-bit words, the left-most 16 bits or most significant bits ("MSB") of which constitute the address of an internal register incorporated in unit 30 and the right-most 16 bits or least significant bits ("LSB") of which constitute data to put into that register. Each command ends with a START CODE (hexadecimal 80000000).

Following initialization, the control processor 21 proceeds through an idle loop (FIG. 11) in which it repeatedly reads the status register 318 (FIG. 2A) looking for a GO signal asserted by the host computer 10 (FIG. 10B). A GO signal is asserted when an electronic digital image is acquired by the host computer 10, which copies that image to VRAM 23 and activates the control register 317 and sets the status register 318 (FIG. 2A).

Upon assertion of a GO signal, the control processor 21 reads and interprets the commands CMD 1–CMD N (FIG. 1A) and goes through one or more programmation loops and one or more processing loops (FIG. 11).

In particular, during the elapsed time interval "a" (FIG. 10B) between assertion of the GO and MANIP signals, all of the dedicated internal registers in circuit 30 are programmed. After control processor 21 asserts the MANIP signal to start a processing loop, address generator 33 begins to assert synchronization signals (FIG. 10B). At the end of elapsed time interval "e" (FIG. 10B) the synchronization signals are asserted by the last stage of the processing circuit 30, i.e., LUT 37, the time interval "e" being representative of computational time delay in circuit 30. The control processor 21 reasserts the MANIP signal depending on whether further image data are to be processed, as indicated by the presence or absence of image synchronization signals produced by the address generator (FIG. 10B).

When a stop code, hexadecimal A0000000 (FIG. 1A) is reached, the control processor 21 asserts the EXE signal (FIG. 10B) to end the processing cycle and to reenter the idle loop.

2. General Purpose Digital Image Processing Circuit 30

The preferred embodiment of general purpose digital image processing circuitry 30 constructed and operated in accordance with the present invention is depicted in block diagram form in FIG. 2B. The circuitry 30 includes crossbar ("CRX") unit 31, Image Storage RAM 32, address generator ("ADD GEN") 33, convolution ("CONVOL") unit 34, logic ("LU") unit 35, morphological ("MORPH") unit 36, and look-up table ("LUT") unit 37. Sufficient memory is provided in RAM 32 to provide four sections (32A–32D) of memory, $Im_0$–$Im_3$, separately to store simultaneously four $512 \times 512 \times 16$ bit electronic images ($Im_0$ to $Im_3$) which can be gray scale and/or binary images.

In operation of circuit 30, RAM 32 can simultaneously store an acquired electronic digital image transmitted for processing by host computer 10 ($Im_0$), two images ($Im_1$, $Im_2$) at various intermediate stages of processing by the circuitry 30, and a processed digital image for transmittal to the host computer ($Im_3$). A separate address generator 33 (four in total number) is provided for each section (32A–32D) of Image Storage RAM 32, i.e., generators 33A–33D.

In accordance with the present invention, the processing circuitry 30 embodies pipeline architecture, which advantageously enables the greatest number of processing operations and computations to be performed within the shortest possible overhead time. Other interconnections and operation of components of the kind embodied in circuit 30 are not nearly as efficient as the pipeline architecture embodied in circuitry 30.

Parallel processing as embodied in circuitry 30 means that the following operations can be performed at the same time, e.g., transfer of an image between VRAM 23 and RAM 32 and processing of a previously transferred image in circuit components 34, 35, 36, 37, can be performed at the same time.

The address generator 33 constructed and operated in accordance with the present invention plays a key role in the parallel processing performed by circuitry 30, as is described elsewhere herein, in that computation and exchange-of-data (transfer) modes run at the same time.

A. Crossbar Unit 31

Figure 4:
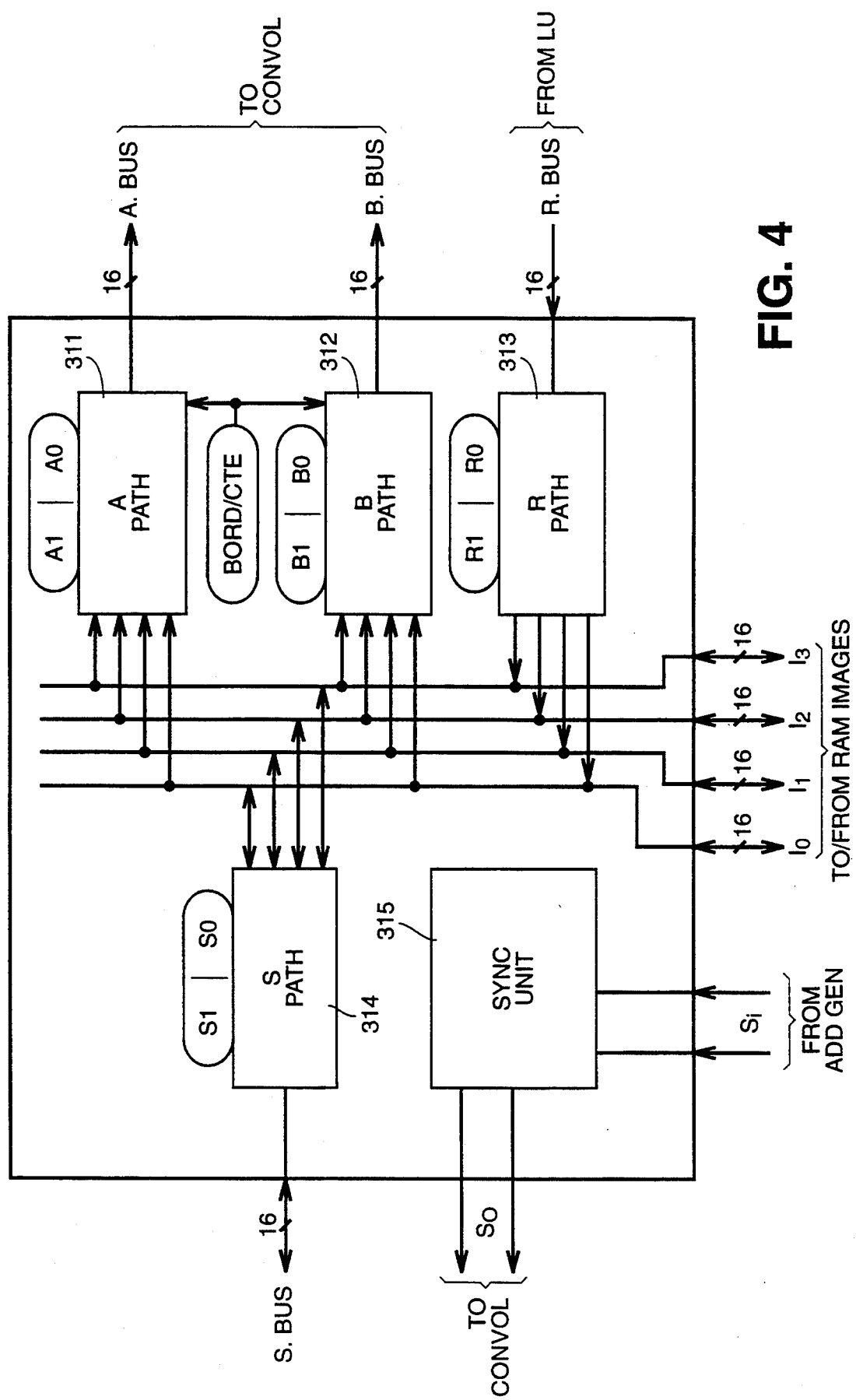
FIG. 4 is a block diagram showing the general aspect of a crossbar unit ("CRX") 31 incorporated in said processing circuit 30 also described with reference to FIG. 2B.
Figure 4A:
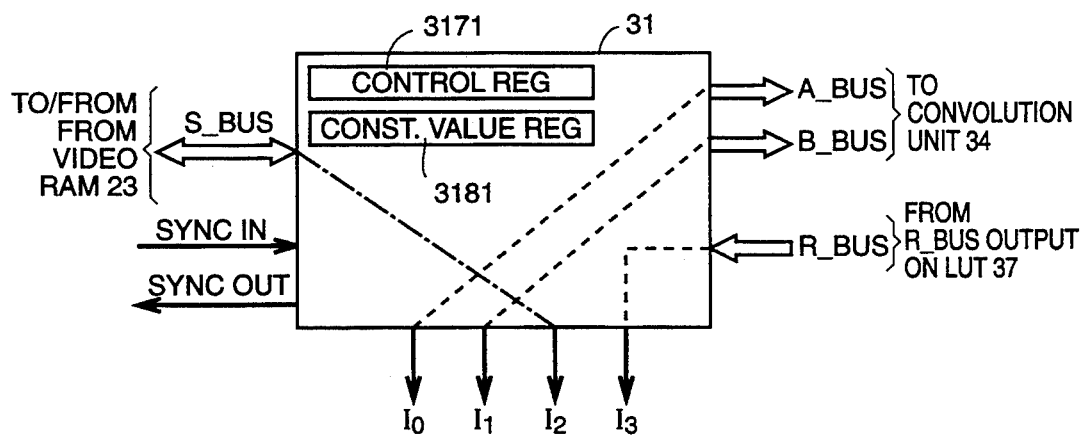
FIG. 4A is a block diagram showing an example of specific functions performed by CRX 31.

The functions and purposes of the crossbar unit ("CRX") 31, whose general aspect is depicted in FIGS. 4, 4A, include the provision of read/write communication between video RAM 23 and Image Storage RAM 32 via S_Bus, the placement of images stored in Image Storage RAM 32 via lines $I_0$–$I_3$ upon A_Bus and/or B_Bus for transmittal to CONVOL unit 34, and the connection of processed images received from LUT unit 37 via R_Bus for transmittal to Image Storage RAM 32 via lines $I_0$–$I_3$.

Referring to FIG. 4A, the CRX unit 31 includes two programmable registers, i.e., control register 3171 and constant value register 3181. The control register 3171 is programmed to determine which buses, i.e., A_Bus, B_Bus, S_Bus and R_Bus, are connected to which image lines, i.e., $Im_0$, $Im_1$, $Im_2$, and $Im_3$, of the Image Storage RAM 32. In the example depicted in FIG. 4A, A_Bus, B_Bus, and R_Bus are connected respectively to 16-bit image lines $I_0$, $I_1$, and $I_3$, while S_Bus is connected to 16-bit image line $I_2$.

Referring to FIG. 4, blocks 311, 312, and 313 depict respectively the operand connection for 16-bit images on image lines $I_0$–$I_3$. Block 314 depicts the operand connection of 16-bit images via S_Bus on images lines $I_0$–$I_3$. Register 3181 is initialized to provide both the definition of the border of an image and also to set a constant pixel value on B_Bus.

Synchronization for operating CRX unit 31 is provided by unit 315 under the control of synchronization signals, $S_i$ ("$i$"=input) provided by address generator 33. CRX synchronization unit 315 couples synchronization signals, $S_0$ ("$o$"=output), to the CONVOL unit 34.

B. Address Generator 33

In order to process an acquired image stored, for example, as image $Im_0$ in Image Storage RAM 32 (FIG. 2B), it is necessary to extract pixels from the image $Im_0$ ("source image") and produce an address in Image $Im_1$, $Im_2$ or $Im_3$ to which to write the pixels processed by the processing chain comprising units 34, 35, 36, and 37 ("result image"). The address generator 33 performs the address generation for pixel extraction and pixel writing functions. As noted elsewhere herein, one address generator 33 for a total of four, i.e., 33A, 33B, 33C, and 33D, is provided for each Image Storage RAM 32 section 32A–32D, i.e., Im$_0$, Im$_1$, Im$_2$ and Im$_3$.

Figure 5A:
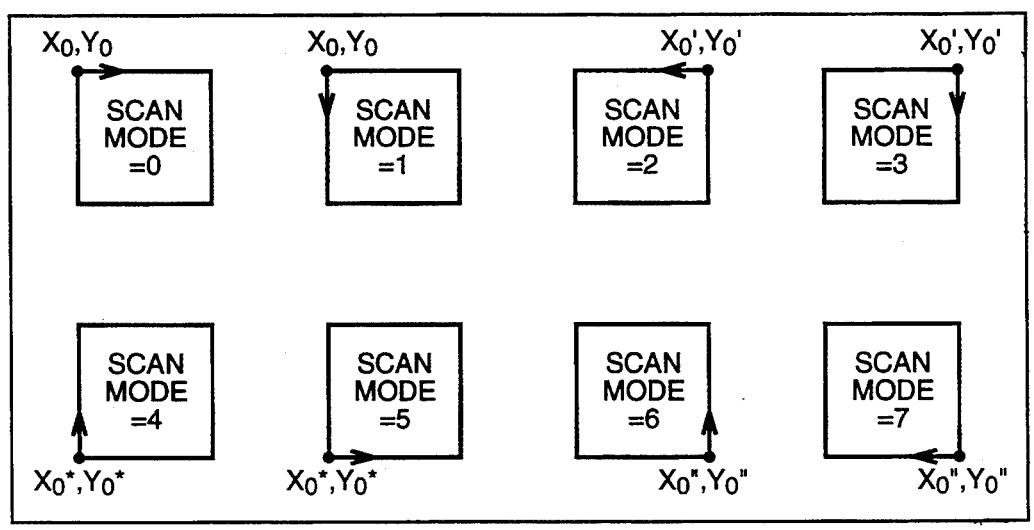
FIG. 5A is a diagram illustrating image scan or scanning directions.
Figure 5:
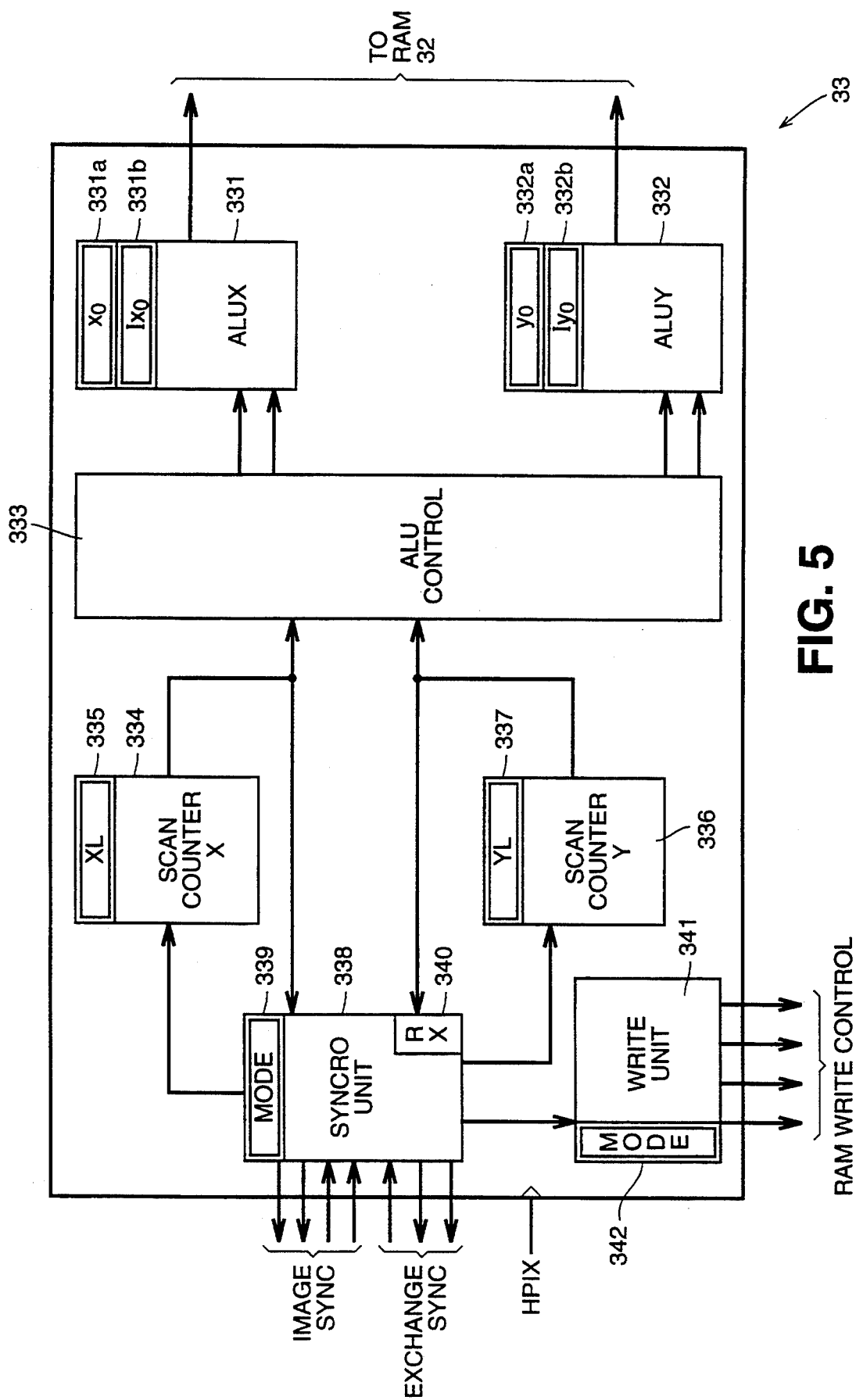
FIG. 5 is a block diagram showing the general aspect of an address generator ("ADD GEN") 33 incorporated in said processing circuit 30 and also described with reference to FIG. 2B, said generator 33 being constructed and operated in accordance with the present invention.
Figure 5B:
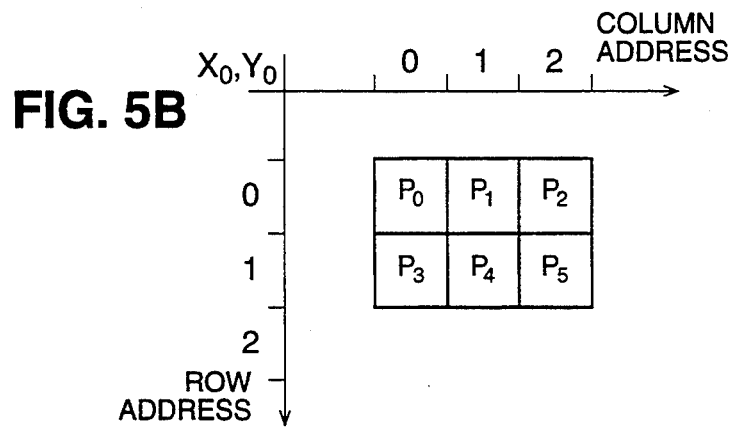
FIG. 5B is a diagram illustrating coordinates of an electronic image composed of six pixels in a 2×3 array.
Figure 5B:
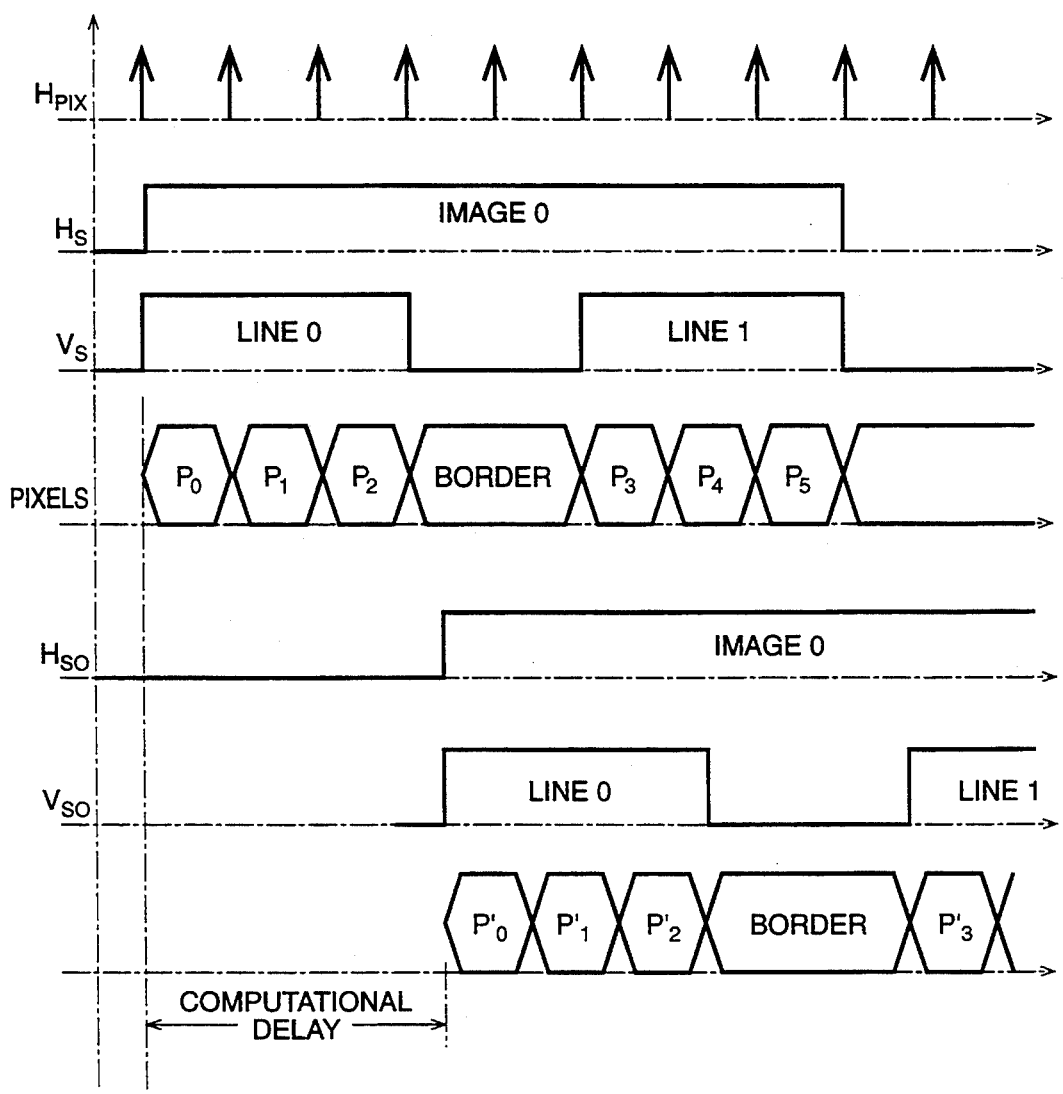
Figure 5C:
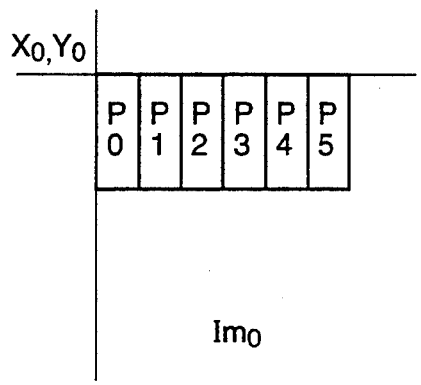
FIGS. 5C and 5C' are diagrams illustrating pertinent aspects of pixel extraction performed by address generator 33.
Figure 5C:
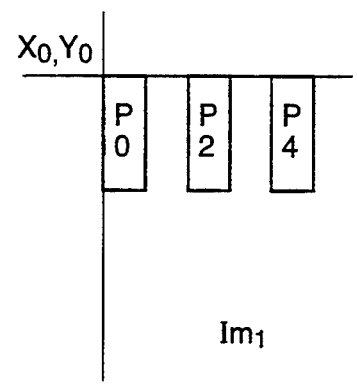
Figure 5C:
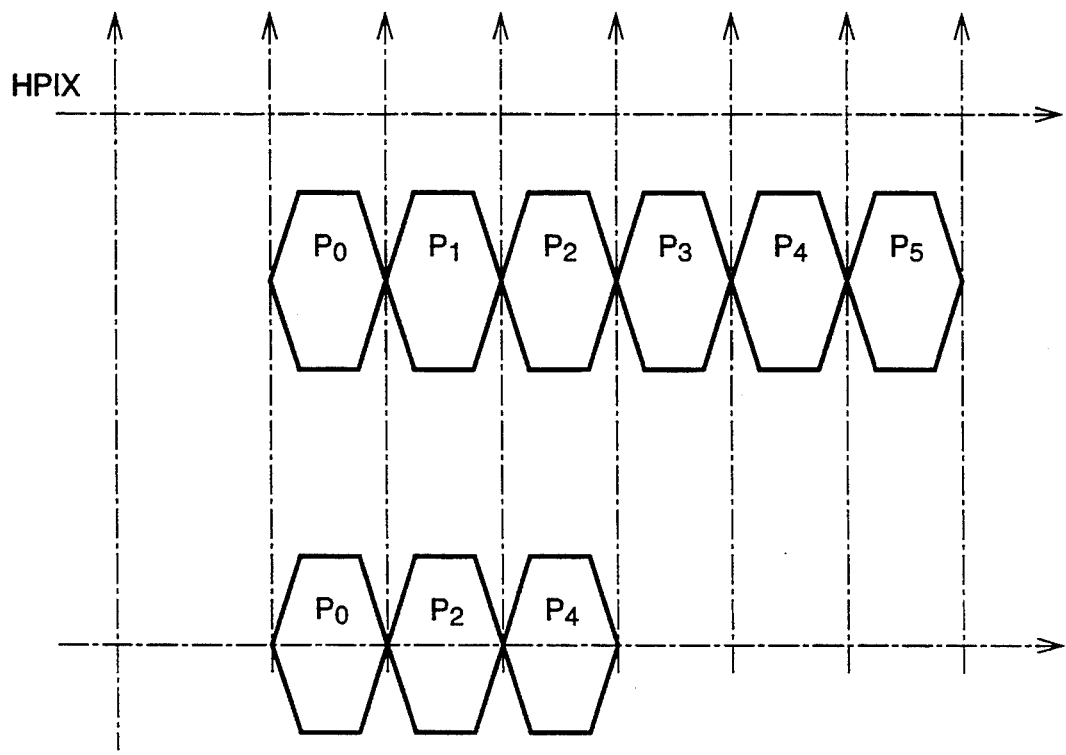
Figure 5D:
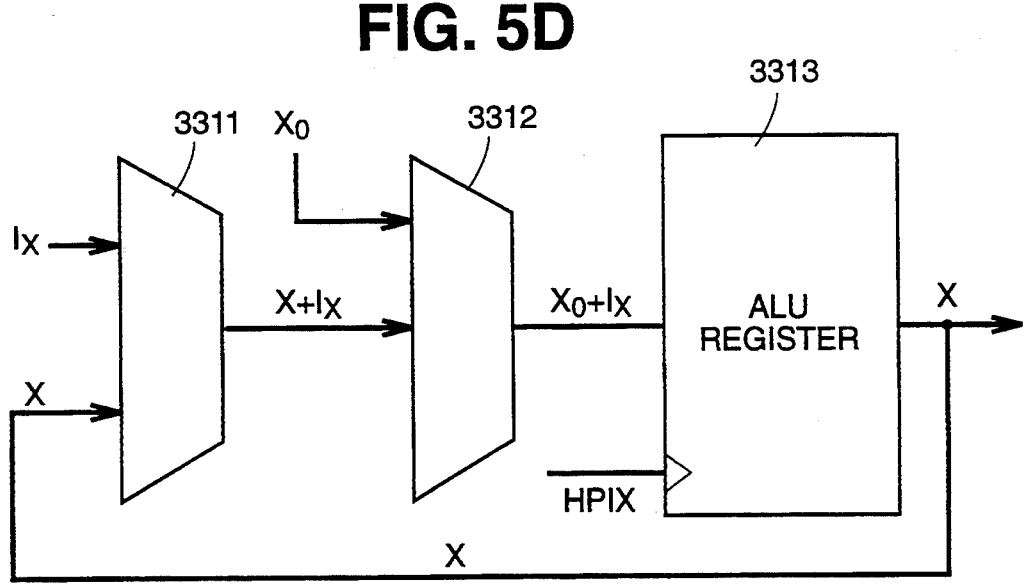
FIGS. 5D and 5D' are block diagrams showing the general aspect of ALUX 331 and ALUY 332 incorporated in address generator 33 described with reference to FIG. 5.
Figure 5D:
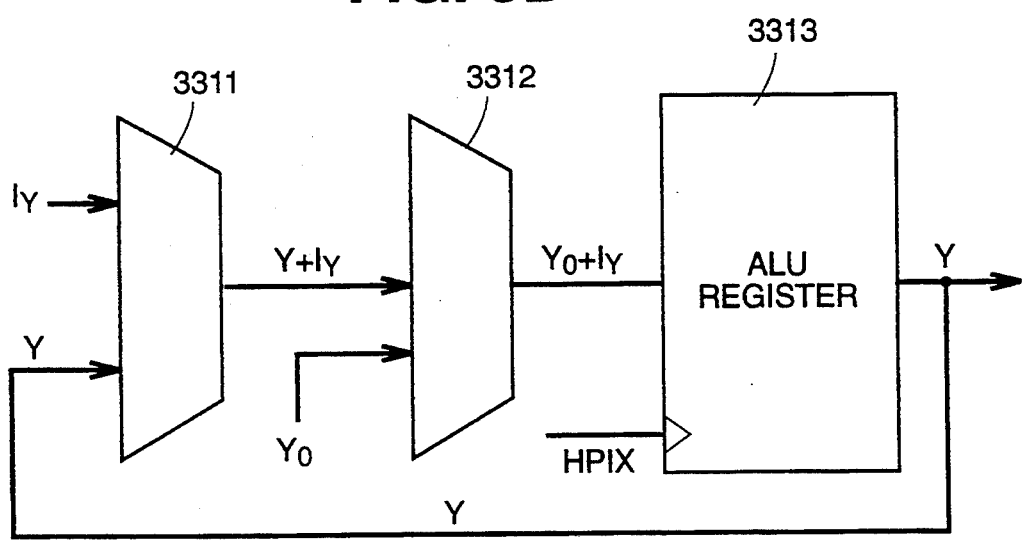
Figure 5E:
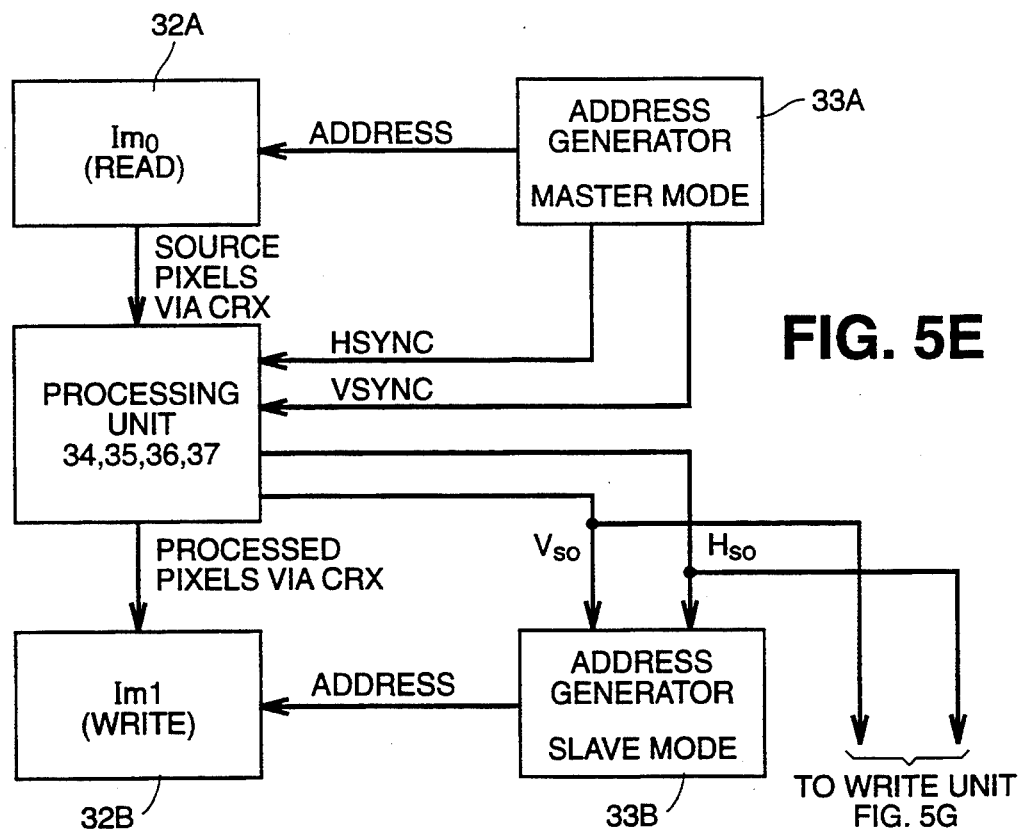
FIG. 5E is a block diagram showing pertinent aspects of the synchronization by address generator 33 of certain components of the digital image processing circuit 30 described with reference to FIG. 2B.
Figure 5F:
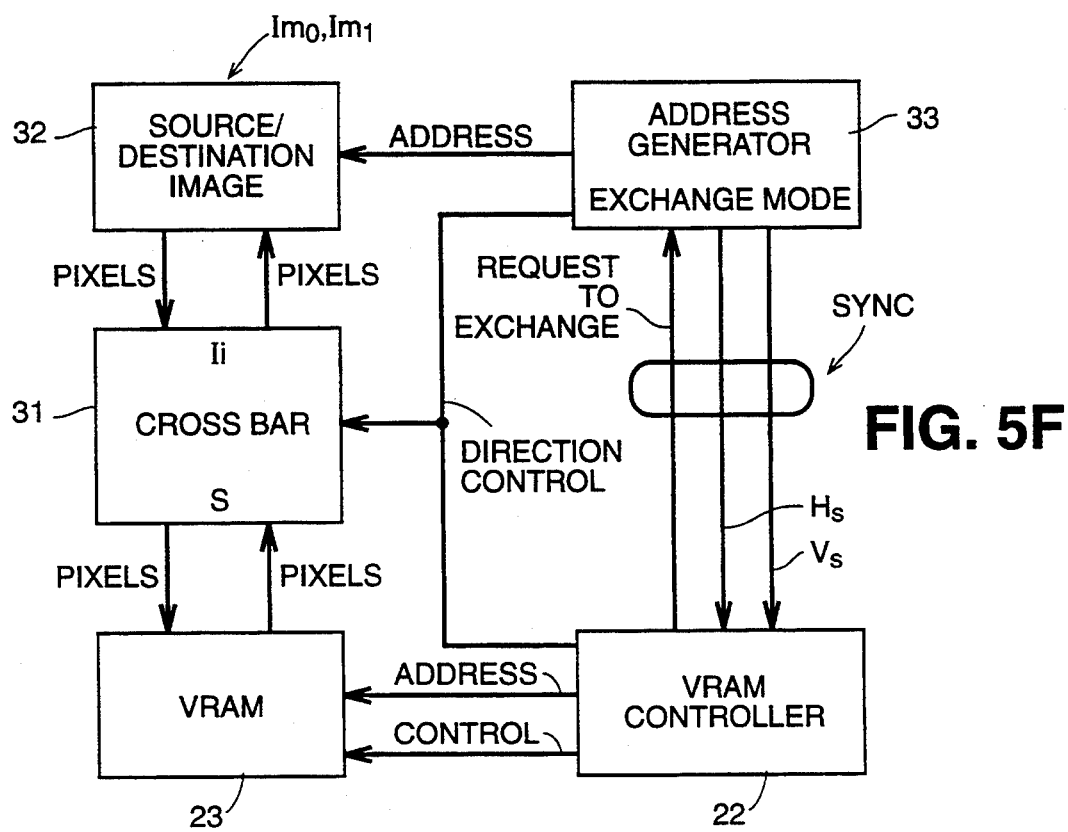
FIG. 5F is a block diagram showing the general aspect of the exchange of image information between Image Storage RAM 32 and VRAM 23, under the control of address generator 33.

Each address generator unit 33 (FIG. 5) has three possible modes of operation, i e., "Master" mode (FIG. 5E), "Slave"mode (FIG. 5E), and "Exchange" mode (FIG. 5F). A generator 33 cannot simultaneously operate in Master and Slave modes, or in Exchange and any other mode.

Figure 5G:
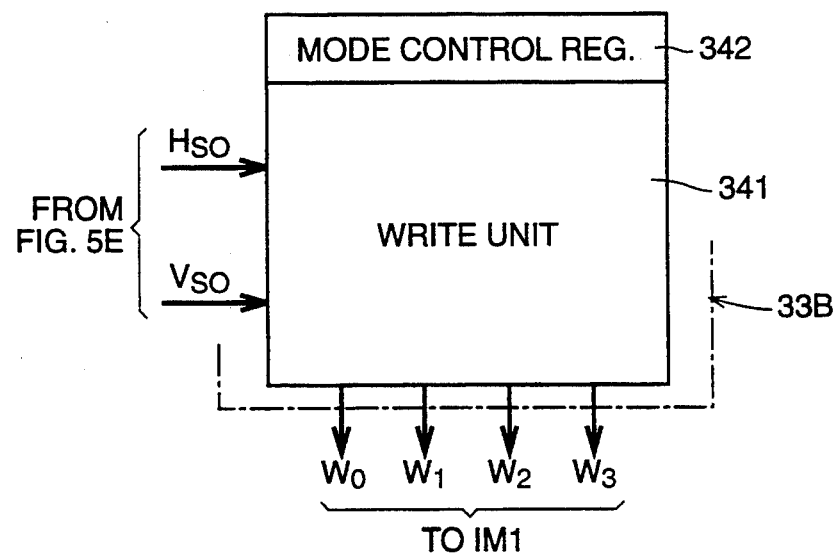
FIG. 5G is a block diagram showing the general aspect of the writing of image data to Image Storage RAM 32 by address generator 33.
Figure 5G:
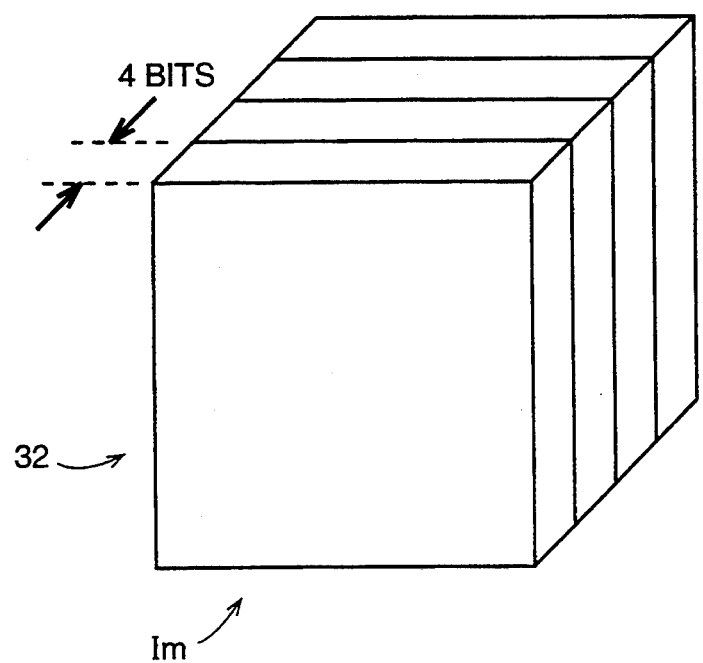

Addresses for pixels to be processed, i.e., source image pixels, are generated by an address generator 33 operating in Master mode, e.g., generator 33A (FIG. 5E). Addresses for pixels that have been processed by units 34, 35, 36, 37, i.e., result image pixels, are generated by an address generator 33 operating in Slave mode, e.g., generator 33B (FIG. 5E). As addresses are generated by generator 33B, the processed pixel data are written to Image Storage RAM by Write unit 341 (FIG. 5G) of generator 33B. Synchronization unit 338 (FIG. 5) of generator 33A (FIG. 5E) provides horizontal and vertical synchronization signals (hereinafter H$_{sync}$, V$_{sync}$) for the processing chain, units 34, 35, 36, 37. Unit 37 provides horizontal and vertical synchronization signals (V$_{so}$ and H$_{so}$) for generator 33B (FIG. 5E) and its Write unit (FIG. 5G).

In Exchange mode (FIG. 5F), an address generator 33 causes pixels to be written to Image Storage RAM 32, e.g., memory Im$_0$, from VRAM 23 via CRX unit 31 or causes pixels to be written to VRAM 23 from Image Storage RAM 32, e.g., memory Im$_p$, via CRX unit 31. Synchronization signals H$_s$, V$_s$, are provided by generator 33. Direction control and request to read/write signals are provided by generator 33 and VRAM controller 22.

Address generation involves an image scan or scanning process; eight image scanning directions or scan modes from any one of four arbitrary origins of coordinates, e.g., X$_0$, Y$_0$, X$_0^1$, Y$_0^1$; X$_0^*$, Y$_0^*$; X$_0^{11}$, Y$_0^{11}$, can be produced by address generator 33 (FIG. 5A). Coordinate system origins can be located anywhere. Initial values for the coordinate system origin are stored during initialization in X$_\phi$, Y$_\phi$ registers at 335, 337 (FIG. 5).

Images can be scanned to extract various numbers of pixels, e.g., all pixels (FIGS. 5B, 5B'), one or more pixels out of n pixels, every other pixel (FIGS. 5C, 5C$^1$, 5C$^{11}$), i e. a subsampling process to decrease the size of an electronic image, or by oversampling to increase the image size. In the oversampling process of the present invention, a series of pixels P$_0$, P$_1$, P$_2$, ..., P$_n$ is sampled in such manner that the resultant image is a series of pixels, e.g., P$_0$, P$_0$, P$_0$; P$_1$, P$_1$, P$_1$; P$_2$, P$_2$, P$_2$; ... ; P$_n$, P$_n$, P$_n$, i.e., a gap of two pixels width has been inserted after each source pixel. The size of the gap can be varied to any desired width up to 16. In the oversampling process the address generator Slave mode is used to increment the address by the amount of the size of the gap selected.

The scanning process and the address generating process involve implementation of a kind of counter in the generator 33. The counter is constructed and implemented to increment or decrement by any desired amount less than 16. The origin coordinates (X$_0$, Y$_0$) and the amount of incrementation or decrementation (IX$_\phi$, IY$_\phi$) are set during initialization or during the running of certain CMD commands.

In Master mode, the synchro unit 338 (FIG. 5) of generator 33 (1) generates H$_s$ and V$_s$ synchronization signals and (2) generates the size of a border to surround the image (hereinafter from time-to-time referred to as "ghost pixels"). In Slave mode, the synchro unit 338 performs one function in relation to H$_{so}$/V$_{so}$ signals, enables, i.e., unit 338 generates destination addresses for processed pixels. Only "good" processed pixels, not ghost pixels, are written to the Image Storage RAM 32 during the Slave mode of operation. In accordance with the invention, the Write unit 341 (FIG. 5G) operates only when H$_{so}$ and V$_{so}$ are high, thus preventing the writing of ghost pixels, which occur only when V$_{so}$ is low (see waveforms in FIG. 5B').

Figure 5I:
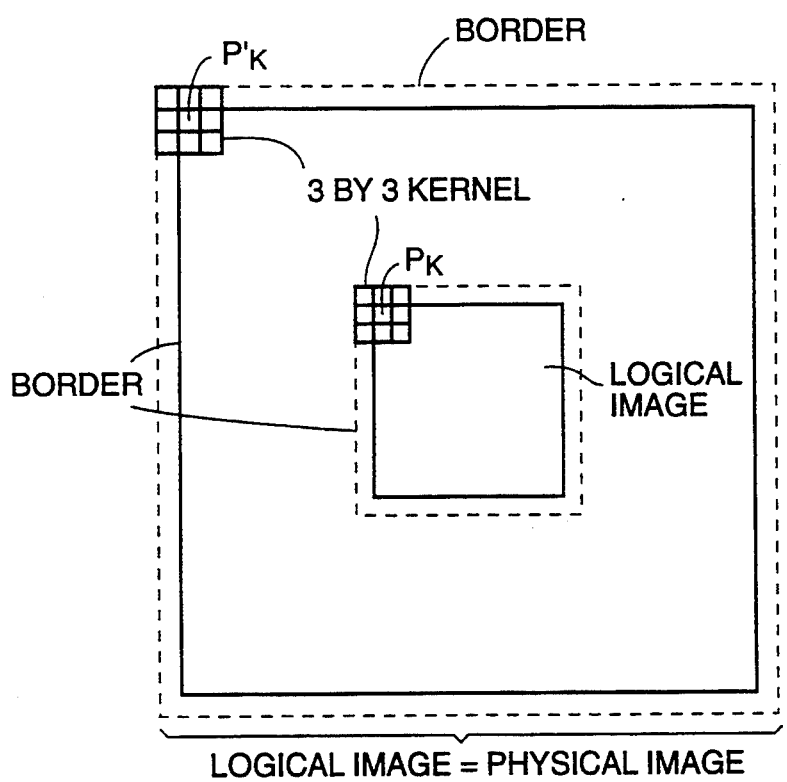
FIG. 5I is a diagram illustrating the relationship between a physical image and a logical image and the use of ghost pixels to define image borders.

In conventional digital image processing circuitry, the selection of kernels for processing is limited to kernels located completely inside the physical image border. In accordance with the present invention, the use of logical images and ghost pixel borders enables the user of circuit 30 to select kernels (FIG. 5I), e.g., pixel P$_k$, close to the border of the physical image by adjusting the size of the ghost pixel border surrounding the logical image. Additionally, by surrounding the physical image border or boundary with a ghost pixel border of any desired width dependent upon the shape of the kernel, e.g., one pixel wide as is depicted in FIG. I, logical images right at the physical image border, e.g., image P$_k^1$ (FIG. 5I), can be readily processed.

Figure 5H:
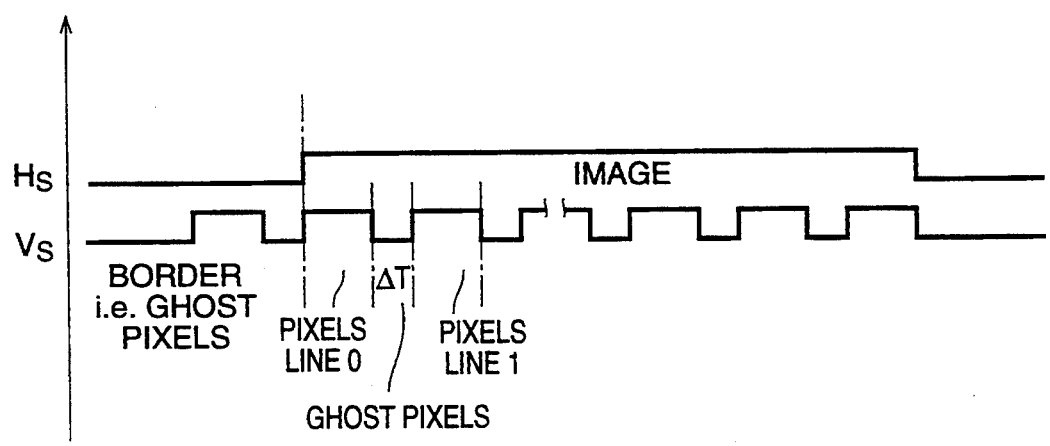
FIG. 5H is a timing diagram pertinent to image scanning by address generator 33.

In the scanning process performed by address generator 33, ghost pixels are produced during the flyback interval, Δt, which follows the scan of a line of pixels in the logical image (FIG. 5H). The size of the ghost pixel border can be adjusted, for logical images well inside the physical image border, by adjusting the flyback interval. Thereby, the circuit 30 both allows the making of certain computations on kernels that include ghost pixels, which are not otherwise possible in conventional practice, and also allows the user of circuit 30 properly to construe the results of such computations.

The size of an image line, i.e., the number of pixels in a line, is programmed initially in the X$_L$ register 335 of the Scan (X) Counter 334. The size of an image, i.e., the number of lines, is programmed initially into the Y$_L$ register 337 of the Scan (Y) Counter 336.

X and Y address data are provided by operation of ALU X unit 331, ALU Y unit 332, and ALU Control 333 (FIG. 5). Initial X$_0$ and IX$_0$ data are programmed into registers 331$a$, 331$b$ (FIG. 5). Similarly, initial Y$_0$ and IY$_0$ data are programmed into registers 332$a$, 332$b$ (FIG. 5).

FIG. 5B shows an example of a 2×3 pixel logical image, where each pixel comprises 16 bits, located in a coordinate system of origin X$_0$, Y$_0$. Image scanning is performed in the positive X-direction (FIG. 5A, SCAN MODE=0). FIG. 5B' depicts a timing diagram showing the extraction of all pixels in the logical image depicted in FIG. 5B FIGS. 5C, 5C' and 5C" also depict image scanning in the positive X-direction of a six pixel linear image from which every other pixel is extracted by the scanning process.

FIGS. 5D and 5D' depict the general aspect of the counters, ALU X unit 331 and ALU Y unit 332 (FIG. 5). Referring to FIG. 5D, at the start of scanning the X$_0$ value is loaded into the X ALU register 3313 through the multiplexer 3312, providing the first X address. For the next cycle (i.e., the next pixel or the next line depending on the way the image is scanned), the X value is added with the increment value IX through the add-/subtract circuit 3311 to produce the X+IX address which is fed back to the 3311 circuit. The incrementing process is continued until the end of the line or the end of the image depending on the scanning. FIG. 5D' is identical to FIG. 5D and performs the same process to calculate the desired address Y-values.

Figure 5J:
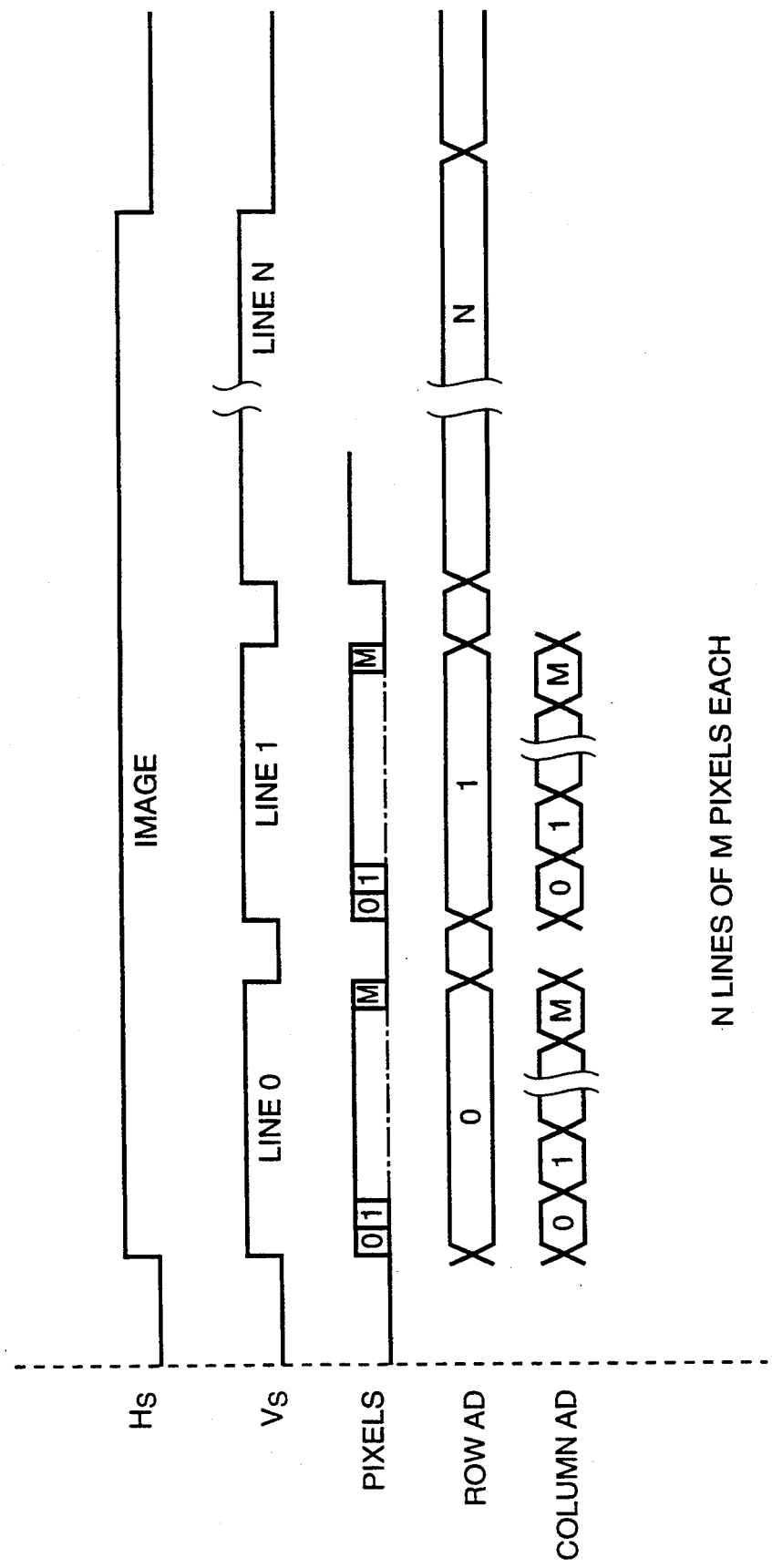
FIG. 5J is a timing diagram illustrating the way ROW and COLUMN addresses are incremented in a normal scanning of an n lines by m pixels image.

In summary, given an n×m pixel image containing n lines (rows) and m columns (m pixels per line), it is necessary for the incrementing counters depicted in FIGS. 5D, 5D' to produce n line addresses and n×m column addresses (FIG. 5J). In operation, the ALU Control unit 333 (FIG. 5) directs the ALU X unit 331 and ALU Y unit 332 when to compute new $X_n$, $Y_m$ addresses.

Pertinent timing of functions performed by the generator 33 is shown in FIG. 5B'. The rising edge of the HPIX clock signal indicates the start of a new pixel cycle. At the same time that the first pixel, $P_\phi$, is read from the storage image, the synchronization signals $H_s$ (Horizontal synchro) and $V_s$ (Vertical synchro) go simultaneously high to indicate the beginning of the image, i.e., the first pixel of the first line.

$H_s$ remains high until the end of the image. $V_s$ goes low at the end of each line and remains low until the border or ghost pixels, which attribute is determined by convolution requirements and initialized in RX register 340 (FIG. 5), have gone.

In effect, the start of the row signal, $V_s$, is delayed by the time corresponding to the width of the ghost pixel border selected. Assertion of $H_{so}$, $V_{so}$ signals is delayed by the amount of time corresponding to the time elapsed ("computational delay") in computation or processing of the input or source image pixels $P_0$ to $P_5$ by the processing chain units 34, 35, 36, 37 to form processed or result image pixels $P_0'$ to $P_5'$.

In accordance with present invention, the timing of functions performed by address generator 33 is based upon the processing of logical, not physical, images. The following advantages are thereby obtained:
(1) the time to complete processing functions is shorter when timing is related to logical images that are smaller than physical images;
(2) the ability to elect to scan in one of up to eight scan modes or directions, e.g., to reverse video, shortens the time of certain computations performed by circuit 30;
(3) the ability to elect to scan in one of up to eight scan modes or directions allows the use of vertical linear filters created by exchanging pixel rows and columns;
(4) the ability to elect to scan in one of up to eight scan modes or directions allows the use of the oversampling technique described elsewhere herein, which itself is a new feature in digital image processing, to enable certain computations to be made that could not otherwise be made; and
(5) the ability to elect to scan in one of up to eight scan modes or directions enables addresses to be computed by address generator 33 on the fly for each elemental process performed by the processing chain of digital image processing circuit 30.

C. Image Storage RAM 32

Image storage RAM means 32 is comprised of SRAM components arranged in a novel configuration in accordance with the present invention. In accordance with the present invention, RAM 32 comprises four memory sections 32A, 32B, 32C, 32D (FIG. 2B) each having sufficient capacity to store a full electronic image ($Im_0$, $Im_1$, $Im_2$, $Im_3$) of the largest size expected in the operation of the subsystem 20 (FIG. 2A) constructed and operated in accordance with the present invention.

Each memory section 32A, 32B, 32C, 32D can contain the same or different amounts of total memory. In the preferred embodiment, the four memory sections are identical. Each memory section is arranged in four 4-bit or nybble size planes (FIG. 5G') and each memory section can store 4-bit, 8-bit, 12-bit, and 16-bit wide digital images. The choice of which nybble to store is made by the programmed mode control register 342 of the write unit 341 incorporated in an address generator 33 (FIGS. 5, 5G).

As noted elsewhere herein, with reference to FIG. 5F, electronic images are transferred to and from VRAM 23 from and to Image Storage RAM 32. Synchronization signals are required when writing an image from a VRAM 23 to the Image Storage RAM 32. The synchronization signal, i e., "Request To Exchange" (FIG. 5F), from the VRAM controller 22 is an exchange request, i.e., a request to exchange data between VRAM 23 and Image Storage RAM 32. The address generator 33 then produces synchronization signals $H_s$, $V_s$, so that the VRAM controller knows when to produce good addresses.

D. Convolution Unit 34

Central to the digital signal image processing functions performed by circuit 30 (FIG. 2B) are the digital signal filtering functions performable as a result of computations made rapidly and repetitively at high rates by circuits incorporated in convolution unit 34.

Figure 6:
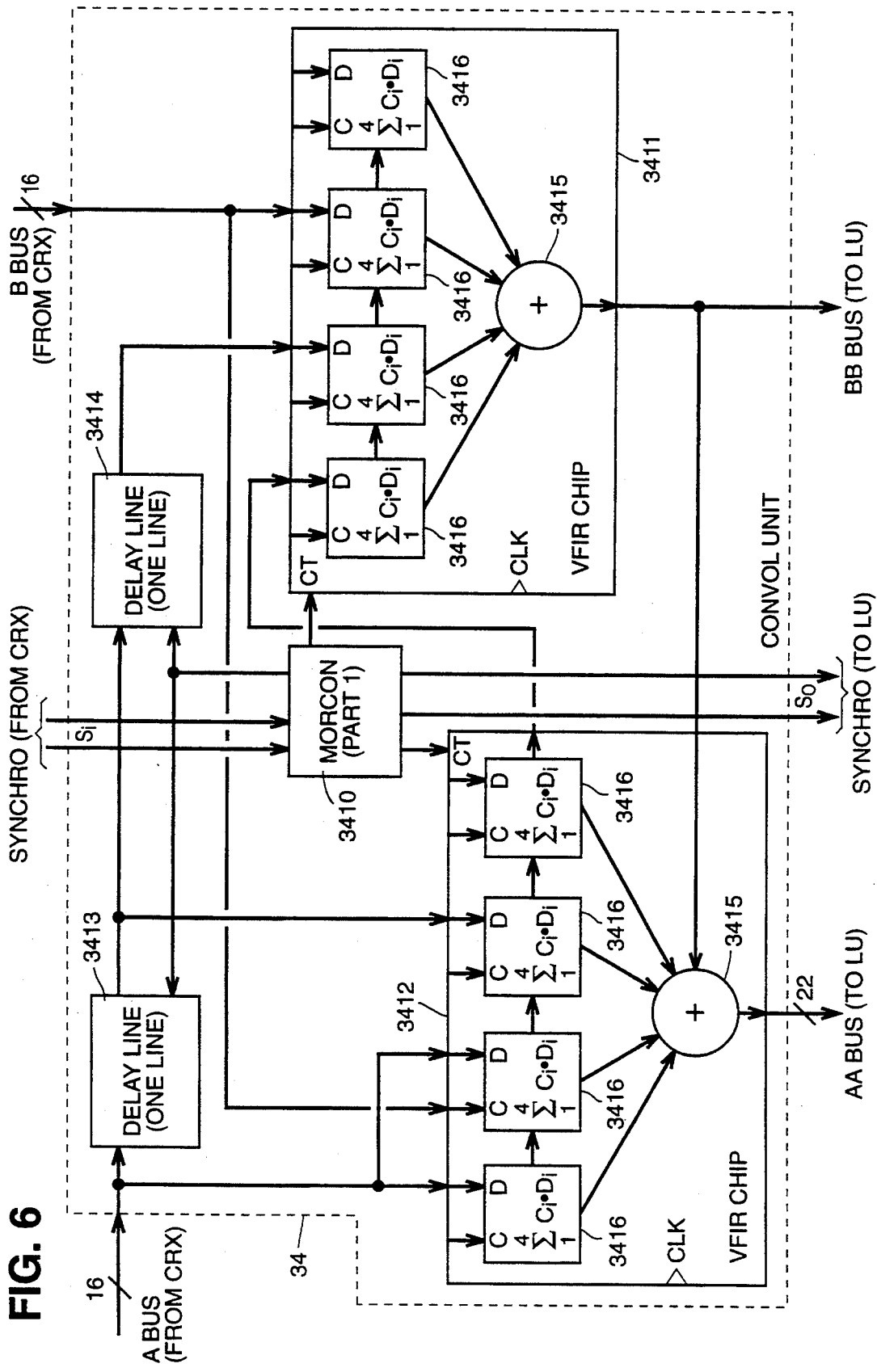
FIG. 6 is a block diagram showing the general aspect of a convolution unit ("CONVOL") 34 incorporated in said processing circuit 30 also described with reference to FIG. 2B.

The general aspect of convolution unit 34 is depicted in FIG. 6. Convolution unit 34 comprises two versatile finite impulse response filter ("VFIR") chips 3411, 3412. Each VFIR chip embodies large scale integration and incorporates at least one adder tree circuit 3415 and a plurality of multiply-accumulator ("Σ" or "MAC") circuits 3416. The convolution unit 34 additionally comprises delay lines 3413, 3414 and a morphological and convolution control (MORCON) unit 3410, depicted in greater detail in FIG. 6F.

Figure 6A:
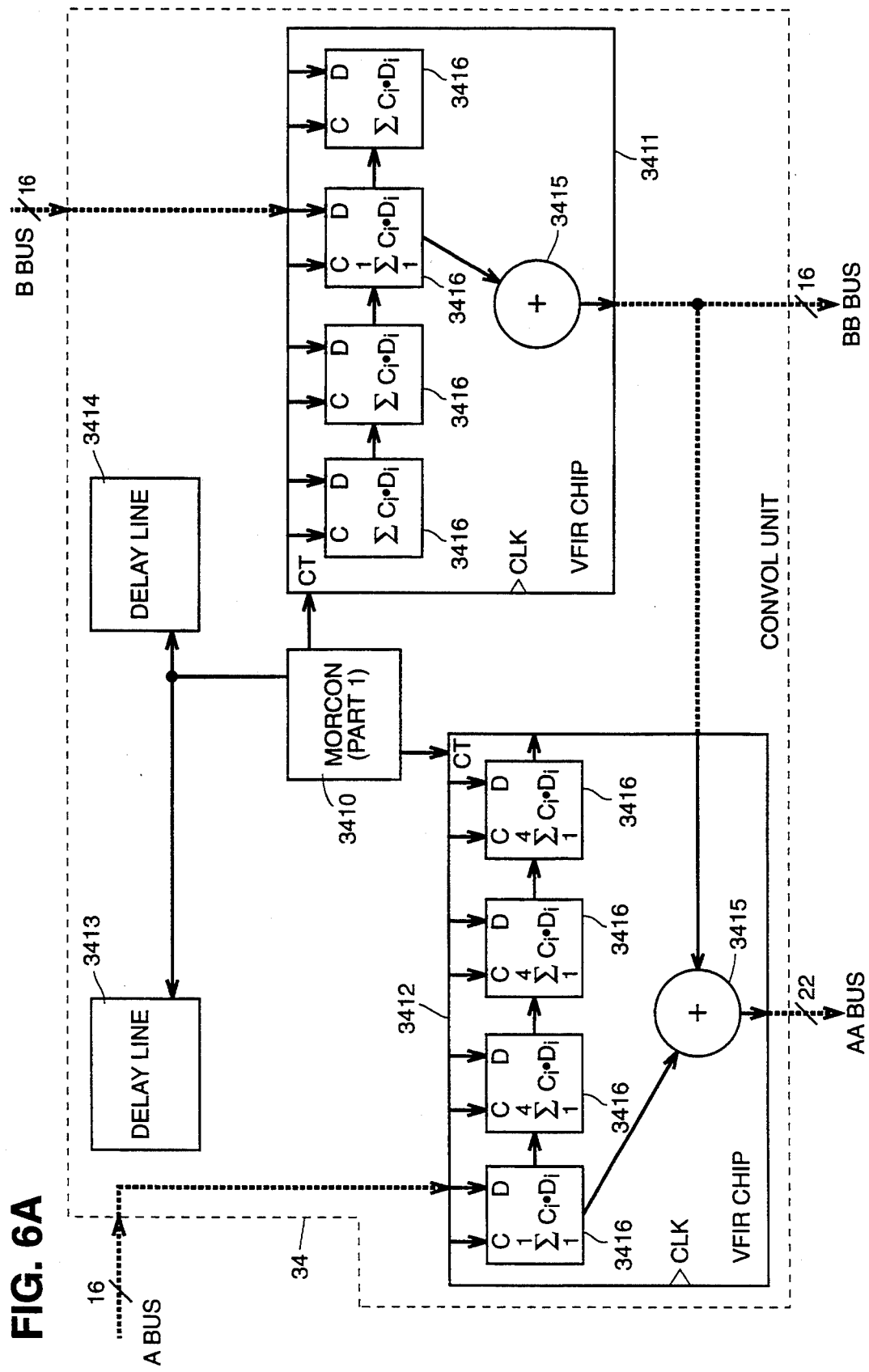
FIG. 6A illustrates the interconnection of components of CONVOL unit 34 in performing identity and linear combination functions with respect to two images (A, B) and two constants $(\alpha, \beta)$.
Figure 6B:
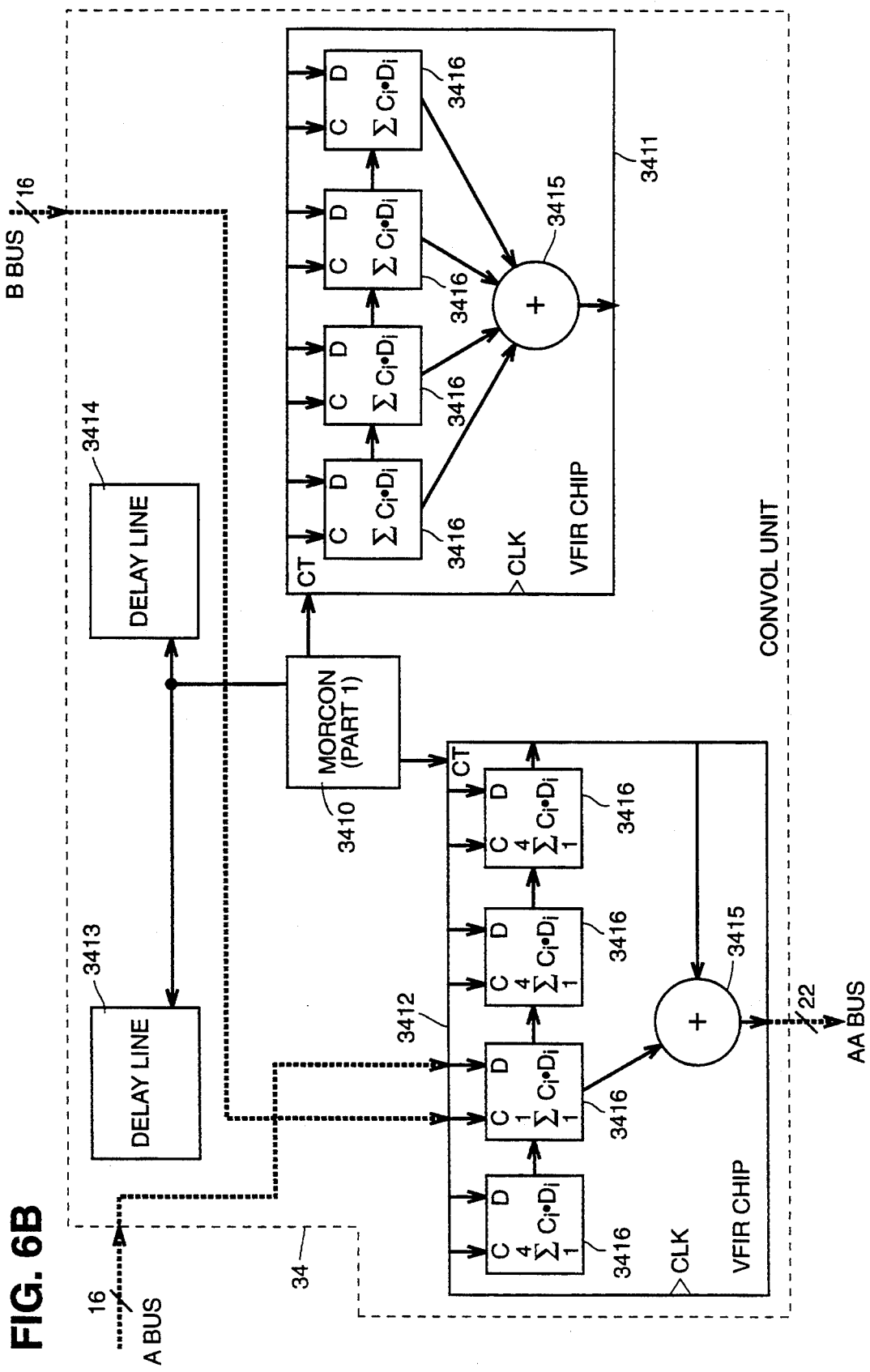
FIG. 6B illustrates the interconnection of components of CONVOL unit 34 in performing the function of multiplication of two images (A, B)
Figure 6C:
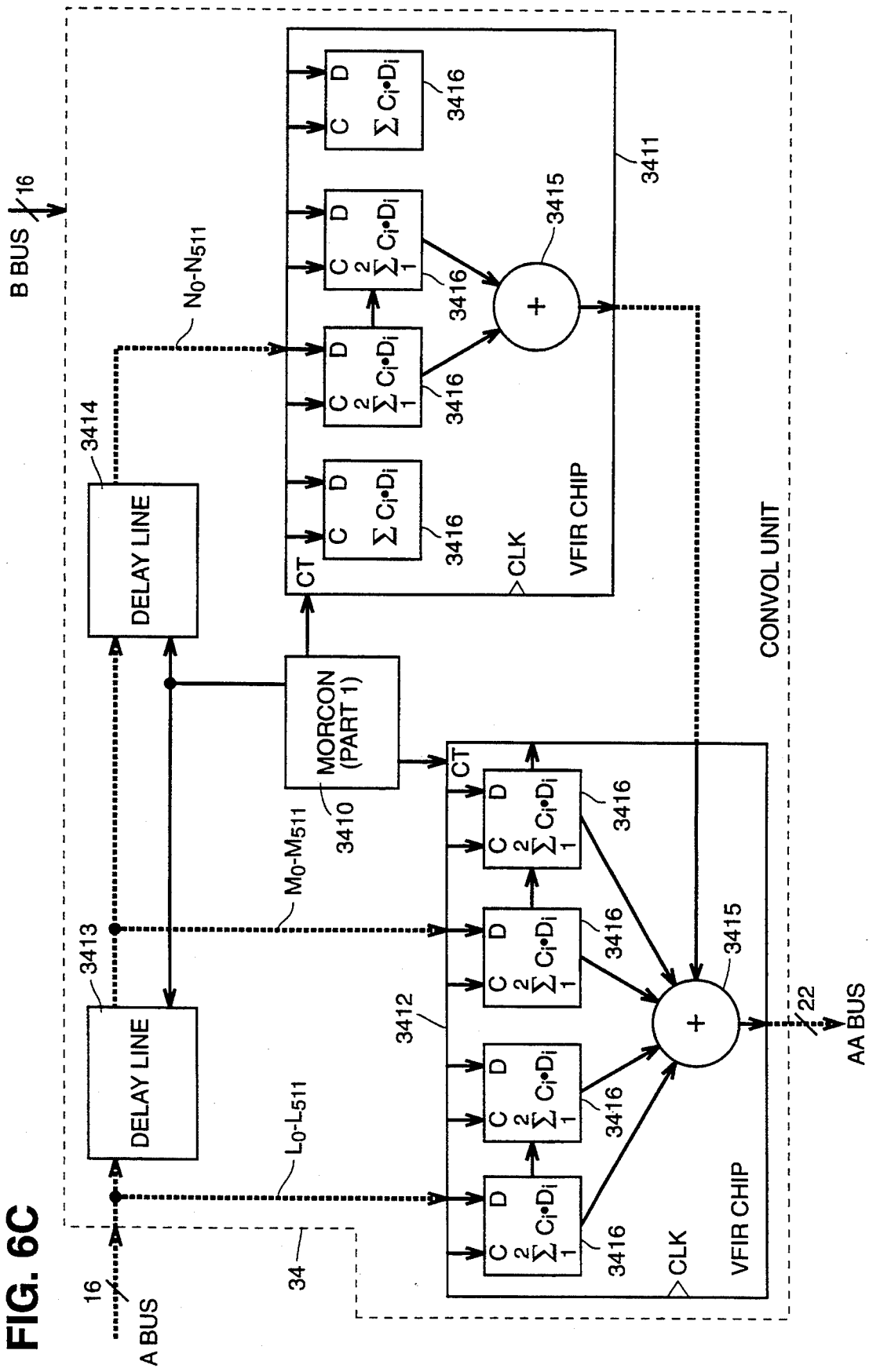
FIG. 6C illustrates the interconnection of components of CONVOL unit 34 in performing the function of convolution on a two-dimensional kernel of up to 3×4 pixels.
Figure 6D:
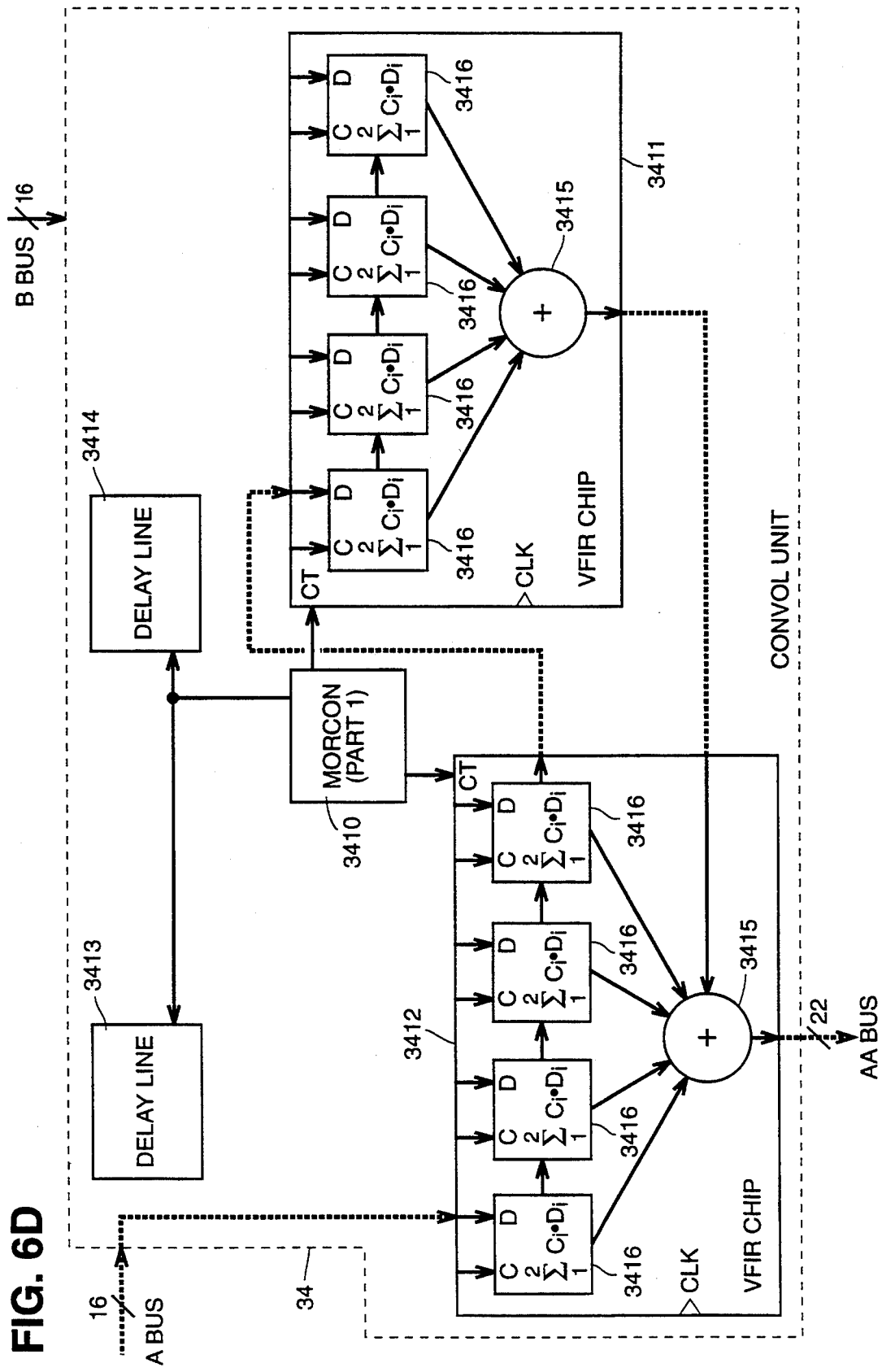
FIG. 6D illustrates the interconnection of components of CONVOL unit 34 in performing the function of convolution on a one-dimensional kernel of up to 1×16 pixels.
Figure 6E:
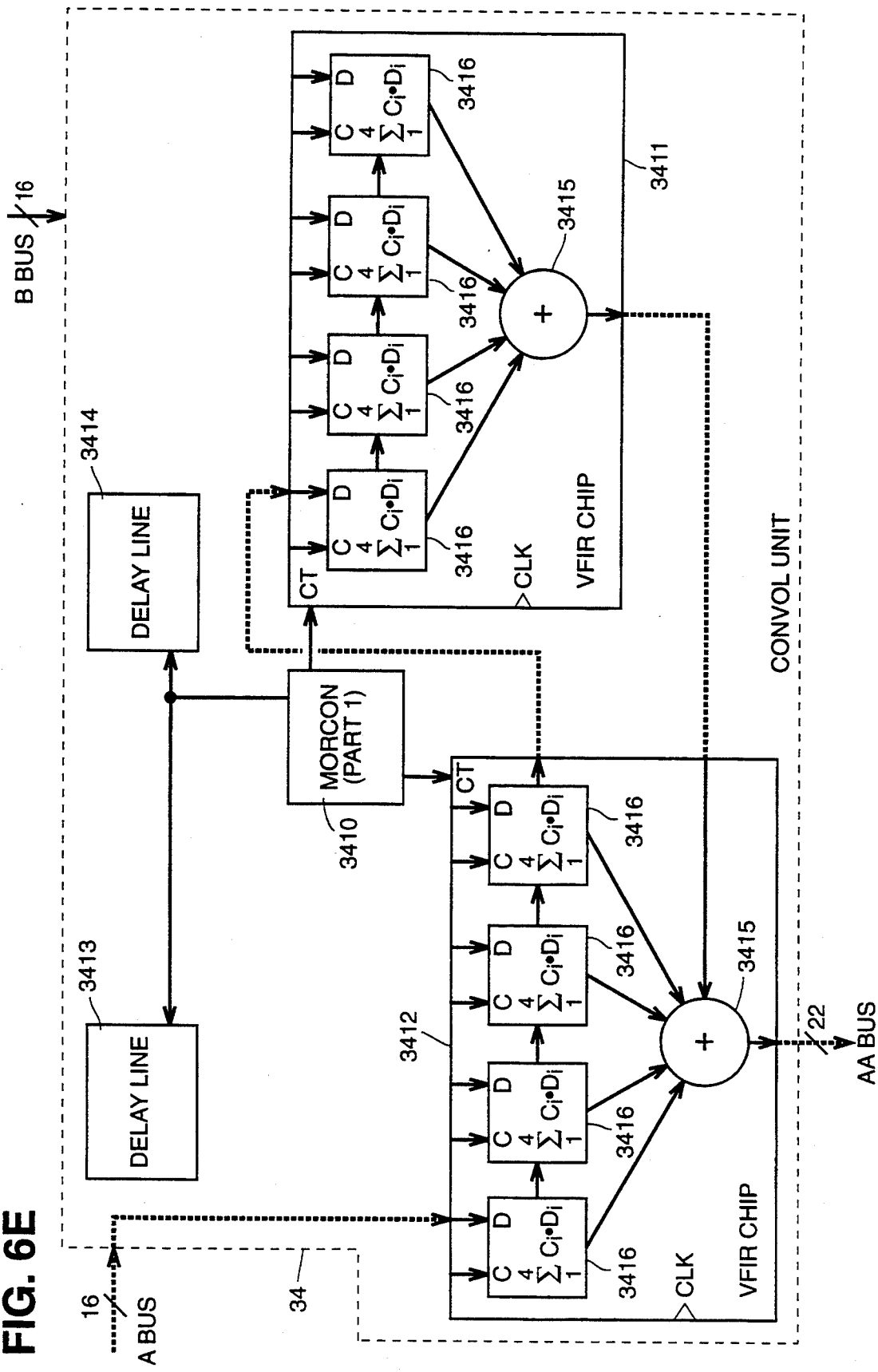
FIG. 6E illustrates the interconnection of components of CONVOL unit 34 in performing the function of convolution on a one-dimensional kernel of up to 1×32 pixels.
Figure 6F:
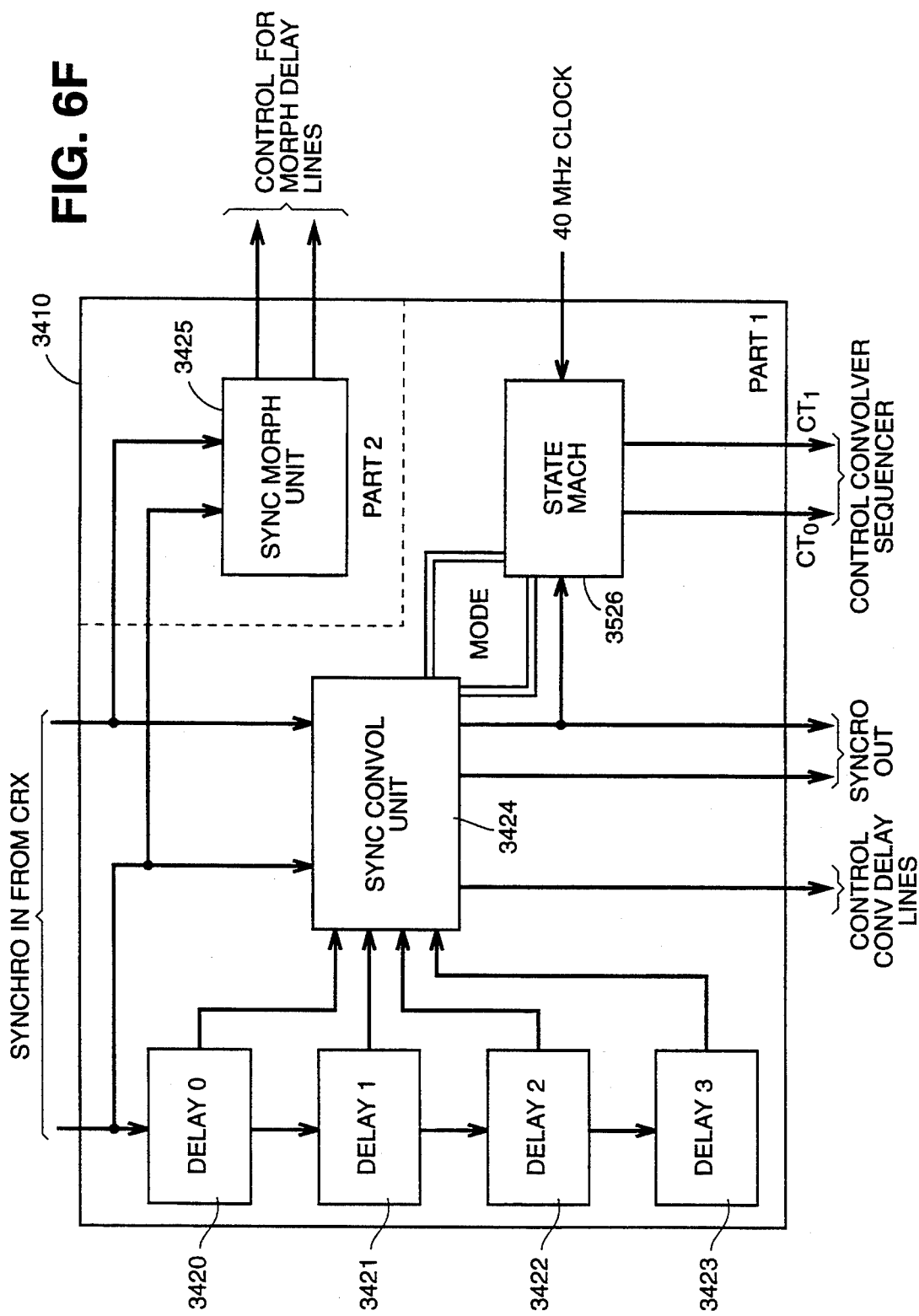
FIG. 6F is a block diagram showing the general aspect of morphology and convolution control ("MORCON") unit 3410 incorporated in CONVOL unit 34.
Figure 6G:
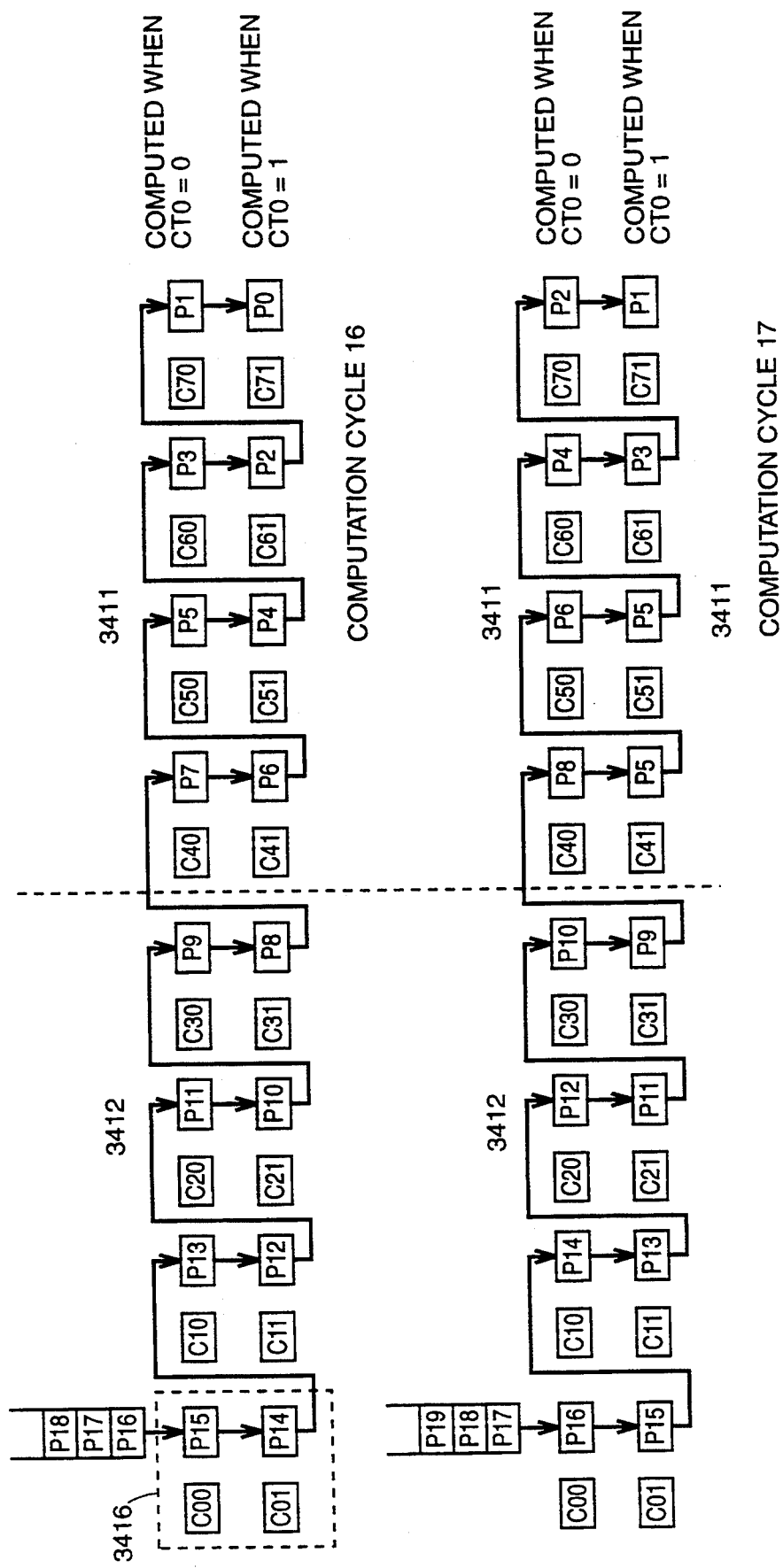
FIG. 6G is a block diagram showing the interconnection of certain components of VFIR chips 3411 and 3412 during convolution of a 1×16 kernel.

Referring to FIG. 6F, in response to synchronization signals ($S_i$) from CRX 31, the MORCON unit 3410 by means of its components ("Part 1"), i.e., delay lines 3420, 3421, 3422, 3423 and Sync CONVOL unit 3424 provides synchronization signals for the logic unit 35 and for the delay lines in CONVOL unit 34; by means of Sync MORPH unit 3425 ("Part 2"), the MORCON unit 3410 provides synchronization signals for the delay lines incorporated in MORPH unit 36.

The convolution unit 34 can be configured (FIG. 6A) to compute, as a 22-bit output on AA_Bus, the sum of the two 16-bit inputs on A_Bus and on B_Bus, each input first multiplied by as constant, i.e., $AA = \alpha A + \beta B$. In this computation, the output on BB_Bus is $\beta B$. The delay circuits 3413, 3414 have no part in this computation. Therefore, $CT_0$, $CT_1$ signals which control the operation of the delay lines 3413, 3414 are low during this computation (FIG. 6N). Only delay line 3420 (Delay 0) of the MORCON unit (FIG. 6F) is used in this computation.

The convolution unit 34 can be configured (FIG. 6B) to compute, as a 22-bit output on AA_Bus, the product of the two 16-bit inputs on A_Bus and B_Bus, i.e., $AA = A \times B$. The delay circuits 3413, 3414 have no part in this computation. Therefore, $CT_0$, $CT_1$ signals are low during this computation (FIG. 6N). Only delay line 3420 (Delay 0) of the MORCON unit (FIG. 6F) is used in this computation.

The convolution unit 34 can be configured (FIG. 6C) to compute a convolution defined—by a kernel of size up to 3×4—on up to three lines of up to 512 pixels each, e.g., lines $L_0$ to $L_{511}$, $M_0$ to $M_{511}$, and $N_0$ to $N_{511}$, where each pixel has 16-bits. In this computation, delay line 3421 (Delay 1) of the MORCON unit (FIG. 6F) is employed. $CT_0$ and $CT_1$ signals look like a 2-bit binary counter (FIG. 6M). In this configuration the MAC circuits 3416 are coupled in twos and compute a sum of two elementary products, which are finally added to form the result of the 3×4 kernel convolution, at the rate of HPIX clock (FIGS. 6M, 6N). For example, with reference to FIG. 6M, the partial result R(M1) for lines $L_\phi$-$L_3$, $M_\phi$-$M_3$, $N_\phi$-$N_3$, is given by the following equation:

chained to compute a sum of 16 elementary products at the rate of HPIX clock.

Figure 6H:
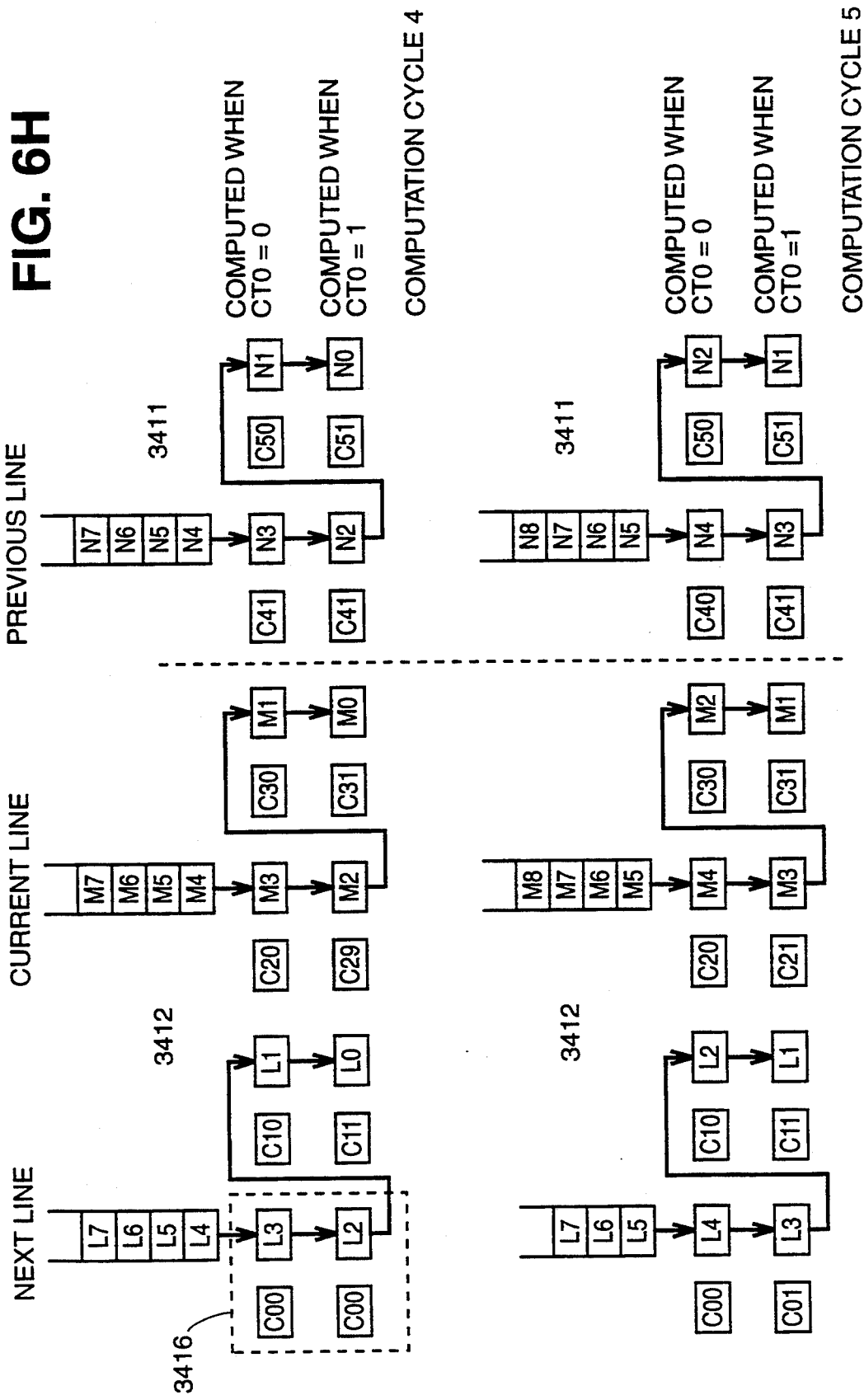
FIG. 6H is a block diagram showing interconnection of certain components of VFIR 3411 and 3412 during convolution of a 3×4 kernel.
Figure 6I:
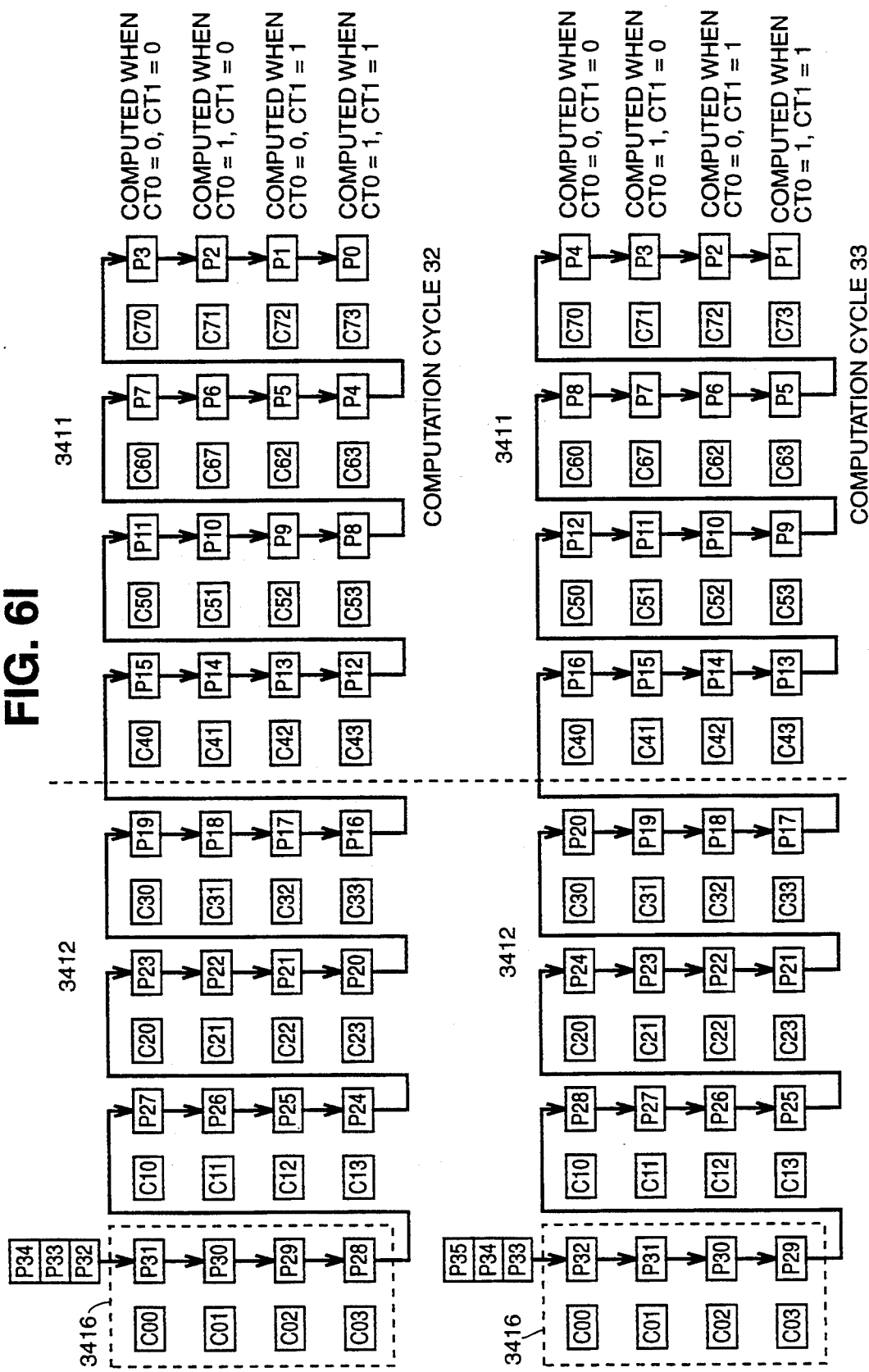
FIG. 6I is a block diagram showing the interconnection of certain components of VFIR chips 3411 and 3412 during convolution of a 1×32 kernel.

In the convolution of a 1×16 kernel, the CT signals impart two states, State 0 and State 1, to each of the MAC circuits 3416 in VFIR chips 3411, 3412 (FIGS. 6D, 6H). Thus, as each input pixel, $P_0$-$P_{511}$ (FIG. 6H), is shifted through a MAC circuit 3416, two computations are made in each MAC circuit 3416, one during State 0 and the second during State 1. At the end of the cycle, the eight partial results are added to form the result of the 1×16 kernel convolution. When the first pixel, $P_0$, has been shifted through both VFIR chips 3411, 3412 and appears at the pixel output of the fourth MAC circuit 3416 of VFIR chip 3411, pixel $P_{16}$ is entering the first MAC circuit 3416 of VFIR chip 3412 (FIG. 6H). For example, with reference to FIG. 6M'', the partial result for pixels $P_\phi$-$P_{15}$, i.e., R(P8), is given by the following equation:

|  | $CT_\phi = \phi$ |  | $CT_\phi = 1$ |  | $CT_\phi = \phi$ |  | $CT_\phi = 1$ |  |
|---|---|---|---|---|---|---|---|---|
| R(M1) = | $C_{\phi\phi}L_3$ | + | $C_{\phi 1}L_2$ | + | $C_{1\phi}L_1$ | + | $C_{11}L_\phi$ | > >3412 |
| + | $C_{2\phi}M_3$ | + | $C_{21}M_2$ | + | $C_{30}M_1$ | + | $C_{31}M_\phi$ | > -- |
| + | $C_{4\phi}N_3$ | + | $C_{41}N_2$ | + | $C_{5\phi}N_1$ | + | $C_{51}N_\phi$ | >3411 > |

|  | $CT_\phi = \phi$ |  | $CT_\phi = 1$ |  | $CT_\phi = \phi$ |  | $CT_\phi = 1$ |  |
|---|---|---|---|---|---|---|---|---|
| R(P8) = | $C_{\phi\phi}P_{15}$ | + | $C_{\phi 1}P_{14}$ | + | $C_{10}P_{13}$ | + | $C_{11}P_{12}$ | > >3412 |
| + | $C_{20}P_{11}$ | + | $C_{21}P_{1\phi}$ | + | $C_{30}P_9$ | + | $C_{31}P_8$ | > -- |
| + | $C_{40}P_7$ | + | $C_{41}P_6$ | + | $C_{50}P_5$ | + | $C_{51}P_9$ | > >3411 |
| + | $C_{60}P_3$ | + | $C_{61}P_2$ | + | $C_{70}P_1$ | + | $C_{71}P_\phi$ | > |

With reference to FIGS. 6C, 6M, the two right-most MAC circuit 3416 in VFIR 3412 are fed with the current "line" of pixels via delay line 3413. The two left-most MAC circuits 3416 of VFIR 3412 are fed with the following line of pixels (line+1) of the image and the two central MAC circuits 3416 in VFIR 3411 are fed with the previous line of pixels (line−1) via delay line 3414.

At the rising edge of HPIX clock, three new pixels one per line enter the CONVOL unit. At the same time, current pixels are shifted out (FIG. 6H) of each MAC circuits 3416 in order to satisfy the computational algorithm.

The convolution unit 34 can be configured (FIG. 6D) to compute a convolution of a 1×16 kernel. The delay lines 3413, 3414 have no part in this computation. $CT_0$ and $CT_1$ signals look like a 2-bit binary counter (FIG. 6M''). In this configuration the MAC circuits 3416 are The convolution unit 34 can be configured (FIG. 6E) to compute a convolution of a 1×32 kernel. The delay lines 3413, 3414 have no part in this computation. Signal $CT_0$ is asserted high at a 20 Mhz rate and signal $CT_1$ is asserted high at a 10 Mhz rate, thereby producing four states (FIGS. 6M''', 6N) i e States 0, 1, 2, and 3.

In this computation, the eight MAC circuits 3416 are chained to compute a sum of 32 elementary products at the rate of HPIX clock. Thus, as each input pixel, $P_0$-$P_{511}$ (FIG. 6I), is shifted through a MAC circuit 3416, four computations are made in each circuit 3416, one during State 0, the second during State 1, the third during State 2, and the last during State 3. At the end of the cycle, the eight partial results are added to form the result of the 1×32 kernel convolution. When pixel $P_0$ has been shifted to the pixel output of VFIR chip 3411 (FIG. 6I), pixel $P_{32}$ enters the pixel input of VFIR chip 3412. For example, with reference to FIG. 6M''', the partial result for pixels $P_\phi$-$P_{31}$, i.e., R(P16), is given by the following equation:

|  | $CT_\phi = \phi$ $CT_1 = \phi$ |  | $CT_\phi = 1$ $CT_1 = \phi$ |  | $CT_\phi = \phi$ $CT_1 = 1$ |  | $CT_\phi = 1$ $CT_1 = 1$ |  |
|---|---|---|---|---|---|---|---|---|
| R(P16) = | $C_{\phi\phi}P_{31}$ | + | $C_{\phi 1}P_{30}$ | + | $C_{\phi 2}P_{29}$ | + | $C_{\phi 3}P_{28}$ | > > |
| + | $C_{1\phi}P_{27}$ | + | $C_{11}P_{26}$ | + | $C_{12}P_{25}$ | + | $C_{13}P_{21}$ | > >3412 |
| + | $C_{2\phi}P_{23}$ | + | $C_{21}P_{22}$ | + | $C_{22}P_{21}$ | + | $C_{23}P_{25}$ | > > |
| + | $C_{30}P_{19}$ | + | $C_{31}P_{18}$ | + | $C_{32}P_{17}$ | + | $C_{33}P_{16}$ | > -- |

-continued

|   | $CT_0 = \phi$<br>$CT_1 = \phi$ |   | $CT_0 = 1$<br>$CT_1 = \phi$ |   | $CT_0 = \phi$<br>$CT_1 = 1$ |   | $CT_0 = 1$<br>$CT_1 = 1$ |   |
|---|---|---|---|---|---|---|---|---|
| + | $C_{40}P_{15}$ | + | $C_{41}P_{14}$ | + | $C_{42}P_{13}$ | + | $C_{43}P_{12}$ | > |
|   |                |   |                |   |                |   |                | > |
| + | $C_{50}P_{11}$ | + | $C_{51}P_{10}$ | + | $C_{52}P_9$    | + | $C_{53}P_8$    | > |
|   |                |   |                |   |                |   |                | >3411 |
| + | $C_{60}P_7$    | + | $C_{61}P_6$    | + | $C_{62}P_5$    | + | $C_{63}P_4$    | > |
|   |                |   |                |   |                |   |                | > |
| + | $C_{70}P_3$    | + | $C_{71}P_2$    | + | $C_{72}P_1$    | + | $C_{73}P_\phi$ | > |

The $CT_0$, $CT_1$ signals are generated by State Machine 3526 (FIG. 6F) under control of a 40 Mhz clock, whereby $CT_0$ is always low or else has a frequency of 20 MHz and $CT_1$ is always low or else a frequency of 10 MHz (FIG. 6N). In summary, the CT signals define States of operation of the VFIR chips 3411, 3412 in computations of $3\times 4$, $1\times 16$ and $1\times 32$ kernels (FIGS. 6M, 6N).

Each MAC circuit 3416 (FIG. 6J) comprises four data registers 3440, four coefficient value registers 3441, and some multiplexers (MUX) 3442 to feed a multiply-accumulator ("$\Sigma$ COEFF.$\times$DATA") block. The MUX on the DATA input allows data to come from the SHIFT input when the 3416 circuits are chained.

In general, coefficient values are some constants loaded during the programmation of the 3411, 3412 VFIR chips.

Figure 6J:
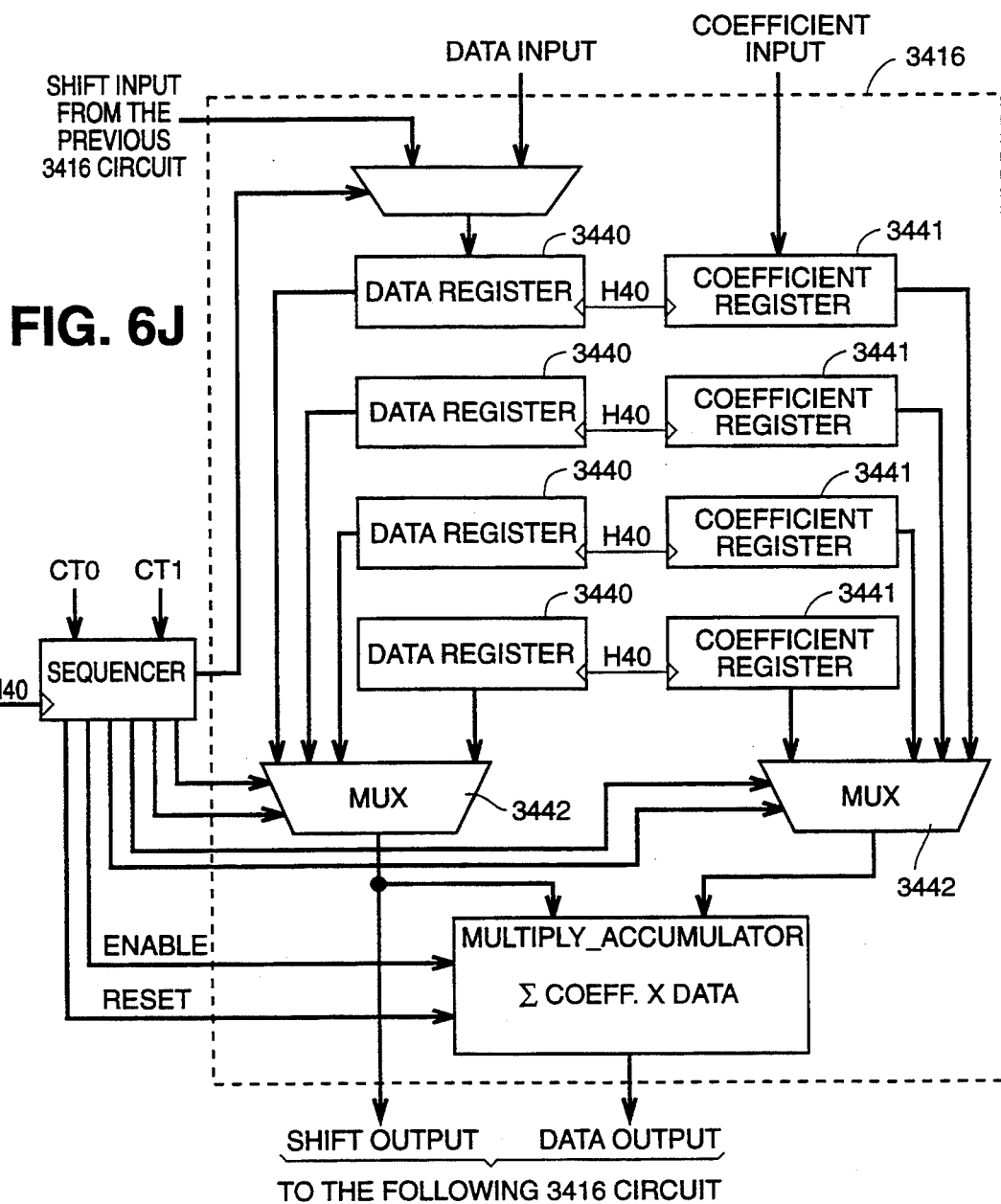
FIG. 6J is a simplified block diagram of a 3416 circuit embedded in 3411 and 3412 VFIR chips.

Each VFIR 3411 and 3412 comprises an internal sequencer (FIG. 6J) which synchronizes the computation. The sequencer is externally controlled by $CT_0$ and $CT_1$ signals. Appropriate data and coefficient values are stored in registers 3440, 3441 (FIG. 6J). Under the control of $CT_0$, $CT_1$ signals, the sequencer computes and establishes the required electrical paths from the registers 3440, 3441 to the multiply-accumulator ("$\Sigma$ COEFF.$\times$DATA") block via multiplexers 3442.

Figure 6K:
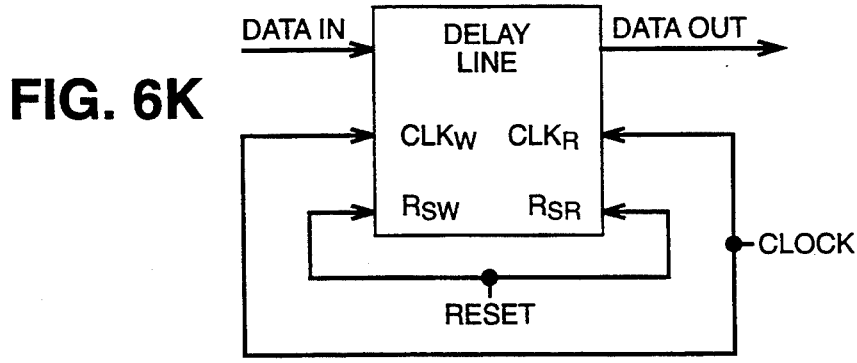
FIG. 6K is a block diagram showing the general aspect of delay lines 3413, 3414 incorporated in CONVOL unit 34.
Figure 6L:
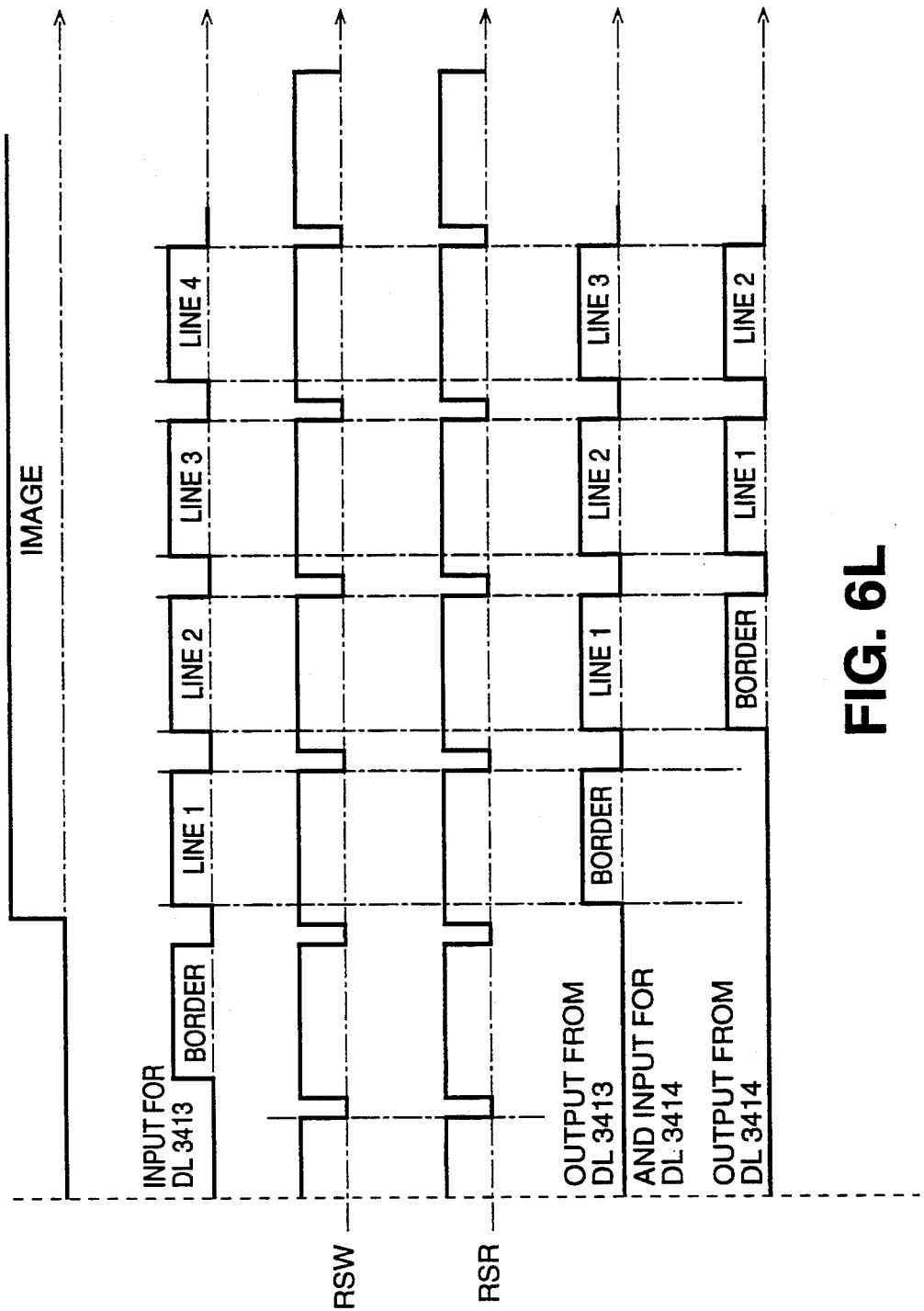
FIG. 6L is a timing diagram pertinent to explanation of the operation of delay lines 3413, 3414.
Figure 6M:
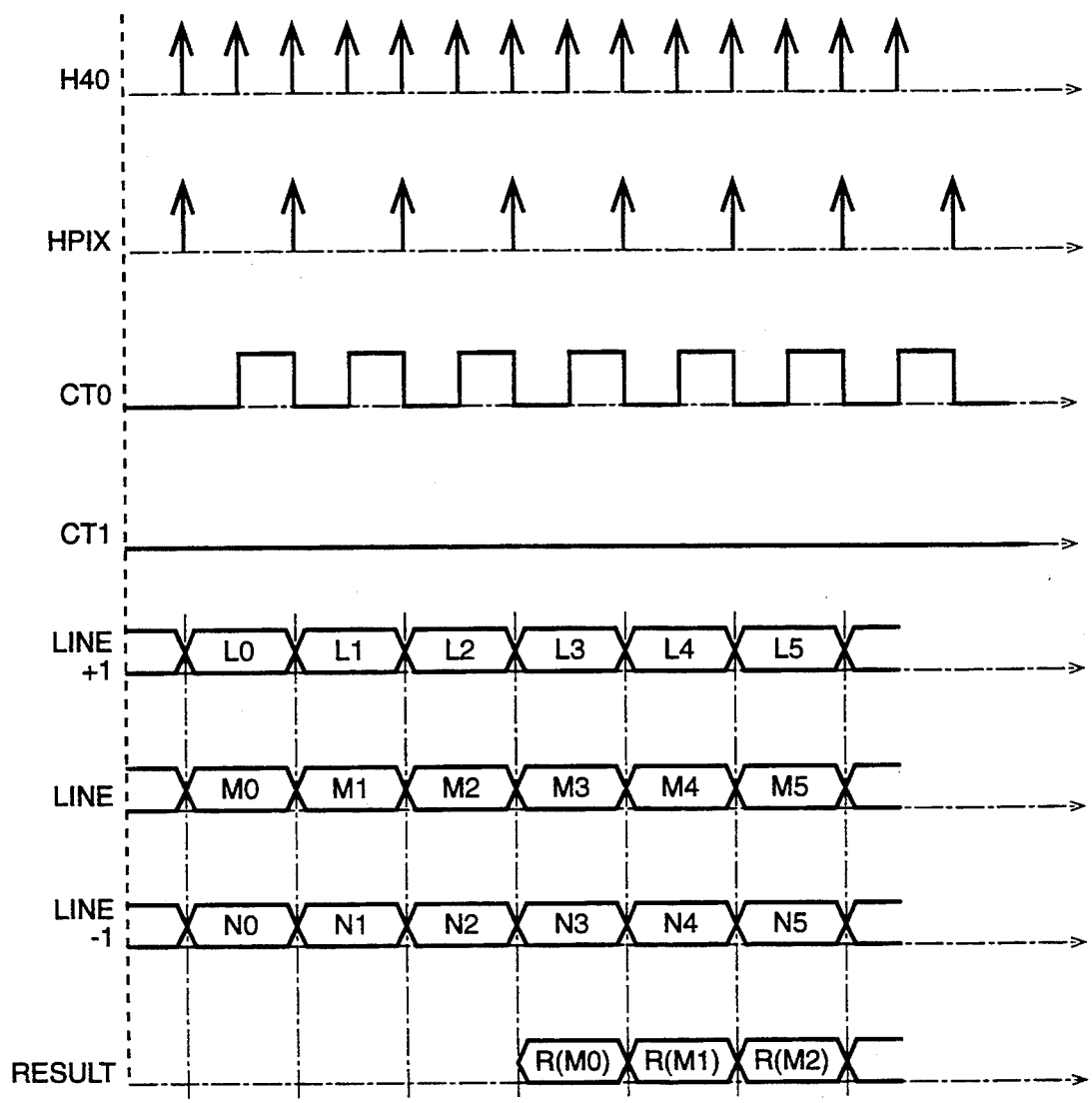
FIG. 6M is a timing diagram illustrating the computation of a 3×4 kernel convolution under CT0 and CT1 signals.
Figure 6M:
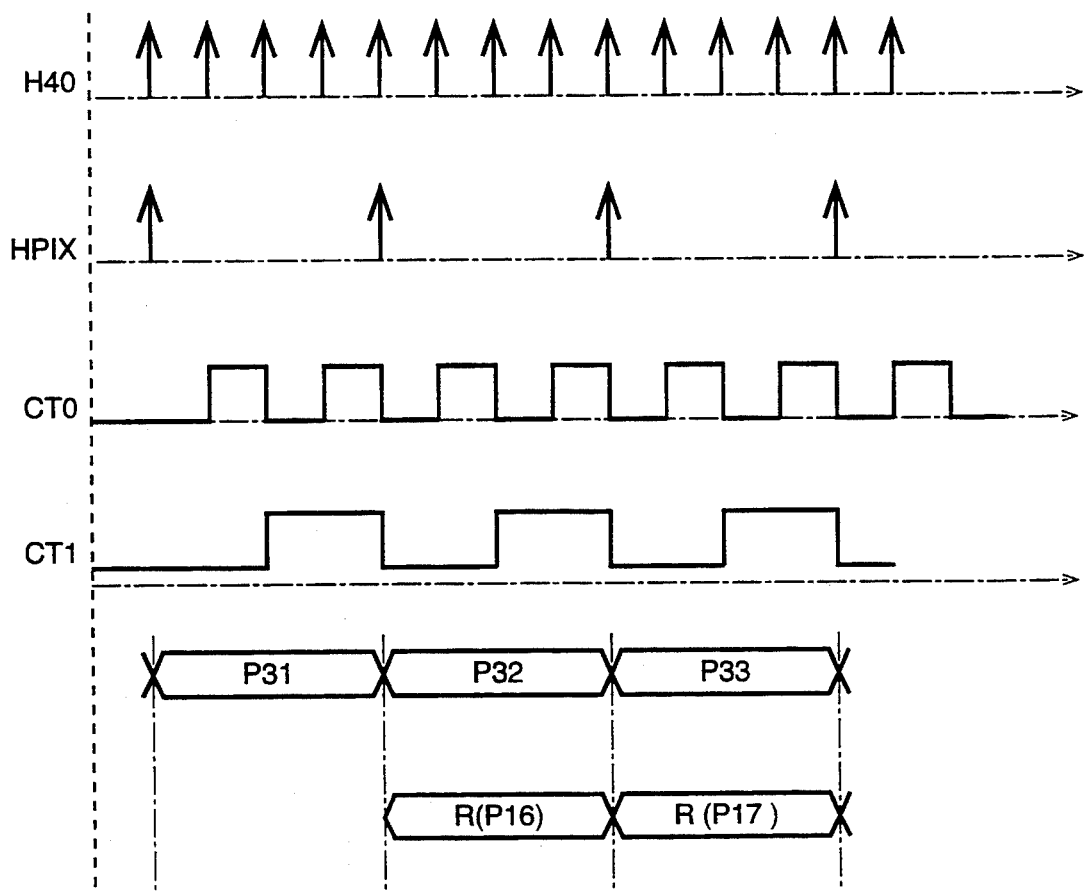
Figure 6N:
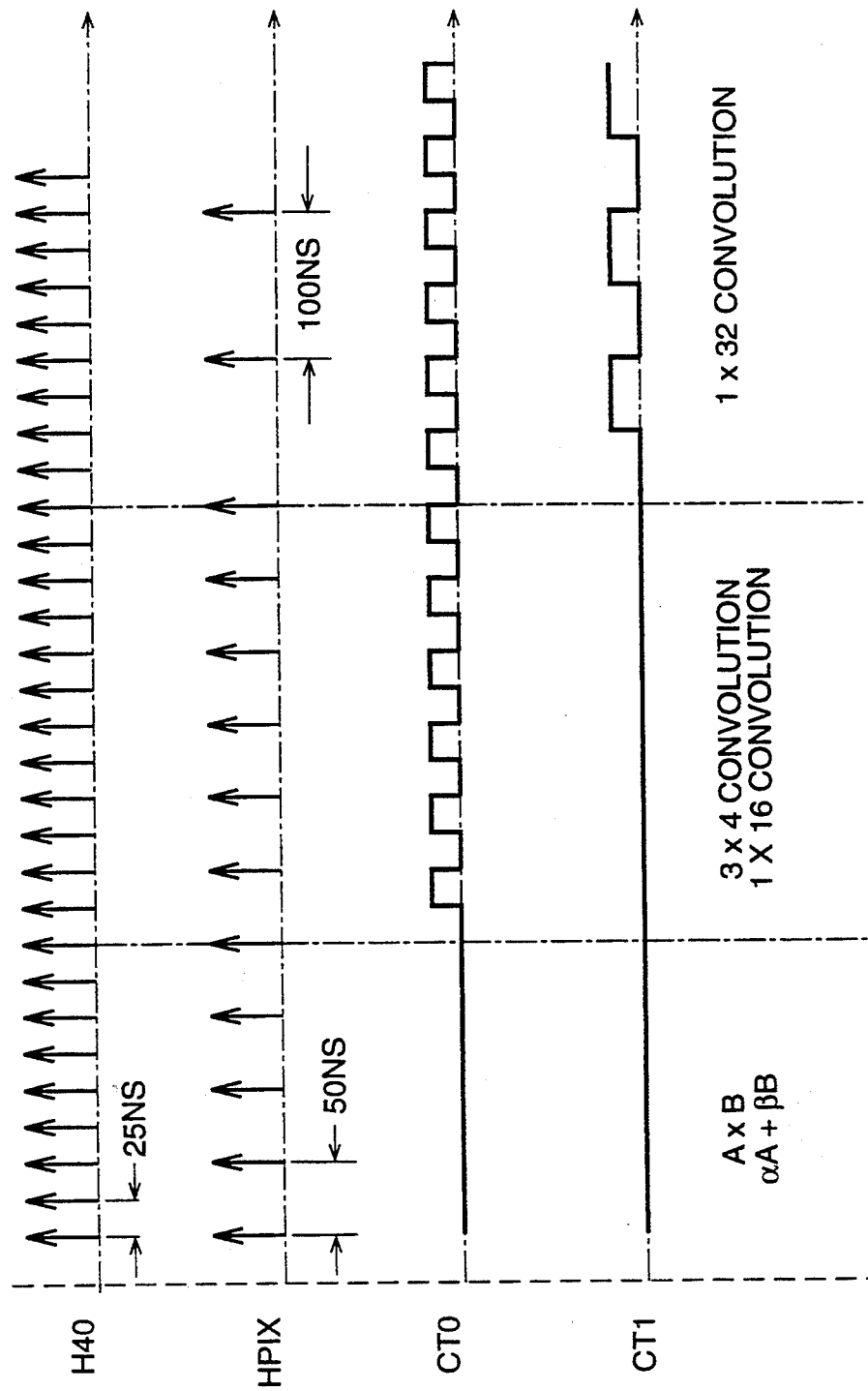
FIG. 6N is a timing diagram illustrating the behavior of the CT0 and CT1 signals with respect to the various computations made by CONVOL unit 34.

The delay lines 3413, 3414 (FIG. 6) operate like RAM memory; delay is a function of how many elapsed HPIX periods there are between writing to the delay line (input) and reading from the delay line (output) (FIGS. 6K, 6L). Two signals, a clock signal ($CLK_W$, $CLK_R$) and a reset signal ($R_{SW}$, $R_{SR}$), perform the necessary timing (FIGS. 6K, 6L). Reset signals ($R_{SW}$, $R_{SR}$) are asserted at the same time to produce one line of delay between the input and the output of each delay line 3413, 3414. Reset signals are for initialization of the delay lines and are computed from the input synchronization signals $S_i$ transmitted from CRX 31 (FIG. 6).

E. Logic Unit 35

The logic unit 351 (FIG. 7) provides miscellaneous logic functions with respect to 22-bit input images from convolution unit 34 via AA_Bus and 16-bit input images from unit 34 via BB_Bus. A delay line 359 provides the necessary delay to get the 17-bit output of shifter 356 in phase with the 16-bit BB_Bus input, as both are applied to the logic unit 351. The logic functions with respect to the input images are performed under control of initialized function register 352 and synchronization unit 362. These functions include AND, OR, exclusive OR (XOR), NOT A, Shift A (0 to 6 bits), and calculations of maximum and minimum values (MIN/MAX) for the most significant bits ("MSB") of the 17-bit output of shifter 356.

The image shifting function is performed by shifter 356 (FIG. 7) which can be visualized as including a shiftable 17-bit "window" 363 (FIG. 7A) overlying a 22-bit register 364. The purpose of the shifter 356 is to enable scaling of the data contained in the 22-bit image signal received on the AA_Bus from convolution unit 34. In the initialization of logic unit 35, the window 363 is set to the far left with the 17 window bits (0–15 plus BAL 17) overlying the left-most 17 register bits (5–21). This represents the default setting of "0". The rightward shift of the window 363 can be programmed during operation from 0 to 6 bits of shift to obtain the highest precision for the result (i.e., the greatest number of significant bits).

It should be noted that the 22-bit output on AA_Bus from CONVOL unit 34 is a number truncated from a larger number of bits. In accordance with the present invention, in order to improve significantly the precision of subsequent calculations performed by MORPH unit 36 upon image data transmitted from the logic unit 35 via the BAL_Bus (16 bits) and the BBL_Bus (16 bits), the 17th bit transmitted via the BAL 17 line from the shifter 356 to MORPH unit 36 is in the nature of a carry bit for the next summation step. Thus, although the 16-bit BAL_Bus output represents a truncation of the 22-bit data input on AA_Bus, the combined 17-bit BAL_Bus and BAL 17 output is not a mere truncation of the 22-bit data input on the AA_Bus. Rather, the combined 17-bit BAL_Bus and BAL 17 output data can be used in the MORPH unit 36, at the user's option, as a rounding off of the 22-bit AA_Bus input data, the 1-bit BAL 17 acting as a carry for the next summation step.

MIN/MAX detector 357 of logic unit 35 (FIG. 7) enables computation of the minimum and maximum values on the shifted MSB of the AA_Bus. The purpose of the MIN/MAX computation is to avoid loss of precision in the computations performed by convolution unit 34, where a multi-bit result has been truncated to 22 bits and where the 22-bit signal is rounded off to 16 bits plus a 17th or carry bit.

Figure 7:
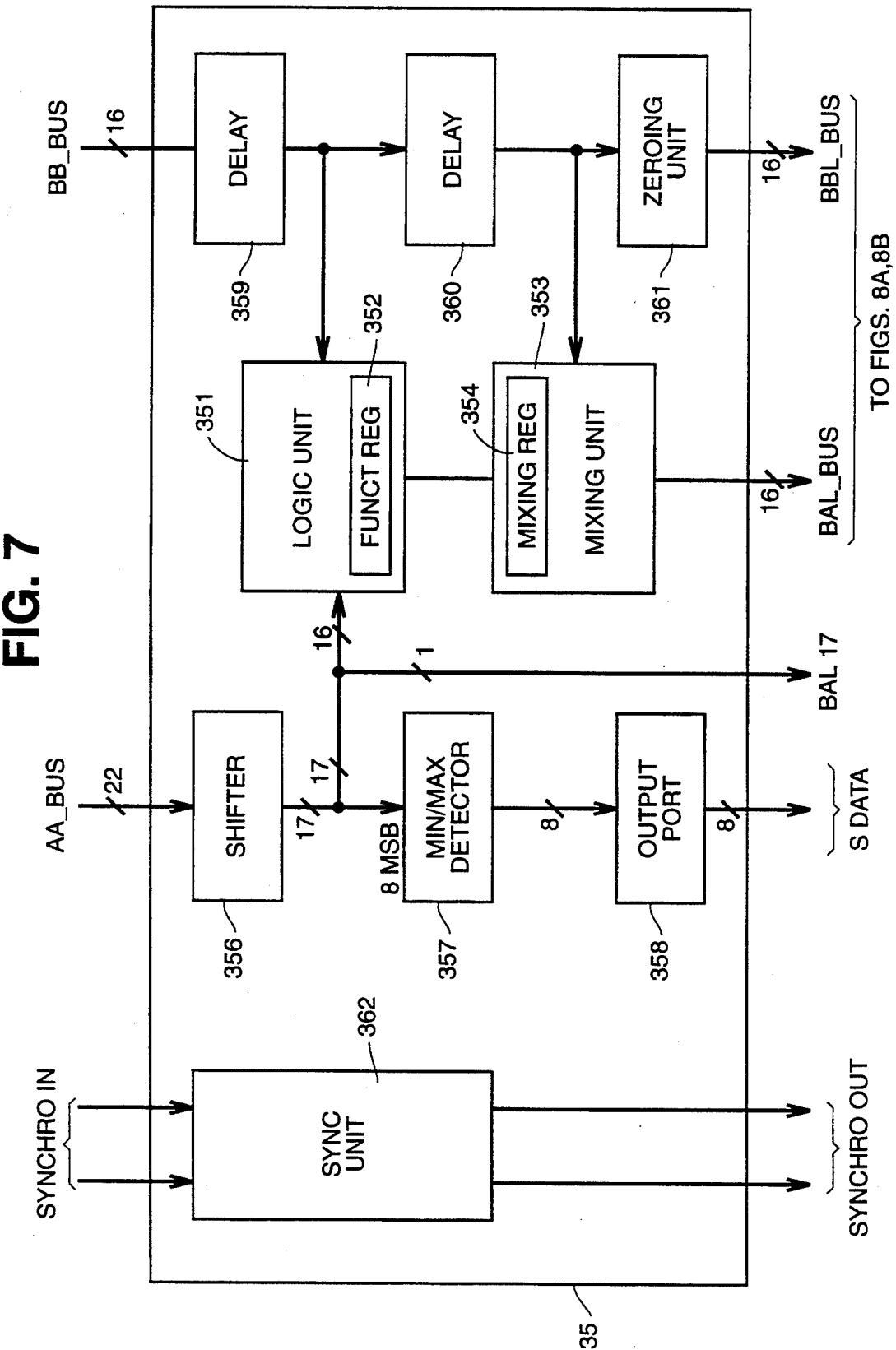
FIG. 7 is a block diagram showing the general aspect of a logic ("LU") unit 35 incorporated in said processing circuit 30 also described with reference to FIG. 2B.
Figure 7A:
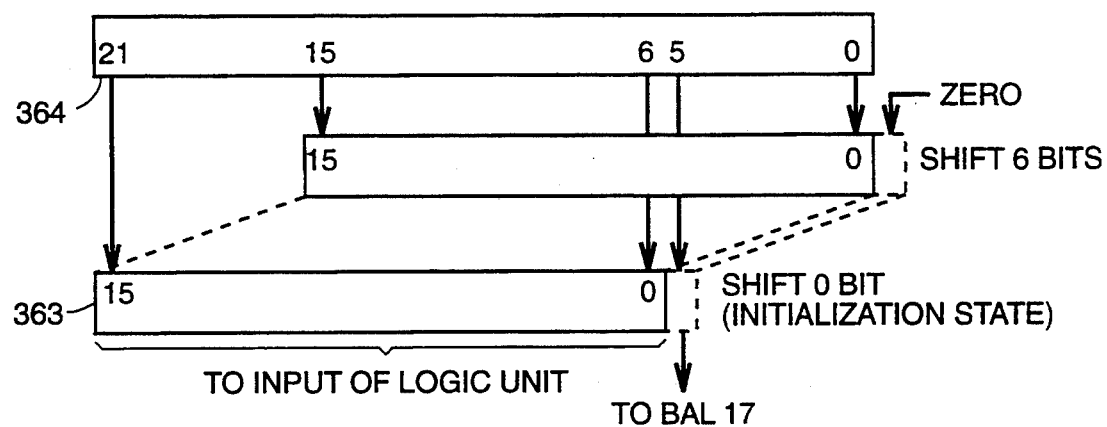
FIG. 7A is a block diagram illustrating the function of data scaling performed by logic unit 35.
Figure 7B:
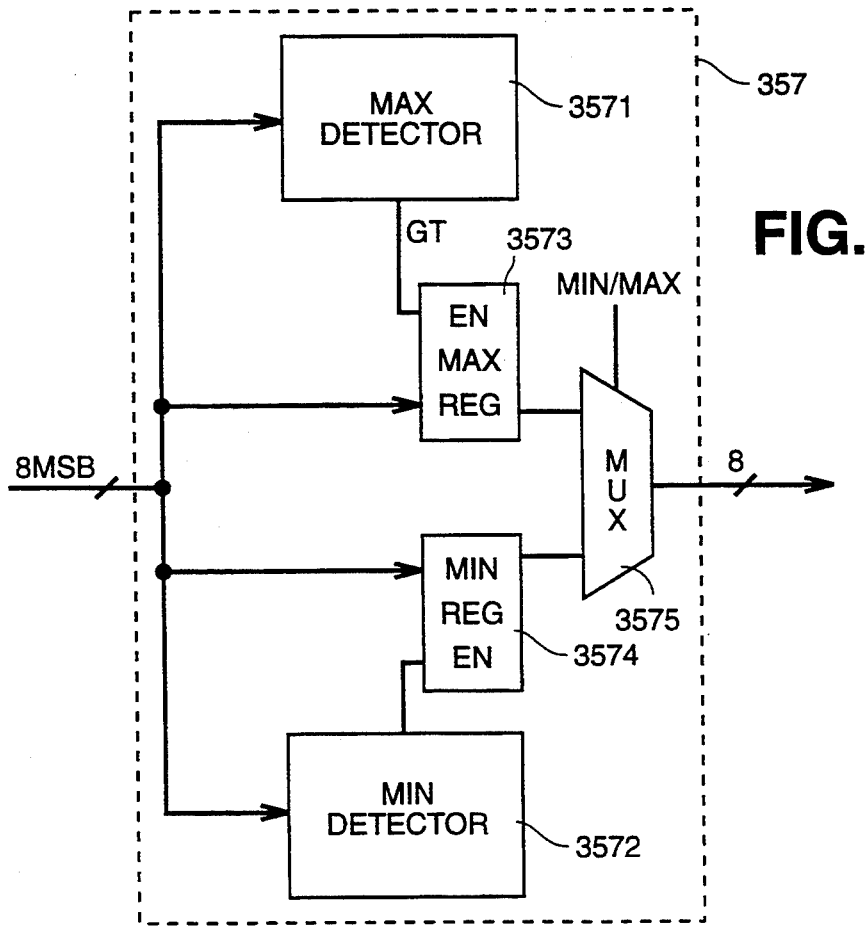
FIG. 7B is a block diagram showing the general aspect of the MIN/MAX detector 357 described with reference to FIG. 7.

Referring to FIG. 7B, MIN/MAX detector 357 comprises MAX detector 3571, MIN detector 3572, MAX register 3573, MIN register 3574, and a multiplexer (MUX) 3575. The GT input to MAX register 3573 is representative of whether the newly computed maximum is greater than the current maximum value. Similarly, the LT input to MIN register 3574 is representative of whether the newly computed minimum is less than the current minimum value.

In operation, the computation of MIN/MAX values is useful to scale the coefficient values used in the operation of the VFIR chips 3411, 3412 (FIG. 6) when performing convolution functions. The result computed by the CONVOL unit 34 is a sum of products in the form of $w_i \cdot P_k$, where the weighting factors $W_i$ are chosen to avoid overflow. If the computed MAX value is too small (i.e., not enough significant bits) the $w_i$ can be adjusted to increase the precision of the result of the convolution. A similar operation can be done with the MIN value when the $W_i$ have to be decreased. The MIN/MAX values are stored in two eight bit registers, i.e., MAX REG 3573 and MIN REG 3574 (FIG. 7B), which can be read by the control processor 21 at specific addresses on the secondary Bus SDATA (FIG. 7).

Mixing unit 353 (FIG. 7) and the initialized mixing register 354 provide, where required, bit mapping operations where image data from the BB_Bus can be mapped into and stored in data transmitted via the AA_Bus. The mapping operation provides a means to save storage space when working on binary images. An eight bit wide image can store eight different pieces of binary information, that is, bit map information. Delay line 360 provides appropriate delay for the BB_Bus data being applied to the mixing unit 353. In accordance with the invention, for further signed/unsigned computation, the MS bit of the BAL_Bus can be inverted by the mixing unit 353.

For some functions to be calculated by the MORPH unit 36, all bits of BB Bus data can be forced to zero by programmed operation of the zeroing unit 361.

Synchronization of logic unit 35 is provided by synchronization unit 362 under the control of synchronization signals ($S_i$) transmitted from CONVOL unit 34. Output synchronization signals (so) from sync unit 362 are transmitted to MORPH unit 36.

F. Morphological Unit 36

Figure 8A:
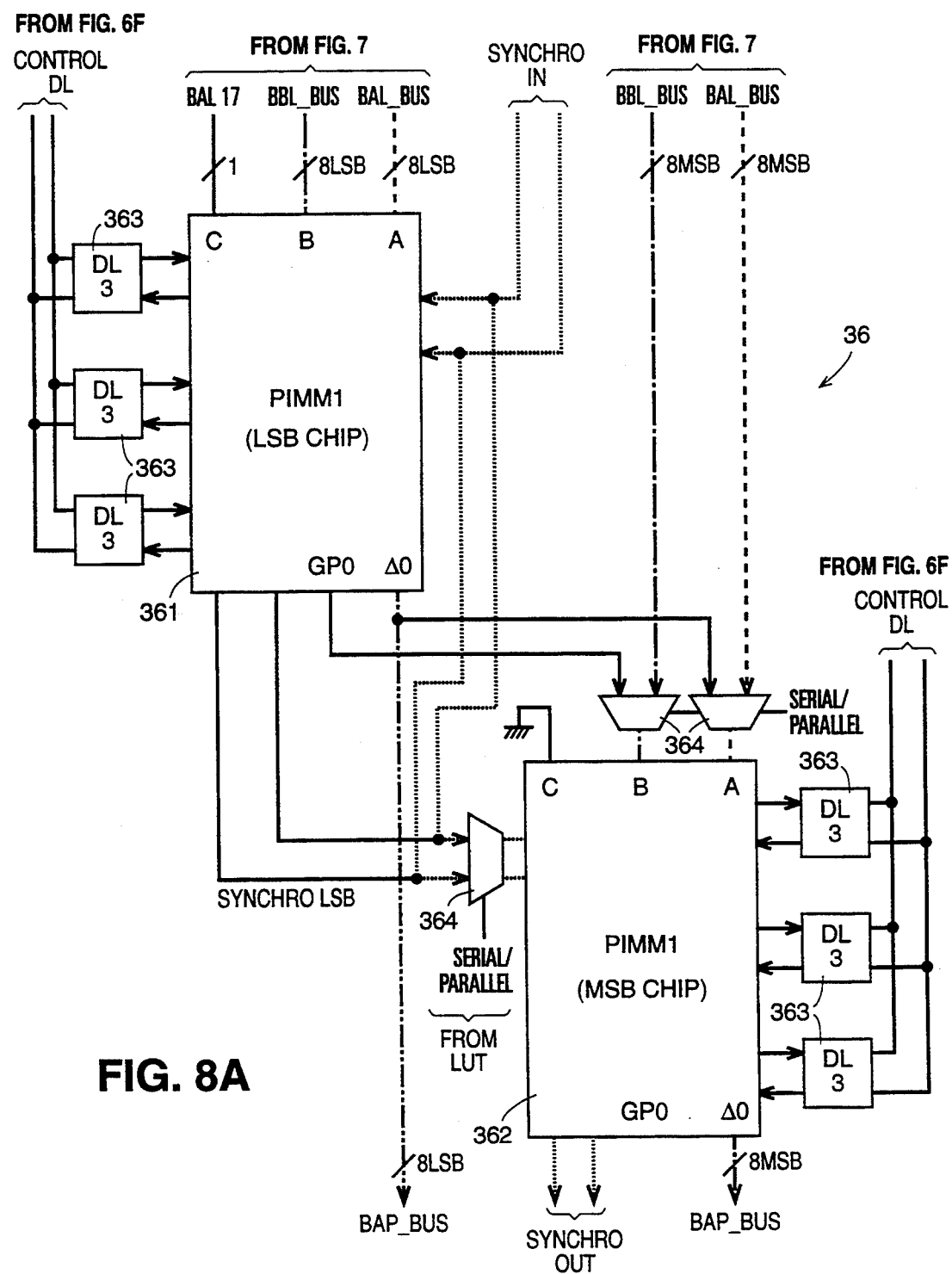
FIG. 8A is a block diagram showing the general aspect of a morphology ("MORPH") unit 36 incorporated in said processing circuit 30 also described with reference to FIG. 2B and showing pertinent data and synchronization signal paths for operation of the PIMM circuits 361, 362 in parallel mode.
Figure 8B:
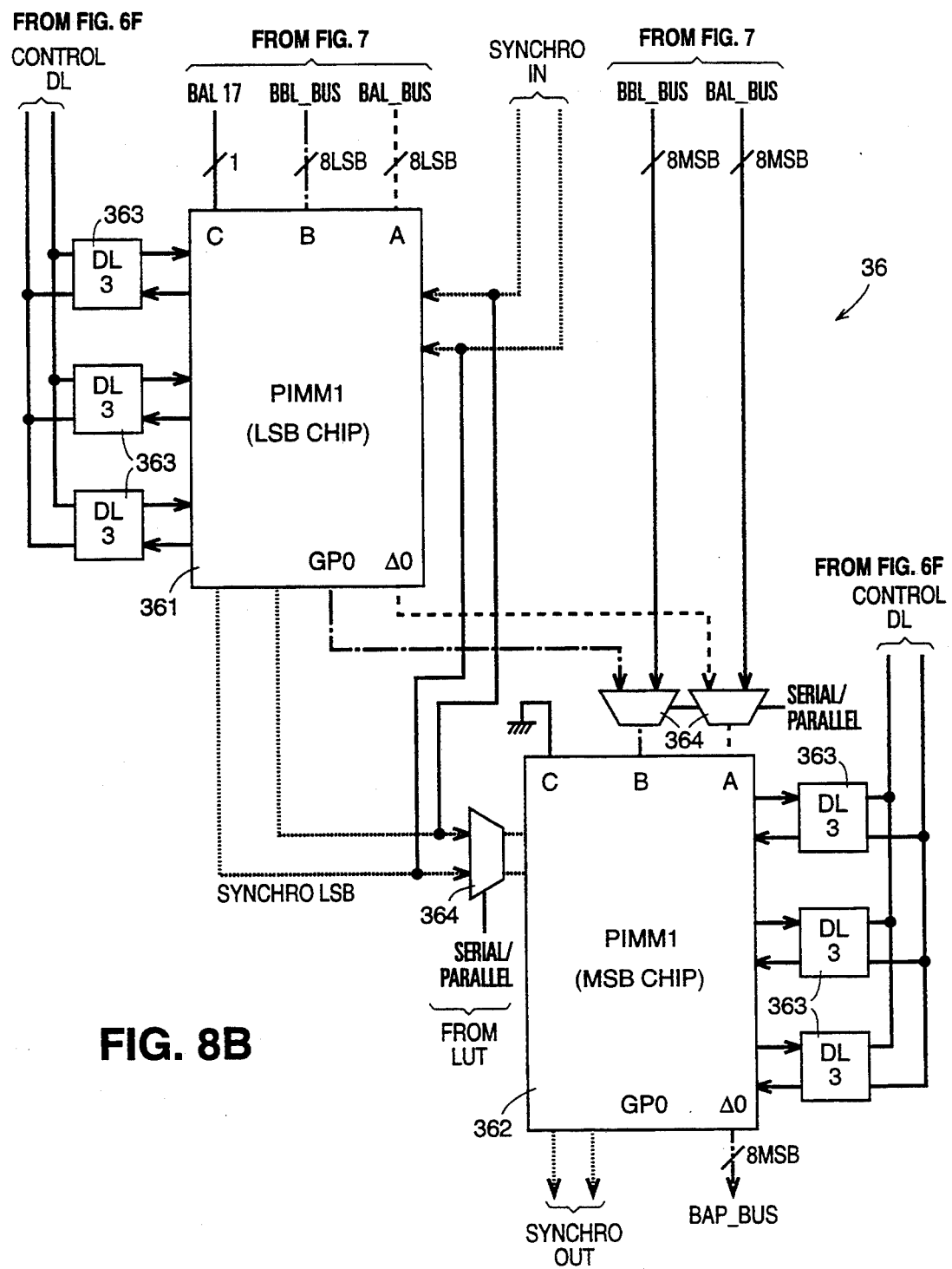
FIG. 8B is a block diagram similar to FIG. 8A showing pertinent data and synchronization signal paths for operation of the PIMM circuits 361, 362 in serial mode.

Referring to FIGS. 8A and 8B, the morphological unit 36 is a high speed computation circuit for computing numerical values and binary values on gray scale electronic images and on binary electronic images. The unit 36 comprises two processors 361, 362 for performing most of the algorithms used in mathematical morphology, a plurality of delay lines 363, and a second plurality of multiplexers 364 for operating the chips 361, 362 in serial mode or in parallel mode.

Each chip 361, 362 is a Mathematical Morphology Integrated Processor ("PIMM1") supporting the latest algorithms of mathematical morphology.

The PIMM1 chip has a programmable internal architecture. The PIMM1 chip can perform morphological and point-to-point transformations on binary and 8-bit grey-tone images in hexagonal and square grids.

The point processing unit of the PIMM1 chip can be used to threshold, add, subtract and compare numerical images, to perform boolean operations such as AND, OR, and Exclusive Or (XOR) between binary images, and to invert binary images.

The PIMM1 chip also includes a programmable morphological processing unit which works on a 3×3 kernel. This processing unit can be configured as eight binary processors associated in pipe-line or in parallel; each of the eight binary processors can perform binary morphological transforms such as Hit or Miss Transform (H.M.T.) and thinning and thickening. Two of the eight processors can perform recursive binary reconstruction and first point extraction. The programmable morphological processing unit also can be configured as two numerical morphological processors allowing numerical transformations such as dilation, erosion, thinning, thickening, gradient and arrowing. In addition, said processing unit can be configured as recursive hexagonal, square (4 or 8 connectivity) and dodecagonal distance function processors.

The PIMM1 chip also includes a measurement unit which is able to compute binary area or numerical volume upon images up to 4096×4096 pixels wide.

The full capability to associate several PIMM1 chips in pipe-line architecture enables a substantial increase in the performance of the digital image processing circuit 30 of the present invention.

Moreover, two PIMM1 chips associated in parallel allow 16-bit gray-tone image processing.

The configuration of the PIMM1 can be done by the programming of 34 internal 8-bit registers.

In the parallel mode of operation of chips 361, 362 (FIG. 8A), the LSB bits of the BAL_Bus and BBL_Bus are processed in PIMM chip 361 to output eight LSB bits on the BAP_Bus. The serial/parallel mode multiplexers 364 are appropriately enabled both to couple synchronization signals to PIMM chip 362 and also to couple the MSB bits on the BAL_Bus and BBL_Bus to PIMM 362, which outputs eight MSB bits on the BAP_Bus, simultaneously with the output of eight LSB bits on the BAP_Bus by PIMM 361.

In the serial mode of operation of chips 361, 362 (FIG. 8B), the LSB bits are computed by chip 361 and the result is transmitted to input A of chip 362, together with a "carry" signal to input B of chip 362, via appropriately enabled multiplexers 364. Chip 362 continues the computation which results in the MSB output on BAP_Bus. Synchronization signals are transmitted to chip 362 via chip 361 and an appropriately enabled multiplexer 364. Chip 362 also transmits the synchronization signals to LUT unit 37.

A novel mechanism has been implemented for the CONVOL unit 34 to compute images whose borders are greater than one pixel in width. In accordance with the present invention, the input synchronization signals are made compatible with the $PIMM_1$ chip specifications (i.e. one border pixel) and the synchronization signals issued from the MORPH unit 36 are rebuilt to restore the original border. This is done in the synchro unit 362 of LOGIC UNIT and in the synchro unit 378 of the LUT block 37.

G. Look-Up Table Unit 37

As noted elsewhere herein, the digital image processing circuit 30 (FIG. 2B) constructed and operated in accordance with the present invention comprises a pipeline processing or computation (computing) chain (indicated generally by reference numeral 379 in FIGS. 2B, 9F–9I) composed of the convolution unit 34, the logic unit 35, and the morphological unit 36 whose output is transmitted on BAP_Bus to the chain's last component, i.e., look-up table (LUT) 37 (FIG. 2B).

In accordance with the present invention, the look-up table unit 37 is constructed and operated to provide look-up table functions for both gray scale electronic images, i.e., "numerical LUT" functions, and also for binary electronic images, i.e., "binary LUT" functions. Whether the image being processed by the computational chain 379 is a gray scale image or a binary image, when the last pixel is transmitted on R_Bus from the look-up table 37 and written into Image RAM 32, the computational functions performed by the chain which resulted in that output, are completed.

Figure 9:
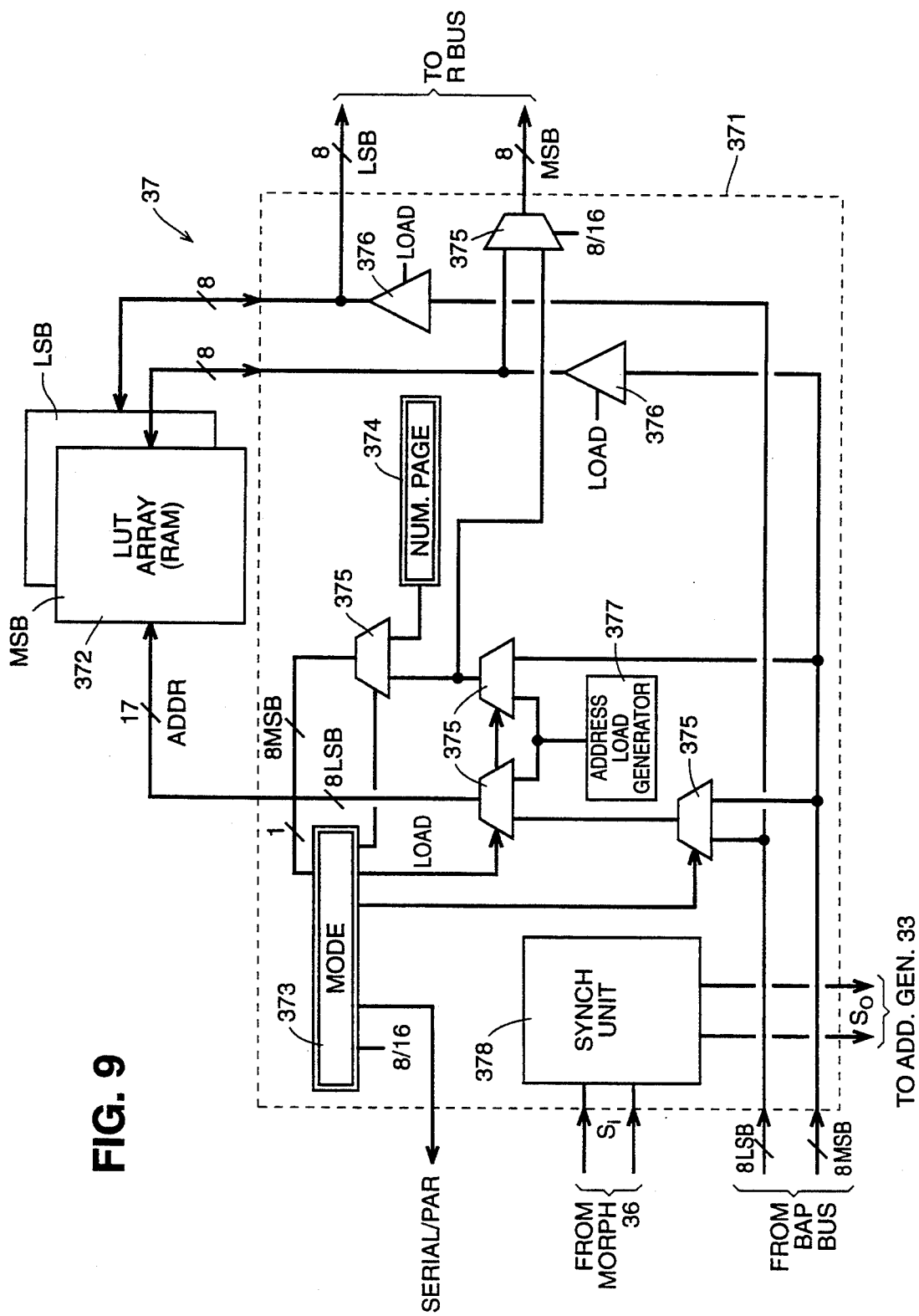
FIG. 9 is a block diagram showing the general aspect of look-up table ("LUT") unit 37 incorporated in said processing circuit 30 also described with reference to FIG. 2B.

Look-up table unit 37 comprises (FIG. 9) look-up table circuitry 371 and look-up table RAM memory 372. Circuitry 371 comprises a mode register 373, an address generator 377 for loading addresses for LUT RAM 372, a plurality of multiplexers 375, a second plurality of load circuits 376, a memory bank ("Page") register 374, and a synchronization unit 378.

Figure 9A:
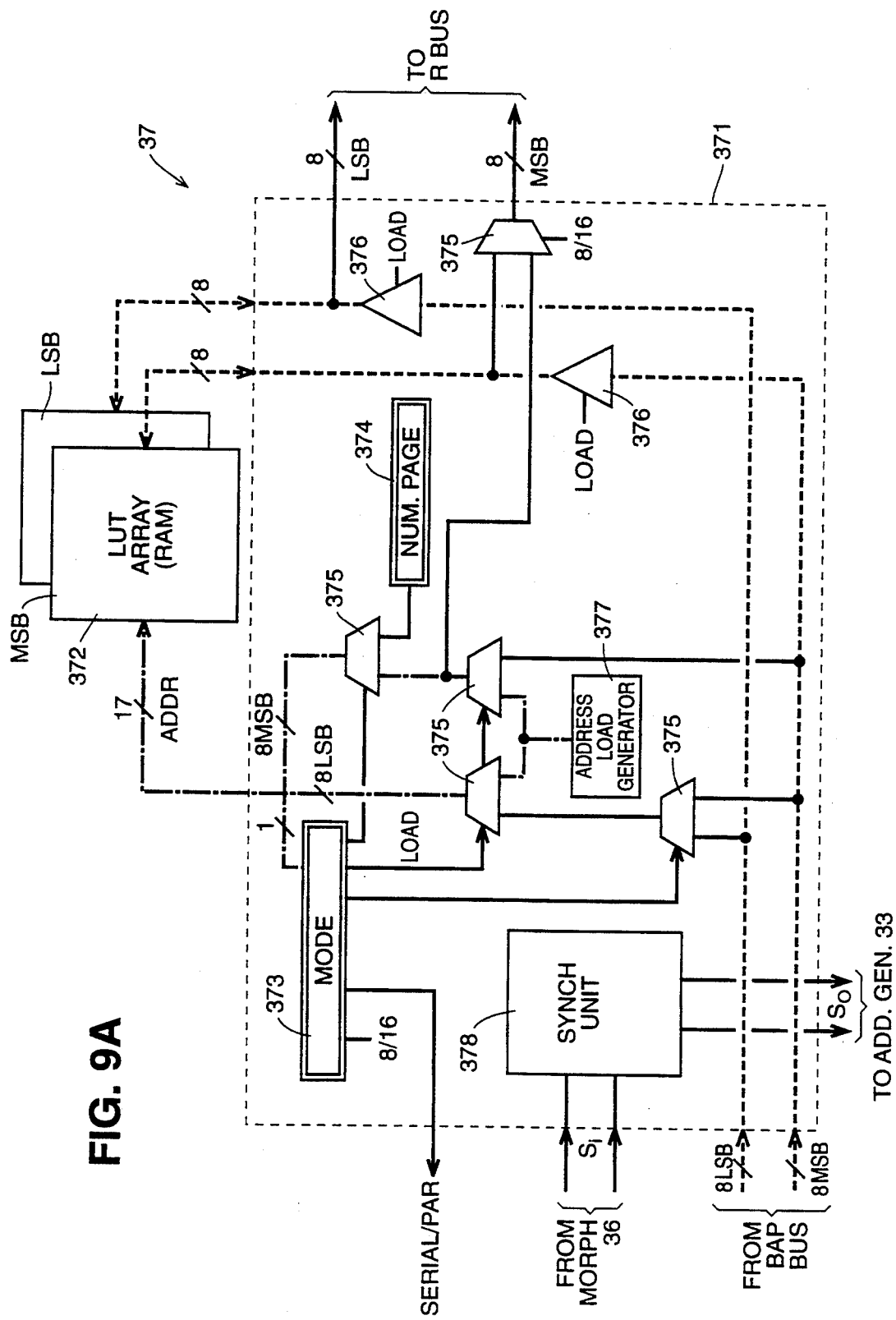
FIG. 9A is a block diagram illustrating the data and address signal paths that obtain during initialization of the LUT RAM 372.
Figure 9B:
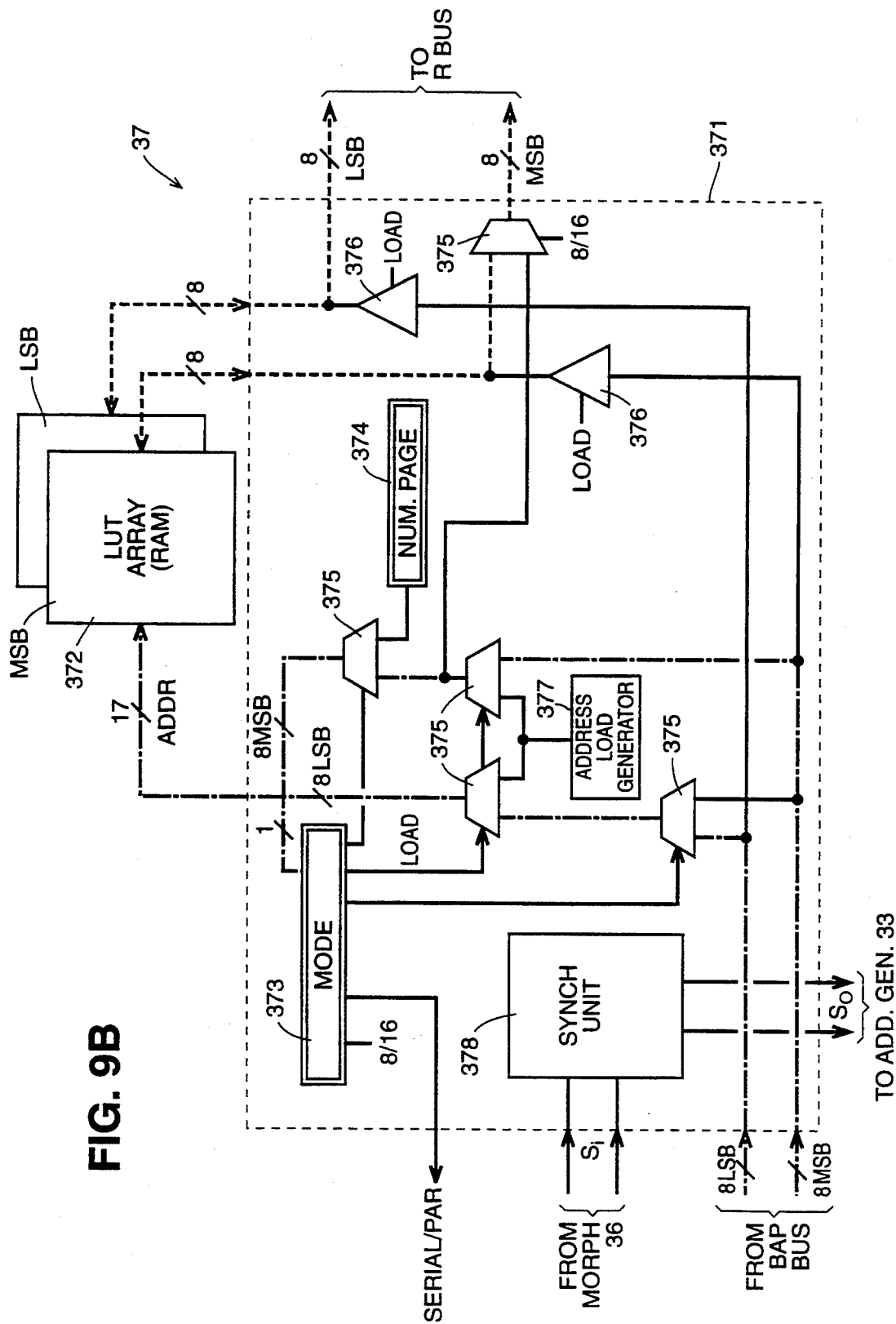
FIG. 9B is a block diagram illustrating the data and address signal paths that obtain during processing of 16-bit numerical images by LUT 37.
Figure 9C:
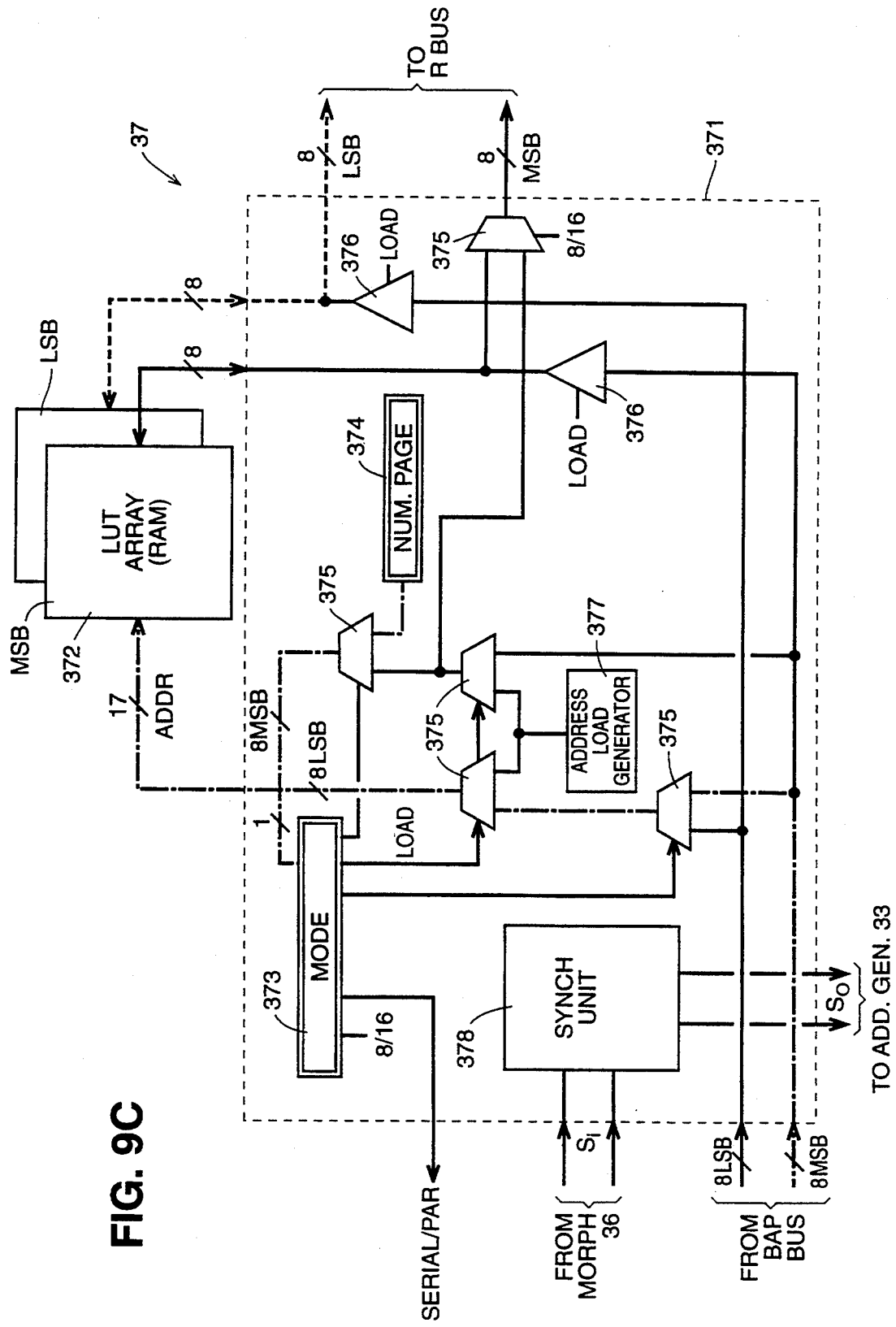
FIG. 9C is a block diagram of LUT 37 illustrating the data and address signal paths that obtain during processing of 8-bit binary images with PIMM circuits 361, 362 of morphological unit 36 operated in serial mode.
Figure 9D:
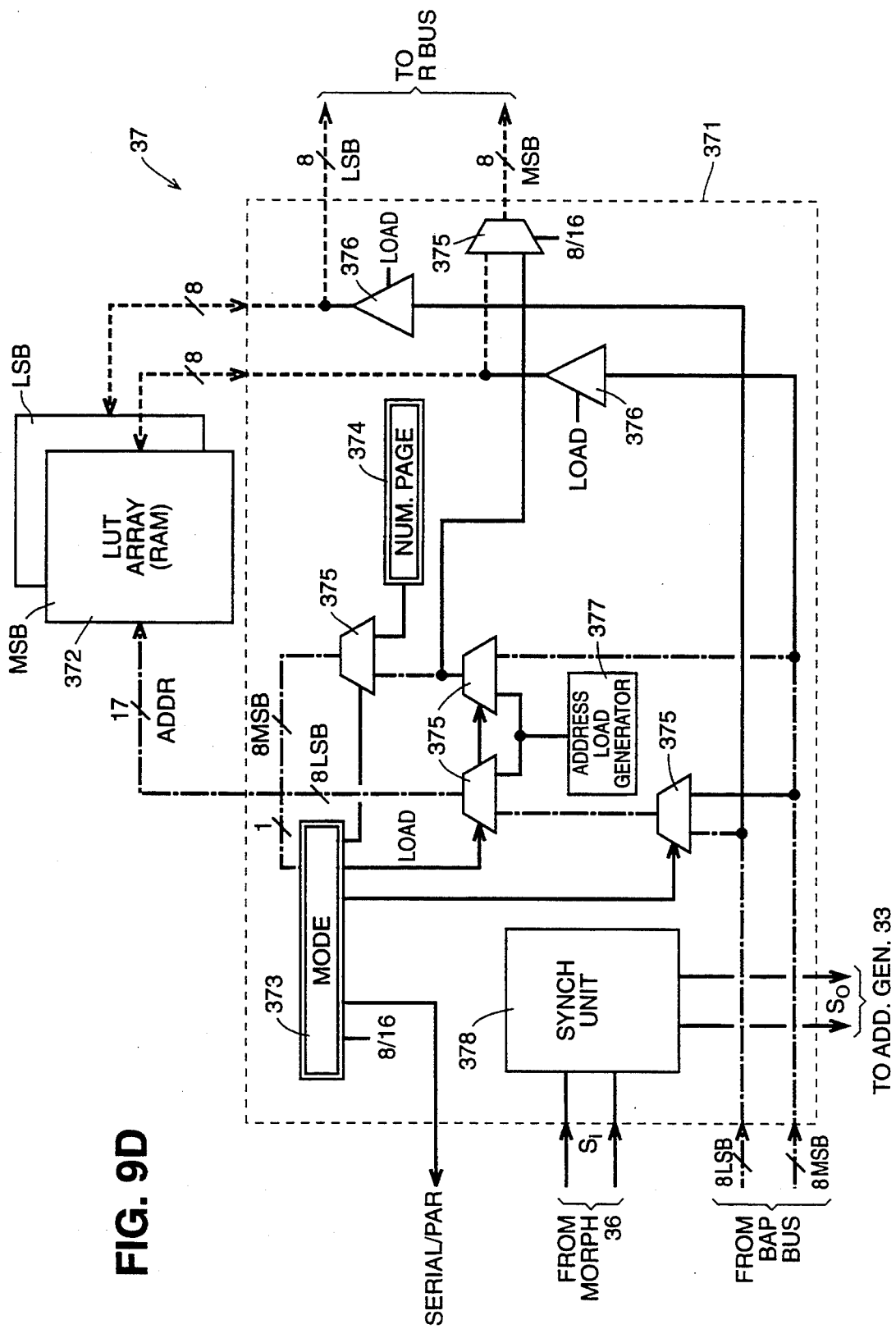
FIG. 9D is a block diagram of LUT 37 illustrating the data and address signal paths that obtain during processing of two 8-bit binary images with the PIMM circuits 361, 362 of morphological unit 36 operated in parallel mode.
Figure 9F:
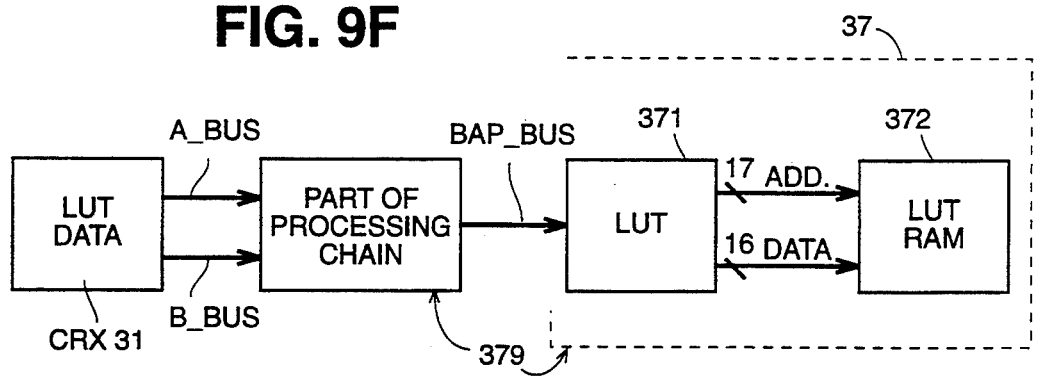
FIG. 9F is a simplified block diagram pertinent to the description of the circuitry of FIG. 9A, which illustrates signal paths during the initialization of the LUT RAM 372.
Figure 9G:
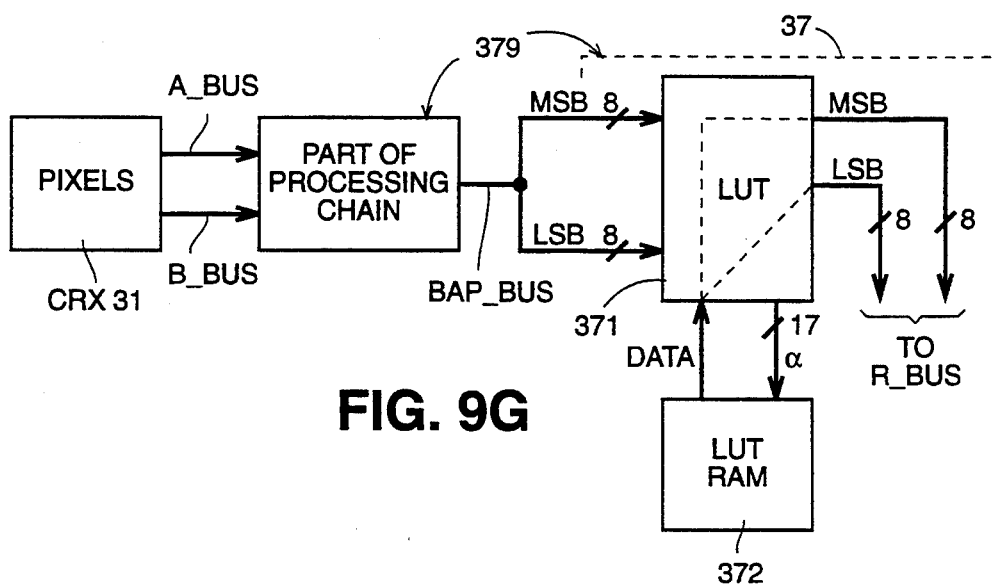
FIGS. 9G, 9H are simplified block diagrams pertinent to the description of the circuitry of FIG. 9B, which illustrates processing of 16-bit numerical images.
Figure 9H:
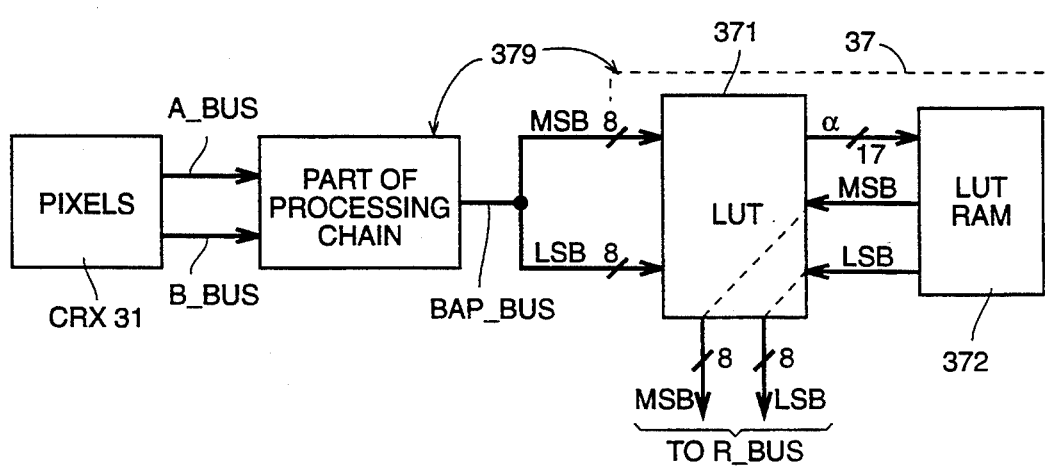
Figure 9I:
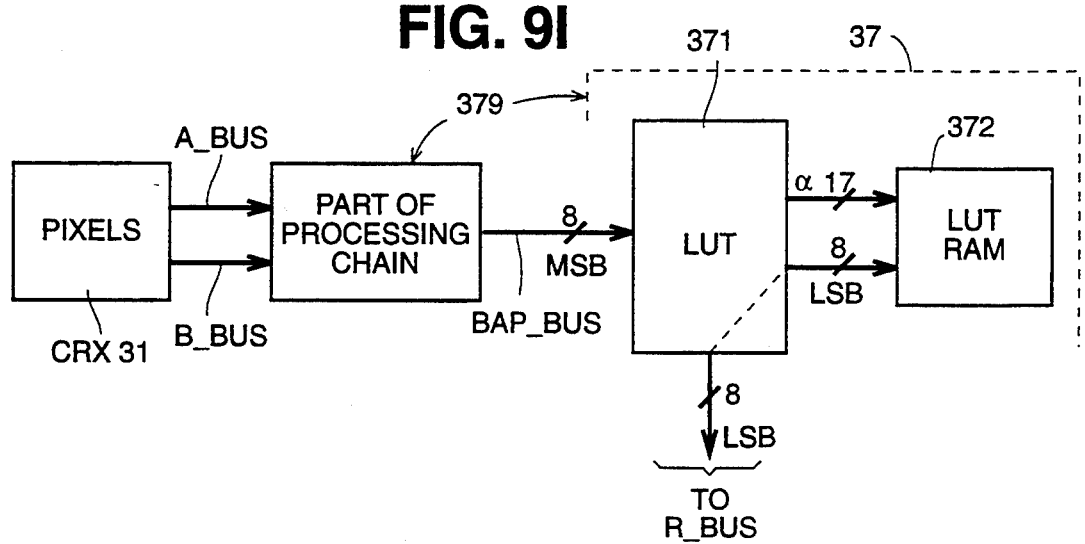
FIG. 9I is a simplified block diagram pertinent to the description of the circuitry of FIG. 9C, which illustrates processing of an 8-bit binary image with the PIMM circuits 361, 362 operated in serial mode.
Figure 9J:
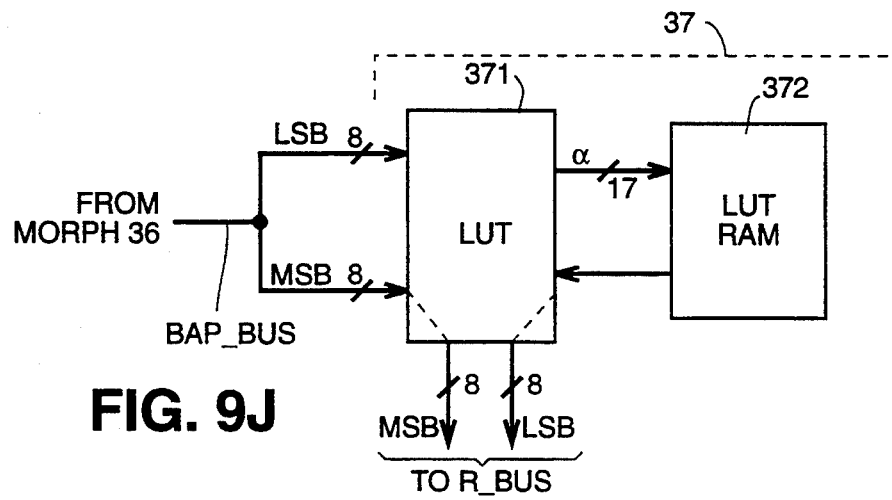
FIG. 9J is a simplified block diagram pertinent to the description of the circuitry of FIG. 9D, which illustrates processing of two 8-bit binary images with the PIMM circuits 361, 362 operated in parallel mode.

The RAM 372 is arrayed in two sections, MSB and LSB (FIG. 9), each section being 8 bits wide. LUT data is stored in VRAM Bank 0 (FIG. 1A). When the load-LUT commands are run, the unit 37 is initialized and LUT data are written to RAM 372, under the timing control of synchronization unit 378 (FIG. 9A), and are stored therein at addresses generated on the fly by address generator 375, when the LUT data are at the input of RAM 372 (FIG. 9M).

During initialization (FIGS. 9A, 9F), the LUT data are transmitted from CRX 31 (FIG. 9F) through that part of the processing chain 379 comprising units 34, 35, and 36 to the LUT unit 37 via BAP_Bus. Under timing control provided by synchronization unit 378, the LUT data are transmitted to RAM 372 from BAP_Bus via the dashed line paths (FIG. 9A) through enabled load circuits 376. During initialization of LUT unit 37, the units 34, 35, and 36 are rendered transparent to LUT data from CRX 31 (FIG. 9F).

As noted elsewhere herein, the LUT RAM 372 can contain numerical LUT functions and binary LUT functions. The LUT RAM 372 organization is user defined and can be organized as two numerical LUT functions (Bank Ø, Bank 1), as 512 binary LUT functions (Bank Ø, Bank 1), or as a mixed arrangement with one numerical LUT function (Bank Ø) and 256 binary LUT functions (Bank 1) (FIG. 9L). During processing of an image, the internal address generator 377 is in standby. LUT RAM addresses are provided by pixels on BAP-Bus.

In processing 16-bit numerical images (FIGS. 9B, 9G, 9H), the look-up table 37 performs a translation process with respect to each 16-bit input pixel ($P_{IN}$) appearing on the BAP_Bus, i.e., the 16-bit output pixel ($P_{out}$) appearing on R_Bus is some function of the input pixel: $P_{out}=f(P_{IN})$, where the function f is stored in the numerical LUT portion of RAM 372 and can be "identity"; squaring; square root; exponential e; log to any base; etc.

In processing 8-bit binary images one at-a-time (FIGS. 9C, 9I), the least significant bits ("LSB") chip 361 and most significant bits ("MSB") chip 362 are operated in serial mode (FIG. 8B). The significant image data in an 8-bit binary image are in the MSB bits of BAP_Bus. With respect to the way the RAM LUT has been initialized (FIG. 9M), the MSB of BAP_Bus must be put on the LSB address of the RAM LUT (FIG. 9L).

In operation, the 8-bit MSB input on BAP_Bus is used via enabled multiplexers 375 (dash-dot path in FIG. 9C from BAP_Bus to RAM 372) to generate an address, the Bank (Page) register 374 identifying the starting memory location for the binary LUT (FIG. 9L); the computed 8-bit output from RAM 372 is transmitted on the LSB bits of R_Bus.

In processing 8-bit binary images two at-a-time (FIGS. 9D, 9J), the LSB and MSB chips 361, 362 are operated in parallel mode (FIG. 8A). In this operation, the LUT block architecture allows the performing of a LUT function for the LSB information while bypassing the MSB information directly onto the MSB part of R-bus.

In operation, the two 8-bit binary images appear on the MSB and LSB bits of BAP_Bus and are used via enabled multiplexers 375 (dash-dot path in FIG. 9D from BAP_Bus to RAM 372) to generate an address. Bank (Page) register 374 identifies the top of the binary LUT in RAM 372 (FIG. 9N). Mode register 373 under synchronization signal control enables the multiplexers 375 in the path from BAP_Bus to RAM 372 (FIG. 9D) and the multiplexer 375 in the path for the MSB bits to be transmitted from RAM 372 to R_Bus (dashed line in FIG. 9D). At the same time, the LSB bits are transmitted from RAM 372 to R_Bus bypassing the output terminal of disabled load circuit 376.

Figure 9K:
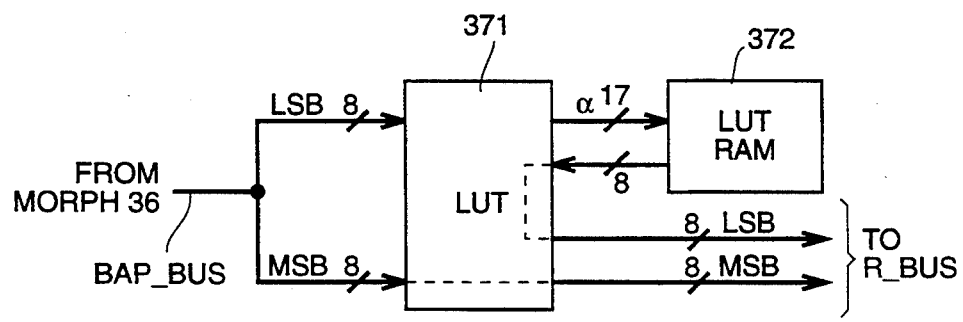
FIG. 9K is a simplified block diagram pertinent to the description of the circuitry of FIG. 9E, which illustrates the processing of an identity function.
Figure 9L:
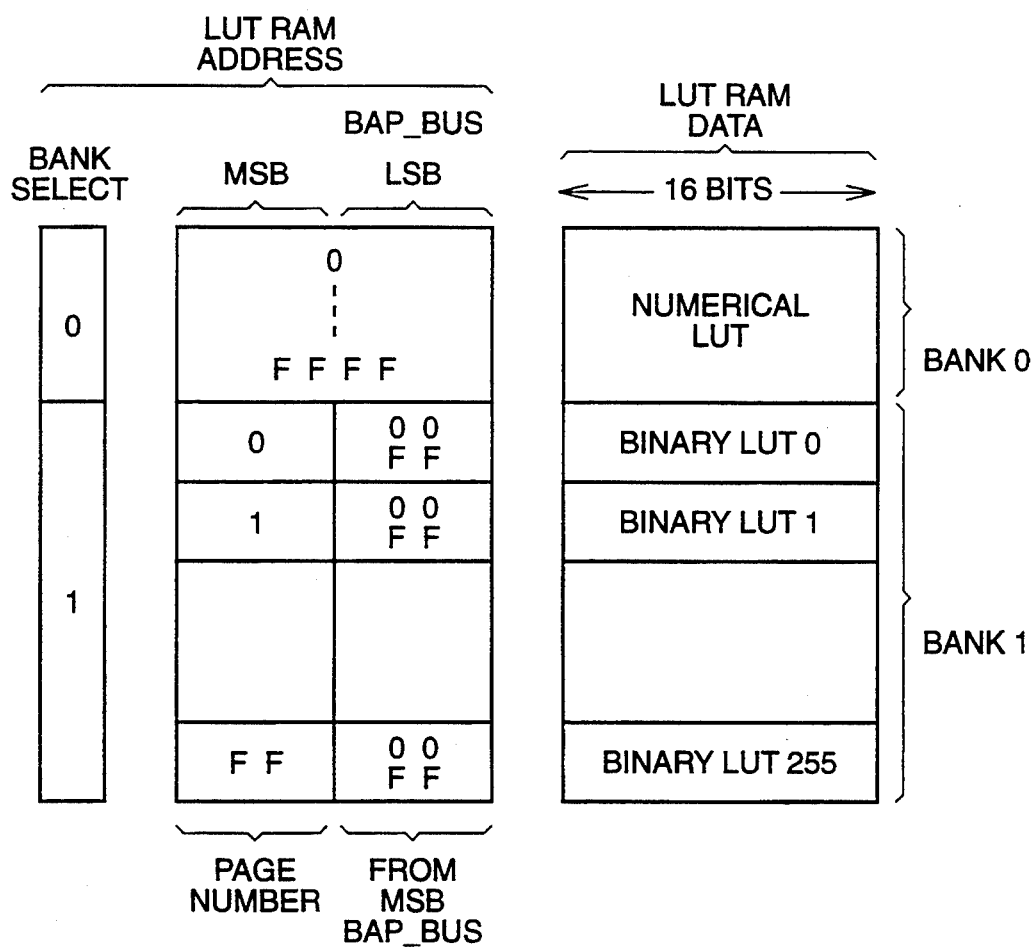
FIG. 9L depicts the general assignment of memory locations of LUT RAM 372 when working in mixed mode, i.e., one numerical lut and 256 binary luts.
Figure 9M:
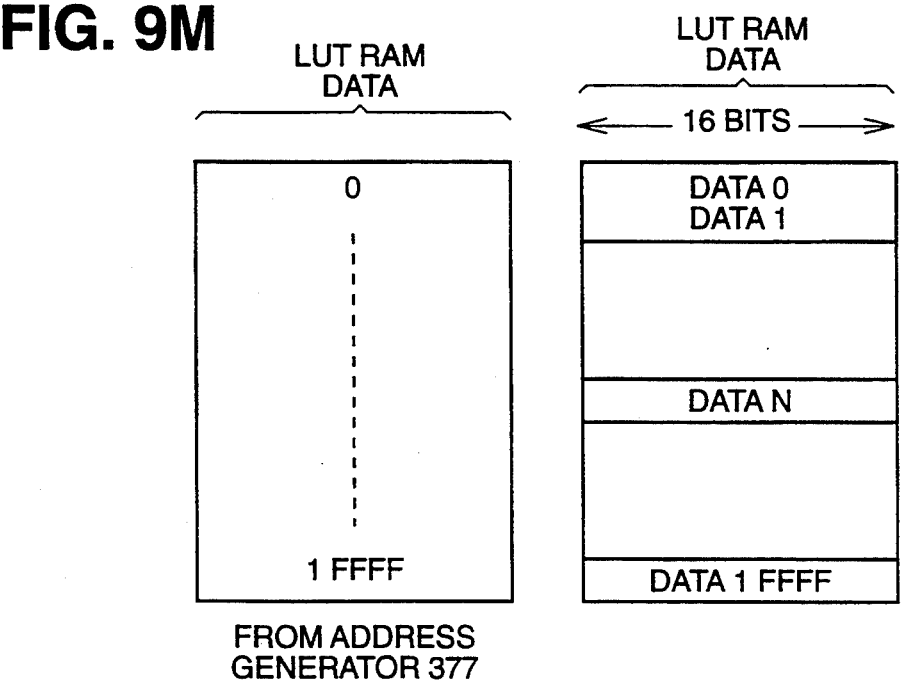
FIG. 9M depicts the general assignment of memory locations of LUT RAM 372 as loaded when processing a load-lut command.

FIGS. 9E, 9K depict the operation of LUT unit 37 to perform an "identity" function on a 16-bit numerical image by using a binary identity LUT. An "identity" function is a function that imposes no change on the input, i.e., the output of LUT unit 37 is equal to or the same as the input to LUT unit 37.

In this operation, for a 16-bit numerical image, the MSB bits on BAP Bus are transmitted directly through LUT circuit 371 via two enabled multiplexers 375 to the MSB of R_Bus (dashed line MSB path from BAP_Bus to R_Bus in FIG. 9E). Additionally, the LSB bits on BAP_Bus, together with the signals generated by Mode and Page (Bank) registers 373, 374, described elsewhere herein (dash-dot path in FIG. 9E), are used to generate an address for reading the LSB bits from RAM 372 and transmitting those LSB bits to the LSB line on R_Bus (dashed path to R_Bus LSB in FIG. 9E).

As described elsewhere herein, the synchronization unit 378 (FIG. 9) synchronizes the input to the look-up table 37 and the storage of LUT data in RAM 372 and transmits synchronization signals ($s_0$) to the address generator.

H. Components of Preferred Embodiment

The specific components incorporated in the preferred embodiment of the subsystem 20, including the digital image processing circuitry 30, constructed in accordance with the present invention and described with reference to FIG. 2B can be constructed from discrete elements or advantageously from integrated circuits. The following table lists examples of such components.

TABLE

| LOCATION IN DRAWINGS | QUAN-TITY | CODE | MANU-FACTURED |
|---|---|---|---|
| Digital Signal Processor 21 | 1 | TMS320C30-27 | Texas Instruments |
| VRAMC 22 | 1 | XC 3064-125 | Xilinx |
| Video RAM 23 | 24 | M5M442256AL-8 | Mitsubishi |
| CRX 31 | 4 | XC 3030-125 | Xilinx |
| RAM Images 32 | 16 | MT5C 1005-25 | Micron Technology Inc. |
| ADD GEN 33 | 4 | XC 3064-125 | Xilinx |
| CONVOL 34 | 2 | L64260CG-40 (VFIR) | LSI Logic |
|  | 4 | D42102C-3 (Delay Line) | NEC |
|  | 1 | XC 3030-125 (MORCON) | Xilinx |
| LU 35 | 1 | XC 3064-125 | Xilinx |
| MORPH 36 | 2 | L5A0980 (PIMM1) | LSI Logic |
|  | 6 | D42102C-3 (Delay Line) | NEC |
| LUT 37 | 1 | XC 3042-125 | Xilinx |
|  | 2 | MT5C 1008-25 | Micron Technology Inc. |

All logic units described with reference to the drawings contain standard TTL-Fast and CMOS PAL components.

Conclusion

Thus, in accordance with the present invention, novel methods for digital signal filtering and for general purpose digital image processing and novel apparatus for performing digital signal filtering and for performing general purpose digital image processing have been described in detail above.

While specific embodiments of the invention have been disclosed, variations in procedural and structural detail within the scope of the appended claims are possible and are contemplated.

For example, as described elsewhere above, although MIN/MAX computations are made on the eight most significant bits, such computations can be made on the full range of 16 bits. Additionally, the processing circuit is not limited to processing 512×512×16 bit physical images, but can be used to process 1024×1024×16 bit physical images, and larger.

Additionally, by addition of random access memory chips to LUT RAM 372, RAM 372 can be enlarged to three or more Banks as desired by the user. Moreover, image storage RAM 32 can be enlarged by the addition of random access memory chips, e.g., to provide memory for storing intermediate results computed by pipeline processing chain 379.

Moreover, the subsystem 20 (FIG. 2A) is not limited to use with a host computer 10 embodying MCA architecture. By means of an interface circuit 14 suitably designed according to the specifications of non-MCA architecture host computer and the subsystem 20, the subsystem 20 can be connected to and be operated with a host computer embodying any other architecture, e.g., RISC, EISA, etc.

Further, logic unit 35 performs a number of miscellaneous functions described above, to which additional functions can be added. Additionally, to increase the speed of computations, one or more additional pipeline processing chains 379 (FIG. 2B) can be added to the processing circuit. In this embodiment, the 16-bit R—Bus output of LUT unit 37 in the first chain 379 can be connected to the A—Bus input of the CONVOL unit 35 comprising the first stage of the second pipeline processing chain 379, with the R—Bus output of the LUT unit in the second chain connected to the CRX 31 via R—Bus or alternatively to the A—Bus input of the third pipeline chain, etc. In that manner, any desired number of pipeline processing chains 379 can be connected between the 16-bit R—Bus output of LUT unit 37 in the first processing chain 379 and the R—Bus input to the CRX 31 FIG. 2B).

There is, therefore, no intention of limitation to the Abstract or to the precise disclosure herein presented.

We claim:

1. In a method for generating addresses for random access memory for one or more pixels to be extracted from at least one electronic digital input image having a boundary, said extracted pixels thereafter being processed to derive an electronic digital output image, the improvement characterized by the combination of the steps of:

deriving from said input image at least one logical electronic digital image located at or within the boundary of said input image, said logical image having at least one pixel and having an arbitrary origin of Cartesian coordinates;

identifying at least one pixel to be extracted from said logical image;

scanning said logical image in line and column directions to generate a pair of memory storage addresses, each pair of memory addresses comprising a row storage address and a column storage address in said memory for each identified pixel to be extracted;

extracting and processing each of said identified pixels by pipeline processing computations to obtain a processed output pixel;

simultaneously generating a pair of memory storage addresses for each processed pixel, each pair comprising a row storage address and a column storage address in random access memory, and storing said processed pixel in said memory at said generated pair of addresses;

adjusting the flyback interval, $\Delta t$, which follows the scan of a line of pixels in said logical image; and preselecting said interval to define the size of a border of ghost pixels around said logical image.

2. The method of claim 1 further characterized by the step of starting said scanning from said origin in any one of up to eight scan mode directions.

3. In a address generator circuit for generating addresses in random access memory means for one or more pixels to be extracted from at least one electronic digital input image having a boundary, said extracted pixels thereafter being processed to derive an electronic digital output image, the improvement characterized by the combination of:

means for deriving from said input image at least one logical electronic digital image located at or within said boundary of said input image, said logical image having at least one pixel and having an arbitrary origin of Cartesian coordinates;

means for identifying at least one pixel to be extracted from said logical image;

means for scanning said logical image in line and column directions to generate a pair of memory storage addresses, each pair comprising a row storage address and a column storage address in said memory for each identified pixel to be extracted;

said means for scanning said logical image comprising (a) means for adjusting the flyback interval, $\Delta t$, which follows the scan of a line of pixels in said logical image and (b) means for preselecting said interval thereby to define the size of a border of ghost pixels around said logical image;

means for extracting each identified pixel;

means for processing each of said extracted pixels by pipeline processing means thereby to obtain a processed output pixel; and means for simultaneously generating a pair of memory storage addresses for each processed pixel, each pair comprising a row storage address and a column storage address in random access memory means, and storing said processed pixel in said memory at said generated pair of addresses.

4. The circuit of claim 3 further characterized in that said scanning means includes means for starting said scanning from said origin in any one of up to eight scan mode directions.

5. In a method for processing at least one electronic digital input image having a boundary to derive a processed electronic digital output image, the improvement characterized by the steps of:

deriving from said input image at least one logical electronic digital image located at or within the boundary of said input image, said logical image having at least one pixel and having an arbitrary origin of Cartesian coordinates;

identifying at least one pixel to be extracted from said logical image;

scanning said logical image in line and column directions to generate a pair of memory storage addresses in random access memory, each pair comprising a row storage address and a column storage address in said memory for each identified pixel to be extracted;

adjusting the flyback interval, $\Delta t$, which follows the scan of a line of pixels in said logical image and preselecting said interval to define the size of a border of ghost pixels around said logical image;

extracting and processing each of said identified pixels by pipeline processing computations to obtain a processed output pixel; and simultaneously generating a pair of memory storage addresses for each processed pixel, each pair comprising a row storage address and a column storage address in random access memory, and storing said processed pixel in said memory at said generated pair of addresses.

* * * * *

UNITED STATES PATENT AND TRADEMARK OFFICE
CERTIFICATE OF CORRECTION

PATENT NO. : 5,452,375

DATED : September 19, 1995

INVENTOR(S) : Jean-Francois Rousseau and Bertrand Obriot

It is certified that error appears in the above-indentified patent and that said Letters Patent is hereby corrected as shown below:

Col. 11, line 34, "memory Imp" should read --memory $IM_1$--

Col. 12, line 59, "FIG. 5B" should read --FIG. 5B.--

Col. 18, line 68, "$W_i$" should read --$w_i$--

Col. 19, line 19, BB Bus" should read --BB_Bus--

Col. 19, line 23, "($S_i$) should read --($s_i$)--

Col. 19, line 24, "(so)" should read --($s_o$)--

Col. 20, line 31, "$PIMM_1$" should read --PIMM1--

Col. 22, line 11, "BAP Bus" should read --BAP_Bus--;

Signed and Sealed this

Seventh Day of May, 1996

Attest:

Attesting Officer

BRUCE LEHMAN

Commissioner of Patents and Trademarks